(12) United States Patent
Tanimoto

(10) Patent No.: US 8,356,116 B2
(45) Date of Patent: Jan. 15, 2013

(54) RELAY SERVER AND RELAY COMMUNICATION SYSTEM

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 1 day.

(21) Appl. No.: 13/061,234

(22) PCT Filed: Aug. 31, 2009

(86) PCT No.: PCT/JP2009/004254
§ 371 (c)(1),
(2), (4) Date: Feb. 28, 2011

(87) PCT Pub. No.: WO2010/023958
PCT Pub. Date: Mar. 4, 2010

(65) Prior Publication Data
US 2011/0161525 A1 Jun. 30, 2011

(30) Foreign Application Priority Data

Sep. 1, 2008 (JP) .................................. 2008-223098
Sep. 4, 2008 (JP) .................................. 2008-227540
Sep. 8, 2008 (JP) .................................. 2008-230229

(51) Int. Cl.
*G06F 15/16* (2006.01)
(52) U.S. Cl. ....................................................... 709/249
(58) Field of Classification Search ................... 709/249
See application file for complete search history.

(56) References Cited

U.S. PATENT DOCUMENTS

| | | |
|---|---|---|
| 6,574,656 B1 | 6/2003 | Nagaoka et al. |
| 6,898,641 B1 | 5/2005 | Kobayashi |
| 7,647,388 B2 | 1/2010 | Kato |
| 7,720,942 B2 * | 5/2010 | Bazzinotti et al. ............. 709/221 |
| 7,895,649 B1 * | 2/2011 | Brook et al. ...................... 726/22 |
| 8,065,418 B1 | 11/2011 | Abuan et al. |
| 2002/0059436 A1 | 5/2002 | Kubo |
| 2002/0069278 A1 * | 6/2002 | Forslow ......................... 709/225 |
| 2002/0143956 A1 | 10/2002 | Tanimoto |

(Continued)

FOREIGN PATENT DOCUMENTS

JP 04-105143 A 4/1992

(Continued)

OTHER PUBLICATIONS

Microsfot, "What is VPN?", Mar. 28, 2003, p. 1-10.*

(Continued)

*Primary Examiner* — Ryan Jakovac
(74) *Attorney, Agent, or Firm* — Keating & Bennett, LLP

(57) ABSTRACT

In a relay communication system in which remote LANs communicate with one another beyond a WAN, respective apparatuses confirm a virtual network environment of the relay communication system in real time. Relay servers relay mutual communication between client terminals. The relay server creates information shown below, and allows the whole of the relay communication system to share the information: a relay group information indicating virtual private IP addresses of the relay servers and a connection establishment state therebetween; and a relay server information indicating a virtual private IP address and connection establishment state of a client terminal capable of communicating with the relay server. The respective apparatuses in the relay communication system can share the information regarding the virtual private IP addresses and connection establishment states of all the apparatuses, and can flexibly execute communication in which the virtual private IP addresses are designated as destinations for communication.

16 Claims, 54 Drawing Sheets

U.S. PATENT DOCUMENTS

| | | |
|---|---|---|
| 2002/0146002 A1 | 10/2002 | Sato |
| 2003/0144872 A1 | 7/2003 | Masui et al. |
| 2004/0078426 A1 | 4/2004 | Nagami et al. |
| 2004/0172395 A1 | 9/2004 | Edelstein et al. |
| 2006/0282540 A1 | 12/2006 | Tanimoto |
| 2007/0233844 A1 | 10/2007 | Tanimoto |
| 2007/0274329 A1 | 11/2007 | Takeyoshi et al. |
| 2008/0089349 A1 | 4/2008 | Tanimoto |
| 2008/0137672 A1 | 6/2008 | Tanimoto |
| 2008/0288591 A1 | 11/2008 | Tanimoto |
| 2008/0298367 A1 | 12/2008 | Furukawa |

FOREIGN PATENT DOCUMENTS

| | | |
|---|---|---|
| JP | 09-168055 A | 6/1997 |
| JP | 09-282216 A | 10/1997 |
| JP | 2000-059465 A | 2/2000 |
| JP | 2001-092702 A | 4/2001 |
| JP | 2001-292167 A | 10/2001 |
| JP | 2001-306382 A | 11/2001 |
| JP | 2002-007182 A | 1/2002 |
| JP | 2002-149519 A | 5/2002 |
| JP | 2002-217943 A | 8/2002 |
| JP | 2002-247036 A | 8/2002 |
| JP | 2002-314573 A | 10/2002 |
| JP | 2004-139291 A | 5/2004 |
| JP | 2004-265415 A | 9/2004 |
| JP | 2004-310371 A | 11/2004 |
| JP | 2005-027040 A | 1/2005 |
| JP | 2005-086520 A | 3/2005 |
| JP | 2005-267658 A | 9/2005 |
| JP | 2005-328239 A | 11/2005 |
| JP | 2006-343943 A | 12/2006 |
| JP | 2007-104440 A | 4/2007 |
| JP | 2007-267136 A | 10/2007 |
| JP | 2008-098699 A | 4/2008 |
| JP | 2008-098881 A | 4/2008 |
| JP | 2008-129991 A | 6/2008 |
| JP | 2008-148046 A | 6/2008 |
| JP | 2008-148200 A | 6/2008 |
| JP | 2009-027652 A | 2/2009 |
| JP | 2010-178089 A | 8/2010 |
| JP | 2011-055452 A | 3/2011 |
| JP | 2011-055453 A | 3/2011 |
| JP | 2011-055454 A | 3/2011 |
| WO | 2006/090465 A1 | 8/2006 |

OTHER PUBLICATIONS

English translation of Official Communication issued in corresponding International Application PCT/JP2009/004254, mailed on Mar. 17, 2011.
Official Communication issued in International Patent Application No. PCT/JP2010/001594, mailed on Mar. 30, 2010.
Official Communication issued in International Patent Application No. PCT/JP2010/003240, mailed on Jun. 15, 2010.
Official Communication issued in International Patent Application No. PCT/JP2010/005041, mailed on Nov. 22, 2010.
Official Communication issued in International Patent Application No. PCT/JP2010/005679, mailed on Oct. 26, 2010.
Official Communication issued in International Patent Application No. PCT/JP2010/005680, mailed on Oct. 26, 2010.
Tanimoto. Relay Device and Communication System, U.S. Appl. No. 11/723,466, filed Mar. 20, 2007.
Hitoshi, "Network World", vol. 9, No. 12, Dec. 1, 2004, pp. 148-150.
Tanimoto, "Relay Server, Communication System and Facsimile System", U.S. Appl. No. 10/045,698, filed Jan. 10, 2002.
Tanimoto, "Relay Server, Communication System and Facsimile System", U.S. Appl. No. 10/045,897, filed Jan. 10, 2002.
Tanimoto, "Relay Server for Relaying Communications Between Network Devices", U.S. Appl. No. 10/114,720, filed Apr. 1, 2002.
Tanimoto, "Relay Server", U.S. Appl. No. 10/114,963, filed Apr. 2, 2002.
Tanimoto, "Relay Server, Network Device, Communication System, and Communication Method", U.S. Appl. No. 10/116,615, filed Apr. 2, 2002.
Official Communication issued in corresponding Japanese Patent Application No. 2009-205183, mailed on Feb. 3, 2012.
Official Communication issued in corresponding Japanese Patent Application No. 2009-205191, mailed on Feb. 3, 2012.
Official Communication issued in corresponding Japanese Patent Application No. 2009-201775, mailed on Feb. 7, 2012.
Tanimoto, "First Relay Server and Second Relay Server", U.S. Appl. No. 13/255,958, filed Sep. 12, 2011.
Tanimoto, "Relay Server, Relay Communication System, and Communication Apparatus", U.S. Appl. No. 13/061,725, filed Mar. 2, 2011.
Official Communication issued in corresponding Japanese Patent Application No. 2006-335512, mailed on Aug. 2, 2011.
Official Communication issued in corresponding Japanese Patent Application No. 2006-090693, mailed on Aug. 2, 2011.
Tanimoto, "Relay-Server Arranged to Carry out Communications Between Communication Terminals on Different Lans," U.S. Appl. No. 11/853,943, filed Sep. 12, 2007.
Tanimoto, "File Server Device Arranged in a Local Area Network and Being Communicable with an External Service Arranged in a Wide Area Network," U.S. Appl. No. 11/862,654, filed Sep. 27, 2007.
Tanimoto, "File Transfer Server," U.S. Appl. No. 11/870,622, filed Oct. 11, 2007.
Tanimoto, "Relay Server and Client Terminal," U.S. Appl. No. 11/953,351, filed Dec. 10, 2007.
Tanimoto, "Relay Server, Relay Communication System, and Communication Device," U.S. Appl. No. 11/944,495, filed Nov. 23, 2007.
Tanimoto, "Relay Server and Relay Communication System Arranged to Share Resources Between Networks," U.S. Appl. No. 11/953,505, filed Dec. 10, 2007.
Tanimoto, "Relay Server and Relay Communication System," U.S. Appl. No. 12/103,933, filed Apr. 16, 2008.
Tanimoto, "Relay Server and Relay Communication System," U.S. Appl. No. 12/112,127, filed Apr. 30, 2008.
Tanimoto, "Relay Server and Relay Communication System," U.S. Appl. No. 12/107,793, filed Apr. 23, 2008.
Tanimoto, "Relay Server and Relay Communication System," U.S. Appl. No. 12/270,883, filed Nov. 14, 2008.
Tanimoto, "Relay Server ADN Relay Communication System," U.S. Appl. No. 12/335,642, filed Dec. 16, 2008.
Tanimoto, "Relay Server and Relay Communication System," U.S. Appl. No. 12/335,661, filed Dec. 16, 2008.
Tanimoto, "Relay Server and Relay Communication System," U.S. Appl. No. 12/340,868, filed Dec. 22, 2008.
Official Communication issued in International Patent Application No. PCT/JP2009/004254, mailed on Dec. 15, 2009.
Tanimoto, "Relay Communication System and First Relay Server," U.S. Appl. No. 13/320,034, filed Nov. 11, 2011.
Tanimoto et al., "Relay Communication System and Access Management Apparatus," U.S. Appl. No. 13/390,561, filed Feb. 15, 2012.
Tanimoto, "Relay Server and Relay Communication System," U.S Appl. No. 13/496,664, filed Mar. 16, 2012.
Tanimoto, "Relay Device and Communication System", U.S. Appl. No. 13/341,711, filed Dec. 30, 2011.
Official Communication issued in corresponding Japanese Patent Application No. 2007-339311, mailed on Apr. 8, 2011.
"Error & Warning Message Ways of Coping, Nikkei Personal Computer", Nikkei Business Publications, Inc., May 10, 2007.
Official Communication issued in corresponding European Patent Application No. 08007866.0, mailed on Apr. 19, 2011.

* cited by examiner

```
<?xml version= "1.0" encoding= "UTF-8" standalone= "no" ?>
-<root>
  -<group id= "20070402133100@relay-server-1.abc.net"
    lastmod= "20070402133100" name= "GROUP 1"
    vnet= "192.168.0.*" >
    <site id= "relay-server-1@abc.net"
     vnet= "192.168.0.1" ssn= "s1" />
    <site id= "relay-server-2@abc.net"
     vnet= "192.168.0.2" ssn= "s2" />
  </group>
</root>
```

FIG. 5

```
<?xml version= "1.0" encoding= "UTF-8" ?>
-<root>
  -<site id= "relay-server-1@abc.net"
    name= "RELAY SERVER 1" stat= "active" >
    <node div= "software" vnet= "192.168.0.11" ssn= "c1"
      group= "20070402133100@relay-server-1.abc.net"
      id= "client-1@relay-server-1.abc.net"
      name= "CLIENT 1" site= "relay-server-1@abc.net" />
  </site>
  -<site id= "relay-server-2@abc.net"
    name= "RELAY SERVER 2" stat= "active" >
    <node div= "software" vnet= "192.168.0.12" ssn= "c2"
      group= "20070402133100@relay-server-1.abc.net"
      id= "client-2@relay-server-2.abc.net"
      name= "CLIENT 2" site= "relay-server-2@abc.net" />
  </site>
</root>
```

FIG. 6

```
<?xml version= "1.0" encoding= "UTF-8" ?>
-<root>
  <node div= "software"
    group= "20070402133100@relay-server-1.abc.net"
    node addr= "192.168.10.2" expr= "1213935960484"
    id= "client-1@relay-server-1.abc.net"
    name= "CLIENT 1" pass= "client-1" port= "5070" />
</root>
```

```
<?xml version= "1.0" encoding= "UTF-8" ?>
-<root>
  <node div= "software"
    group= "20070402133100@relay-server-1.abc.net"
    node addr= "192.168.1.10" expr= "1213935978484"
    id= "client-2@relay-server-2.abc.net"
    name= "CLIENT 2" pass= "client-2" port= "5070" />
</root>
```

FIG. 10

```
                                                 ┌─51-1
┌─────────────────────────────────────────────────────┐
│ <?xml version= "1.0" encoding= "UTF-8" ?>           │
│ -<root>                                             │
│  -<site id= "relay-server-1@abc.net"         ⎫      │
│     name= "RELAY SERVER 1" stat= "active" >  ⎬511-1 │
│     <node div= "software"     ⌐513-1         ⎫      │
│       group= "20070402133100@relay-server-1.abc.net"⎬512-1
│       id= "client-1@relay-server-1.abc.net"  ⎪      │
│       name= "CLIENT 1" site= "" />           ⎭      │
│   </site>              ⌐516-1                       │
│ </root>                                             │
└─────────────────────────────────────────────────────┘

┌─51-2
┌─────────────────────────────────────────────────────┐
│ <?xml version= "1.0" encoding= "UTF-8" ?>           │
│ -<root>                                             │
│  -<site id= "relay-server-2@abc.net"         ⎫      │
│     name= "RELAY SERVER 2" stat= "active" >  ⎬511-2 │
│     <node div= "software"     ⌐513-2         ⎫      │
│       group= "20070402133100@relay-server-1.abc.net"⎬512-2
│       id= "client-2@relay-server-2.abc.net"  ⎪      │
│       name= "CLIENT 2" site= "" />           ⎭      │
│   </site>              ⌐516-2                       │
│ </root>                                             │
└─────────────────────────────────────────────────────┘
```

FIG. 11

┌─────────────────────────────┐
│ USABLE GROUP IS NOT FORMED  │
│ AT PRESENT.                 │
└─────────────────────────────┘

```
                                              ┌─42
┌────────────────────────────────────────────────────────┐
│ <?xml version= "1.0" encoding= "UTF-8" standalone= "no" ?> │
│ -<root>                                                 │
│  -<group id= "20070402133100@relay-server-1.abc.net"  ⎫    │
│     lastmod= "20070402133100" name= "GROUP 1" >       ⎬421 │
│     <site id= "relay-server-1@abc.net" />⎫422          │
│     <site id= "relay-server-2@abc.net" />⎭             │
│   </group>                                              │
│ </root>                                                 │
└────────────────────────────────────────────────────────┘

┌─52
┌────────────────────────────────────────────────────────┐
│ <?xml version= "1.0" encoding= "UTF-8" ?>               │
│ -<root>                                                 │
│  -<site id= "relay-server-1@abc.net"                 ⎫    │
│     name= "RELAY SERVER 1" stat= "active" >          ⎬521-1│
│     <node div= "software"                            ⎫    │
│       group= "20070402133100@relay-server-1.abc.net" ⎬522-1│
│       id= "client-1@relay-server-1.abc.net"          │    │
│       name= "CLIENT 1" site= "" />                   ⎭    │
│   </site>                                               │
│  -<site id= "relay-server-2@abc.net"                 ⎫    │
│     name= "RELAY SERVER 2" stat= "active" >          ⎬521-2│
│     <node div= "software"                            ⎫    │
│       group= "20070402133100@relay-server-1.abc.net" ⎬522-2│
│       id= "client-2@relay-server-2.abc.net"          │    │
│       name= "CLIENT 2" site= "" />                   ⎭    │
│   </site>                                               │
│ </root>                                                 │
└────────────────────────────────────────────────────────┘

┌─62
┌────────────────────────────────────────────────────────┐
│ <?xml version= "1.0" encoding= "UTF-8" ?>               │
│ -<root>                                                 │
│    <node div= "software"                                │
│      group= "20070402133100@relay-server-1.abc.net"     │
│ 621⎯ node addr= "" expr= "0" ⎯622                       │
│      id= "client-1@relay-server-1.abc.net"              │
│      name= "CLIENT 1" pass= "client-1" port= "" />      │
│ </root>                                        ⎯623    │
└────────────────────────────────────────────────────────┘

┌─72
┌────────────────────────────────────────────────────────┐
│ <?xml version= "1.0" encoding= "UTF-8" ?>               │
│ -<root>                                                 │
│    <node div= "software"                                │
│      group= "20070402133100@relay-server-1.abc.net"     │
│ 721⎯ node addr= "" expr= "0" ⎯722                       │
│      id= "client-2@relay-server-2.abc.net"              │
│      name= "CLIENT 2" pass= "client-2" port= "" />      │
│ </root>                                        ⎯723    │
└────────────────────────────────────────────────────────┘
```

FIG. 12

```
                                    ╭─43
┌──────────────────────────────────────────────────────────────┐
│  <?xml version= "1.0" encoding= "UTF-8" standalone= "no" ?>  │
│  -<root>                                                     │
│    -<group id= "20070402133100@relay-server-1.abc.net"  ⎫    │
│       lastmod= "20070402133100" name= "GROUP 1"         ⎬431 │
│433⌒  vnet= "192.168.0.*" >                              ⎭    │
│       <site id= "relay-server-1@abc.net"           ⎫         │
│434⌒    vnet= "192.168.0.1" ssn= "s1" />⌒435        ⎬432      │
│       <site id= "relay-server-2@abc.net"           ⎪         │
│434⌒    vnet= "192.168.0.2" ssn= "s2" />⌒435        ⎭         │
│    </group>                                                  │
│  </root>                                                     │
└──────────────────────────────────────────────────────────────┘
                              ╭─52
┌──────────────────────────────────────────────────────────────┐
│  <?xml version= "1.0" encoding= "UTF-8" ?>                   │
│  -<root>                                                     │
│   -<site id= "relay-server-1@abc.net"                        │
│      name= "RELAY SERVER 1" stat= "active" >                 │
│      <node div= "software"                                   │
│        group= "20070402133100@relay-server-1.abc.net"        │
│        id= "client-1@relay-server-1.abc.net"                 │
│        name= "CLIENT 1" site= "" />                          │
│    </site>                                                   │
│   -<site id= "relay-server-2@abc.net"                        │
│      name= "RELAY SERVER 2" stat= "active" >                 │
│      <node div= "software"                                   │
│        group= "20070402133100@relay-server-1.abc.net"        │
│        id= "client-2@relay-server-2.abc.net"                 │
│        name= "CLIENT 2" site= "" />                          │
│    </site>                                                   │
│  </root>                                                     │
└──────────────────────────────────────────────────────────────┘
                              ╭─62
┌──────────────────────────────────────────────────────────────┐
│  <?xml version= "1.0" encoding= "UTF-8" ?>                   │
│  -<root>                                                     │
│    <node div= "software"                                     │
│      group= "20070402133100@relay-server-1.abc.net"          │
│      node addr= "" expr= "0"                                 │
│      id= "client-1@relay-server-1.abc.net"                   │
│      name= "CLIENT 1" pass= "client-1" port= "" />           │
│  </root>                                                     │
└──────────────────────────────────────────────────────────────┘
                              ╭─72
┌──────────────────────────────────────────────────────────────┐
│  <?xml version= "1.0" encoding= "UTF-8" ?>                   │
│  -<root>                                                     │
│    <node div= "software"                                     │
│      group= "20070402133100@relay-server-1.abc.net"          │
│      node addr= "" expr= "0"                                 │
│      id= "client-2@relay-server-2.abc.net"                   │
│      name= "CLIENT 2" pass= "client-2" port= "" />           │
│  </root>                                                     │
└──────────────────────────────────────────────────────────────┘
```

FIG. 14

```
                                            ┌─43
                                            │
<?xml version= "1.0" encoding= "UTF-8" standalone= "no" ?>
-<root>
 -<group id= "20070402133100@relay-server-1.abc.net"
   lastmod= "20070402133100" name= "GROUP 1"
   vnet= "192.168.0.*" >
   <site id= "relay-server-1@abc.net"
    vnet= "192.168.0.1" ssn= "s1" />
   <site id= "relay-server-2@abc.net"
    vnet= "192.168.0.2" ssn= "s2" />
 </group>
</root>
```

```
                                            ┌─54
<?xml version= "1.0" encoding= "UTF-8" ?>
-<root>
 -<site id= "relay-server-1@abc.net"
    name= "RELAY SERVER 1" stat= "active" >   544-1   545-1
   <node div= "software" vnet= "192.168.0.11" ssn= ""
    group= "20070402133100@relay-server-1.abc.net"              542
    id= "client-1@relay-server-1.abc.net"                       -1
    name= "CLIENT 1" site= "relay-server-1@abc.net" />
 </site>                                 546-1
 -<site id= "relay-server-2@abc.net"
    name= "RELAY SERVER 2" stat= "active" >
   <node div= "software"          543-2
    group= "20070402133100@relay-server-1.abc.net"
    id= "client-2@relay-server-2.abc.net"
    name= "CLIENT 2" site= "" />
 </site>
</root>
```

```
                                            ┌─64
<?xml version= "1.0" encoding= "UTF-8" ?>
-<root>
  <node div= "software"
   group= "20070402133100@relay-server-1.abc.net"
641  node addr= "192.168.10.2" expr= "1213935960484"
   id= "client-1@relay-server-1.abc.net"            642
   name= "CLIENT 1" pass= "client-1" port= "5070" />
</root>                                        643
```

```
                                            ┌─72
<?xml version= "1.0" encoding= "UTF-8" ?>
-<root>
  <node div= "software"
   group= "20070402133100@relay-server-1.abc.net"
721  node addr= "" expr= "0"
   id= "client-2@relay-server-2.abc.net"
   name= "CLIENT 2" pass= "client-2" port= "" />
</root>                                       723
```

FIG. 16

```
                                                    ╭─43
┌────────────────────────────────────────────────────────────────┐
│ <?xml version= "1.0" encoding= "UTF-8" standalone= "no" ?>     │
│ -<root>                                                        │
│  -<group id= "20070402133100@relay-server-1.abc.net"           │
│    lastmod= "20070402133100" name= "GROUP 1"                   │
│    vnet= "192.168.0.*" >                                       │
│    <site id= "relay-server-1@abc.net"                          │
│     vnet= "192.168.0.1" ssn= "s1" />                           │
│    <site id= "relay-server-2@abc.net"                          │
│     vnet= "192.168.0.2" ssn= "s2" />                           │
│  </group>                                                      │
│ </root>                                                        │
└────────────────────────────────────────────────────────────────┘
                                                    ╭─55
┌────────────────────────────────────────────────────────────────┐
│ <?xml version= "1.0" encoding= "UTF-8" ?>                      │
│ -<root>                   553-1                                │
│  -<site id= "relay-server-1@abc.net"                           │
│    name= "RELAY SERVER 1" stat= "active" >                     │
│    <node div= "software" vnet= "192.168.0.11" ssn= ""          │
│     group= "20070402133100@relay-server-1.abc.net"             │
│     id= "client-1@relay-server-1.abc.net"                      │
│     name= "CLIENT 1" site= "relay-server-1@abc.net" />         │
│   </site>                                                      │
│  -<site id= "relay-server-2@abc.net"                           │
│    name= "RELAY SERVER 2" stat= "active" >  554-2   555-2      │
│    <node div= "software" vnet= "192.168.0.12" ssn= ""  ⎫       │
│     group= "20070402133100@relay-server-1.abc.net"     ⎬ 552   │
│     id= "client-2@relay-server-2.abc.net"              ⎪  -2   │
│     name= "CLIENT 2" site= "relay-server-2@abc.net" /> ⎭       │
│   </site>              556-2                                   │
│ </root>                                                        │
└────────────────────────────────────────────────────────────────┘
                                                    ╭─64
┌────────────────────────────────────────────────────────────────┐
│ <?xml version= "1.0" encoding= "UTF-8" ?>                      │
│ -<root>                                                        │
│   <node div= "software"                                        │
│    group= "20070402133100@relay-server-1.abc.net"              │
│641 ~ node addr= "192.168.10.2" expr= "1213935960484"           │
│    id= "client-1@relay-server-1.abc.net"                       │
│    name= "CLIENT 1" pass= "client-1" port= "5070" />           │
│ </root>                                             643        │
└────────────────────────────────────────────────────────────────┘
                                                    ╭─75
┌────────────────────────────────────────────────────────────────┐
│ <?xml version= "1.0" encoding= "UTF-8" ?>                      │
│ -<root>                                                        │
│   <node div= "software"                                        │
│    group= "20070402133100@relay-server-1.abc.net"              │
│751 ~ node addr= "192.168.1.10" expr= "1213935978484"           │
│    id= "client-2@relay-server-2.abc.net"      752              │
│    name= "CLIENT 2" pass= "client-2" port= "5070" />           │
│ </root>                                             753        │
└────────────────────────────────────────────────────────────────┘
```

FIG. 18

```
                                    ┌─43
┌─────────────────────────────────────────────────────────────────┐
│ <?xml version= "1.0" encoding= "UTF-8" standalone= "no" ?>     │
│ -<root>                                                         │
│  -<group id= "20070402133100@relay-server-1.abc.net"           │
│    lastmod= "20070402133100" name= "GROUP 1"                   │
│    vnet= "192.168.0.*" >                                       │
│    <site id= "relay-server-1@abc.net"                          │
│      vnet= "192.168.0.1" ssn= "s1" />                          │
│    <site id= "relay-server-2@abc.net"                          │
│      vnet= "192.168.0.2" ssn= "s2" />                          │
│  </group>                                                       │
│ </root>                                                         │
└─────────────────────────────────────────────────────────────────┘
                                    ┌─56
┌─────────────────────────────────────────────────────────────────┐
│ <?xml version= "1.0" encoding= "UTF-8" ?>                      │
│ -<root>                                                         │
│  -<site id= "relay-server-1@abc.net"                           │
│    name= "RELAY SERVER 1" stat= "active" >         565-1       │
│    <node div= "software" vnet= "192.168.0.11" ssn= "c1"        │
│      group= "20070402133100@relay-server-1.abc.net"    562     │
│      id= "client-1@relay-server-1.abc.net"             -1      │
│      name= "CLIENT 1" site= "relay-server-1@abc.net" />        │
│  </site>                                                        │
│  -<site id= "relay-server-2@abc.net"                           │
│    name= "RELAY SERVER 2" stat= "active" >                     │
│    <node div= "software" vnet= "192.168.0.12" ssn= ""          │
│      group= "20070402133100@relay-server-1.abc.net"            │
│      id= "client-2@relay-server-2.abc.net"                     │
│      name= "CLIENT 2" site= "relay-server-2@abc.net" />        │
│  </site>                                                        │
│ </root>                                                         │
└─────────────────────────────────────────────────────────────────┘
                                    ┌─64
┌─────────────────────────────────────────────────────────────────┐
│ <?xml version= "1.0" encoding= "UTF-8" ?>                      │
│ -<root>                                                         │
│   <node div= "software"                                         │
│     group= "20070402133100@relay-server-1.abc.net"             │
│     node addr= "192.168.10.2" expr= "1213935960484"            │
│     id= "client-1@relay-server-1.abc.net"                      │
│     name= "CLIENT 1" pass= "client-1" port= "5070" />          │
│ </root>                                                         │
└─────────────────────────────────────────────────────────────────┘
                                    ┌─75
┌─────────────────────────────────────────────────────────────────┐
│ <?xml version= "1.0" encoding= "UTF-8" ?>                      │
│ -<root>                                                         │
│   <node div= "software"                                         │
│     group= "20070402133100@relay-server-1.abc.net"             │
│     node addr= "192.168.1.10" expr= "1213935978484"            │
│     id= "client-2@relay-server-2.abc.net"                      │
│     name= "CLIENT 2" pass= "client-2" port= "5070" />          │
│ </root>                                                         │
└─────────────────────────────────────────────────────────────────┘
```

FIG. 20

```
                                            ╱-43
┌────────────────────────────────────────────────────┐
│ <?xml version= "1.0" encoding= "UTF-8" standalone= "no" ?> │
│ -<root>                                            │
│  -<group id= "20070402133100@relay-server-1.abc.net" │
│    lastmod= "20070402133100" name= "GROUP 1"       │
│    vnet= "192.168.0.*" >                           │
│    <site id= "relay-server-1@abc.net"              │
│      vnet= "192.168.0.1" ssn= "s1" />              │
│    <site id= "relay-server-2@abc.net"              │
│      vnet= "192.168.0.2" ssn= "s2" />              │
│  </group>                                          │
│ </root>                                            │
└────────────────────────────────────────────────────┘
                                            ╱-57
┌────────────────────────────────────────────────────┐
│ <?xml version= "1.0" encoding= "UTF-8" ?>          │
│ -<root>                                            │
│  -<site id= "relay-server-1@abc.net"         574-1 │
│    name= "RELAY SERVER 1" stat= "active" >         │
│    <node div= "software" vnet= "192.168.0.11" ssn= "c1" │
│      group= "20070402133100@relay-server-1.abc.net" │
│      id= "client-1@relay-server-1.abc.net"         │
│      name= "CLIENT 1" site= "relay-server-1@abc.net" /> │
│  </site>                                           │
│  -<site id= "relay-server-2@abc.net"         574-2    575-2 │
│    name= "RELAY SERVER 2" stat= "active" >         │
│    <node div= "software" vnet= "192.168.0.12" ssn= "c2" │
│      group= "20070402133100@relay-server-1.abc.net" │  572
│      id= "client-2@relay-server-2.abc.net"        │  -2
│      name= "CLIENT 2" site= "relay-server-2@abc.net" /> │
│  </site>                                           │
│ </root>                                            │
└────────────────────────────────────────────────────┘
                                            ╱-64
┌────────────────────────────────────────────────────┐
│ <?xml version= "1.0" encoding= "UTF-8" ?>          │
│ -<root>                                            │
│   <node div= "software"                            │
│     group= "20070402133100@relay-server-1.abc.net" │
│     node addr= "192.168.10.2" expr= "1213935960484" │
│     id= "client-1@relay-server-1.abc.net"          │
│     name= "CLIENT 1" pass= "client-1" port= "5070" /> │
│ </root>                                            │
└────────────────────────────────────────────────────┘
                                            ╱-75
┌────────────────────────────────────────────────────┐
│ <?xml version= "1.0" encoding= "UTF-8" ?>          │
│ -<root>                                            │
│   <node div= "software"                            │
│     group= "20070402133100@relay-server-1.abc.net" │
│     node addr= "192.168.1.10" expr= "1213935978484" │
│     id= "client-2@relay-server-2.abc.net"          │
│     name= "CLIENT 2" pass= "client-2" port= "5070" /> │
│ </root>                                            │
└────────────────────────────────────────────────────┘
```

FIG. 22

```
<?xml version= "1.0" encoding= "UTF-8" standalone= "no" ?>
-<root>
 -<group id= "20070402133100@relay-server-1.abc.net"    }401
    lastmod= "20070402133100" name= "GROUP 1" >
    <site id= "relay-server-1@abc.net" />   }402
    <site id= "relay-server-2@abc.net" />
  </group>
</root>
```

FIG. 29

```
                    ┌─50
<?xml version= "1.0" encoding= "UTF-8" ?>
-<root>
  -<site id= "relay-server-1@abc.net"  503-1  ⎫
    name= "RELAY SERVER 1" stat= "active" > ⎬ 501-1
    <node div= "software" applkey= "applkey1"  504-1  ⎫
      group= "20070402133100@relay-server-1.abc.net"    ⎬ 502
      id= "client-1@relay-server-1.abc.net"              ⎬ -1
      name= "CLIENT 1" site= "relay-server-1@abc.net" /> ⎭
  </site>        505-1
  -<site id= "relay-server-2@abc.net"  503-2  ⎫
    name= "RELAY SERVER 2" stat= "active" > ⎬ 501-2   504-2
    <node div= "software" applkey= "applkey1, applkey2" ⎫
      group= "20070402133100@relay-server-1.abc.net"    ⎬ 502
      id= "client-2@relay-server-2.abc.net"              ⎬ -2
      name= "CLIENT 2" site= "relay-server-2@abc.net" /> ⎭
  </site>        505-2
</root>
```

FIG. 30

```
                    ┌─60
<?xml version= "1.0" encoding= "UTF-8" ?>
-<root>
   <node div= "software"
     group= "20070402133100@relay-server-1.abc.net"
601 ~ node addr= "192.168.10.2" expr= "1213935960484"
     id= "client-1@relay-server-1.abc.net"        602
     name= "CLIENT 1" pass= "client-1" port= "5070" />
</root>                                        603
```

```
                    ┌─70
<?xml version= "1.0" encoding= "UTF-8" ?>
-<root>
   <node div= "software"
     group= "20070402133100@relay-server-1.abc.net"
701 ~ node addr= "192.168.1.10" expr= "1213935978484"
     id= "client-2@relay-server-2.abc.net"        702
     name= "CLIENT 2" pass= "client-2" port= "5070" />
</root>                                        703
```

```
                                            ┌─51-1
  ┌─────────────────────────────────────────────────────────┐
  │ <?xml version= "1.0" encoding= "UTF-8" ?>               │
  │ -<root>                                                 │
  │  -<site id= "relay-server-1@abc.net"         ⎫          │
  │     name= "RELAY SERVER 1" stat= "active" >  ⎬ 511-1    │
  │     <node div= "software"    ╲513-1          ⎫          │
  │       group= "20070402133100@relay-server-1.abc.net" ⎬ 512-1 │
  │       id= "client-1@relay-server-1.abc.net"  ⎬          │
  │       name= "CLIENT 1" site= "" />           ⎭          │
  │   </site>          ╲515-1                               │
  │ </root>                                                 │
  └─────────────────────────────────────────────────────────┘

┌─51-2
  ┌─────────────────────────────────────────────────────────┐
  │ <?xml version= "1.0" encoding= "UTF-8" ?>               │
  │ -<root>                                                 │
  │  -<site id= "relay-server-2@abc.net"         ⎫          │
  │     name= "RELAY SERVER 2" stat= "active" >  ⎬ 511-2    │
  │     <node div= "software"    ╲513-2          ⎫          │
  │       group= "20070402133100@relay-server-1.abc.net" ⎬ 512-2 │
  │       id= "client-2@relay-server-2.abc.net"  ⎬          │
  │       name= "CLIENT 2" site= "" />           ⎭          │
  │   </site>          ╲515-2                               │
  │ </root>                                                 │
  └─────────────────────────────────────────────────────────┘
```

FIG. 33

```
                                    ┌─42
                                    │
┌──────────────────────────────────────────────────────────────┐
│ <?xml version= "1.0" encoding= "UTF-8" standalone= "no" ?>   │
│ -<root>                                                       │
│  -<group id= "20070402133100@relay-server-1.abc.net"  ⎫      │
│    lastmod= "20070402133100" name= "GROUP 1" >        ⎬ 421  │
│    <site id= "relay-server-1@abc.net" />  ⎫                  │
│    <site id= "relay-server-2@abc.net" />  ⎬ 422              │
│  </group>                                                     │
│ </root>                                                       │
└──────────────────────────────────────────────────────────────┘

┌─52
┌──────────────────────────────────────────────────────────────┐
│ <?xml version= "1.0" encoding= "UTF-8" ?>                    │
│ -<root>                                                       │
│  -<site id= "relay-server-1@abc.net"                  ⎫      │
│    name= "RELAY SERVER 1" stat= "active" >            ⎬ 521-1│
│    <node div= "software"                              ⎫      │
│      group= "20070402133100@relay-server-1.abc.net"   ⎬ 522-1│
│      id= "client-1@relay-server-1.abc.net"            │      │
│      name= "CLIENT 1" site= "" />                     ⎭      │
│  </site>                                                      │
│  -<site id= "relay-server-2@abc.net"                  ⎫      │
│    name= "RELAY SERVER 2" stat= "active" >            ⎬ 521-2│
│    <node div= "software"                              ⎫      │
│      group= "20070402133100@relay-server-1.abc.net"   ⎬ 522-2│
│      id= "client-2@relay-server-2.abc.net"            │      │
│      name= "CLIENT 2" site= "" />                     ⎭      │
│  </site>                                                      │
│ </root>                                                       │
└──────────────────────────────────────────────────────────────┘

┌─62
┌──────────────────────────────────────────────────────────────┐
│ <?xml version= "1.0" encoding= "UTF-8" ?>                    │
│ -<root>                                                       │
│    <node div= "software"                                     │
│      group= "20070402133100@relay-server-1.abc.net"          │
│ 621 ⟿ node addr= "" expr= "0" ⟿ 622                         │
│      id= "client-1@relay-server-1.abc.net"                   │
│      name= "CLIENT 1" pass= "client-1" port= "" />           │
│ </root>                                                ⟍ 623 │
└──────────────────────────────────────────────────────────────┘

┌─72
┌──────────────────────────────────────────────────────────────┐
│ <?xml version= "1.0" encoding= "UTF-8" ?>                    │
│ -<root>                                                       │
│    <node div= "software"                                     │
│      group= "20070402133100@relay-server-1.abc.net"          │
│ 721 ⟿ node addr= "" expr= "0" ⟿ 722                         │
│      id= "client-2@relay-server-2.abc.net"                   │
│      name= "CLIENT 2" pass= "client-2" port= "" />           │
│ </root>                                                ⟍ 723 │
└──────────────────────────────────────────────────────────────┘
```

FIG. 34

```
                                          ┌─42
┌─────────────────────────────────────────────────────────────────┐
│ <?xml version= "1.0" encoding= "UTF-8" standalone= "no" ?>      │
│ -<root>                                                          │
│  -<group id= "20070402133100@relay-server-1.abc.net"            │
│    lastmod= "20070402133100" name= "GROUP 1" >                  │
│    <site id= "relay-server-1@abc.net" />                        │
│    <site id= "relay-server-2@abc.net" />                        │
│  </group>                                                        │
│ </root>                                                          │
└─────────────────────────────────────────────────────────────────┘

┌─53
┌─────────────────────────────────────────────────────────────────┐
│ <?xml version= "1.0" encoding= "UTF-8" ?>                       │
│ -<root>                                                          │
│  -<site id= "relay-server-1@abc.net"                            │
│    name= "RELAY SERVER 1" stat= "active" >                      │
│    <node div= "software" applkey= "applkey1"  ～534-1   ⎫       │
│     group= "20070402133100@relay-server-1.abc.net"       ⎬ 532  │
│     id= "client-1@relay-server-1.abc.net"                ⎪ -1   │
│     name= "CLIENT 1" site= "relay-server-1@abc.net" />  ⎭       │
│   </site>              ～535-1                                  │
│  -<site id= "relay-server-2@abc.net"                            │
│    name= "RELAY SERVER 2" stat= "active" >                      │
│    <node div= "software"  ～533-2                               │
│     group= "20070402133100@relay-server-1.abc.net"              │
│     id= "client-2@relay-server-2.abc.net"                       │
│     name= "CLIENT 2" site= "" />                                │
│   </site>                                                        │
│ </root>                                                          │
└─────────────────────────────────────────────────────────────────┘

┌─63
┌─────────────────────────────────────────────────────────────────┐
│ <?xml version= "1.0" encoding= "UTF-8" ?>                       │
│ -<root>                                                          │
│   <node div= "software"                                          │
│    group= "20070402133100@relay-server-1.abc.net"               │
│ 631 ～ node addr= "192.168.10.2" expr= "1213935960484"          │
│    id= "client-1@relay-server-1.abc.net"   ～632                │
│    name= "CLIENT 1" pass= "client-1" port= "5070" />            │
│ </root>                                   ～633                 │
└─────────────────────────────────────────────────────────────────┘

┌─72
┌─────────────────────────────────────────────────────────────────┐
│ <?xml version= "1.0" encoding= "UTF-8" ?>                       │
│ -<root>                                                          │
│   <node div= "software"                                          │
│    group= "20070402133100@relay-server-1.abc.net"               │
│ 721 ～ node addr= "" expr= "0"                                  │
│    id= "client-2@relay-server-2.abc.net"                        │
│    name= "CLIENT 2" pass= "client-2" port= "" />                │
│ </root>                                   ～723                 │
└─────────────────────────────────────────────────────────────────┘
```

FIG. 35

```
                                          ┌─42
┌────────────────────────────────────────────────────────────────┐
│ <?xml version= "1.0" encoding= "UTF-8" standalone= "no" ?>     │
│ -<root>                                                         │
│  -<group id= "20070402133100@relay-server-1.abc.net"           │
│     lastmod= "20070402133100" name= "GROUP 1" >                │
│    <site id= "relay-server-1@abc.net" />                       │
│    <site id= "relay-server-2@abc.net" />                       │
│  </group>                                                       │
│ </root>                                                         │
└────────────────────────────────────────────────────────────────┘
```

```
                                     ┌─54
┌────────────────────────────────────────────────────────────────┐
│ <?xml version= "1.0" encoding= "UTF-8" ?>                      │
│ -<root>                                                         │
│  -<site id= "relay-server-1@abc.net" ~543-1                    │
│    name= "RELAY SERVER 1" stat= "active" >                     │
│    <node div= "software" applkey= "applkey1"                   │
│      group= "20070402133100@relay-server-1.abc.net"            │
│      id= "client-1@relay-server-1.abc.net"                     │
│      name= "CLIENT 1" site= "relay-server-1@abc.net" />        │
│  </site>                                                        │
│  -<site id= "relay-server-2@abc.net" ~543-2                    │
│    name= "RELAY SERVER 2" stat= "active" >     ~544-2          │
│    <node div= "software" applkey= "applkey1,applkey2"  ┐       │
│      group= "20070402133100@relay-server-1.abc.net"    │542    │
│      id= "client-2@relay-server-2.abc.net"             │-2     │
│      name= "CLIENT 2" site= "relay-server-2@abc.net" />┘       │
│  </site>          ~545-2                                        │
│ </root>                                                         │
└────────────────────────────────────────────────────────────────┘
```

```
                                ┌─63
┌────────────────────────────────────────────────────────────────┐
│ <?xml version= "1.0" encoding= "UTF-8" ?>                      │
│ -<root>                                                         │
│   <node div= "software"                                        │
│     group= "20070402133100@relay-server-1.abc.net"             │
│ 631 ~ node addr= "192.168.10.2" expr= "1213935960484"          │
│     id= "client-1@relay-server-1.abc.net"                      │
│     name= "CLIENT 1" pass= "client-1" port= "5070" />          │
│ </root>                                      ~633              │
└────────────────────────────────────────────────────────────────┘
```

```
                                ┌─74
┌────────────────────────────────────────────────────────────────┐
│ <?xml version= "1.0" encoding= "UTF-8" ?>                      │
│ -<root>                                                         │
│   <node div= "software"                                        │
│     group= "20070402133100@relay-server-1.abc.net"             │
│ 741 ~ node addr= "192.168.1.10" expr= "1213935978484"          │
│     id= "client-2@relay-server-2.abc.net"    ~742              │
│     name= "CLIENT 2" pass= "client-2" port= "5070" />          │
│ </root>                                      ~743              │
└────────────────────────────────────────────────────────────────┘
```

FIG. 36

```
                    ┌40
<?xml version= "1.0" encoding= "UTF-8" standalone= "no" ?>
-<root>
 -<group id= "200704021331OO@relay-server-1.abc.net"  ⎫
    lastmod= "20070402133100" name= "GROUP 1" >       ⎬401
     <site id= "relay-server-1@abc.net" />  ⎫
     <site id= "relay-server-2@abc.net" />  ⎬402
 </group>
</root>
```

FIG. 42

```
                    ┌─50
<?xml version= "1.0" encoding= "UTF-8" ?>
-<root>
  -<site id= "relay-server-1@abc.net"
     name= "RELAY SERVER 1" stat= "active" >  } 501-1
     <node div= "software"      ~503-1
        group= "20070402133100@relay-server-1.abc.net"  } 502
        id= "client-1@relay-server-1.abc.net"           } -1
        name= "CLIENT 1" site= "relay-server-1@abc.net" />
  </site>                        ~504-1
  -<site id= "relay-server-2@abc.net"
     name= "RELAY SERVER 2" stat= "active" >  } 501-2
     <node div= "software"      ~503-2
        group= "20070402133100@relay-server-1.abc.net"  } 502
        id= "client-2@relay-server-2.abc.net"           } -2
        name= "CLIENT 2" site= "relay-server-2@abc.net" />
  </site>                        ~504-2
</root>
```

FIG. 43

```
                    ┌─60
<?xml version= "1.0" encoding= "UTF-8" ?>
-<root>
      <node div= "software"
        group= "20070402133100@relay-server-1.abc.net"
601 ~   node addr= "192.168.10.2" expr= "1213935960484"
        id= "client-1@relay-server-1.abc.net"      ~602
        name= "CLIENT 1" pass= "client-1" port= "5070" />
</root>                                      ~603
```

```
                    ┌─70
<?xml version= "1.0" encoding= "UTF-8" ?>
-<root>
      <node div= "software"
        group= "20070402133100@relay-server-1.abc.net"
701 ~   node addr= "192.168.1.10" expr= "1213935978484"
        id= "client-2@relay-server-2.abc.net"      ~702
        name= "CLIENT 2" pass= "client-2" port= "5070" />
</root>                                      ~703
```

```
                                    ┌─51-1
┌─────────────────────────────────────────────────────────────┐
│ <?xml version= "1.0" encoding= "UTF-8" ?>                   │
│ -<root>                                                     │
│  -<site id= "relay-server-1@abc.net"           ┐            │
│    name= "RELAY SERVER 1" stat= "active" >     │511-1       │
│    <node div= "software"      ─513-1                        │
│      group= "20070402133100@relay-server-1.abc.net" ┐       │
│      id= "client-1@relay-server-1.abc.net"          │512-1  │
│      name= "CLIENT 1" site= "" />                   ┘       │
│  </site>            ─514-1                                  │
│ </root>                                                     │
└─────────────────────────────────────────────────────────────┘

┌─51-2
┌─────────────────────────────────────────────────────────────┐
│ <?xml version= "1.0" encoding= "UTF-8" ?>                   │
│ -<root>                                                     │
│  -<site id= "relay-server-2@abc.net"           ┐            │
│    name= "RELAY SERVER 2" stat= "active" >     │511-2       │
│    <node div= "software"      ─513-2                        │
│      group= "20070402133100@relay-server-1.abc.net" ┐       │
│      id= "client-2@relay-server-2.abc.net"          │512-2  │
│      name= "CLIENT 2" site= "" />                   ┘       │
│  </site>            ─514-2                                  │
│ </root>                                                     │
└─────────────────────────────────────────────────────────────┘
```

FIG. 45

```
┌─ 42
│ <?xml version= "1.0" encoding= "UTF-8" standalone= "no" ?>
│ -<root>
│  -<group id= "20070402133100@relay-server-1.abc.net"     ⎫
│    lastmod= "20070402133100" name= "GROUP 1" >           ⎬ 421
│    <site id= "relay-server-1@abc.net" />  ⎫
│    <site id= "relay-server-2@abc.net" />  ⎬ 422
│  </group>
│ </root>
└─
```

```
┌─ 52
│ <?xml version= "1.0" encoding= "UTF-8" ?>
│ -<root>
│  -<site id= "relay-server-1@abc.net"                         ⎫
│     name= "RELAY SERVER 1" stat= "active" >                  ⎬ 521-1
│     <node div= "software"                                    ⎫
│       group= "20070402133100@relay-server-1.abc.net"         ⎬ 522-1
│       id= "client-1@relay-server-1.abc.net"                  ⎪
│       name= "CLIENT 1" site= "" />                           ⎭
│  </site>
│  -<site id= "relay-server-2@abc.net"                         ⎫
│     name= "RELAY SERVER 2" stat= "active" >                  ⎬ 521-2
│     <node div= "software"                                    ⎫
│       group= "20070402133100@relay-server-1.abc.net"         ⎬ 522-2
│       id= "client-2@relay-server-2.abc.net"                  ⎪
│       name= "CLIENT 2" site= "" />                           ⎭
│  </site>
│ </root>
└─
```

```
┌─ 62
│ <?xml version= "1.0" encoding= "UTF-8" ?>
│ -<root>
│    <node div= "software"
│      group= "20070402133100@relay-server-1.abc.net"
│ 621 ─ node addr= "" expr= "0"  ─ 622
│      id= "client-1@relay-server-1.abc.net"
│      name= "CLIENT 1" pass= "client-1" port= "" />
│ </root>                                        ─ 623
└─
```

```
┌─ 72
│ <?xml version= "1.0" encoding= "UTF-8" ?>
│ -<root>
│    <node div= "software"
│      group= "20070402133100@relay-server-1.abc.net"
│ 721 ─ node addr= "" expr= "0"  ─ 722
│      id= "client-2@relay-server-2.abc.net"
│      name= "CLIENT 2" pass= "client-2" port= "" />
│ </root>                                        ─ 723
└─
```

FIG. 46

```
                                    ┌─42
┌─────────────────────────────────────────────────────────────┐
│ <?xml version= "1.0" encoding= "UTF-8" standalone= "no" ?>  │
│ -<root>                                                      │
│  -<group id= "20070402133100@relay-server-1.abc.net"        │
│    lastmod= "20070402133100" name= "GROUP 1" >              │
│    <site id= "relay-server-1@abc.net" />                    │
│    <site id= "relay-server-2@abc.net" />                    │
│  </group>                                                    │
│ </root>                                                      │
└─────────────────────────────────────────────────────────────┘
                                    ┌─53
┌─────────────────────────────────────────────────────────────┐
│ <?xml version= "1.0" encoding= "UTF-8" ?>                   │
│ -<root>                                                      │
│  -<site id= "relay-server-1@abc.net"                        │
│    name= "RELAY SERVER 1" stat= "active" >                  │
│    <node div= "software"           ⎫                         │
│     group= "20070402133100@relay-server-1.abc.net"  ⎬ 532   │
│     id= "client-1@relay-server-1.abc.net"           ⎭ -1    │
│     name= "CLIENT 1" site= "relay-server-1@abc.net" />      │
│  </site>              ↘534-1                                 │
│  -<site id= "relay-server-2@abc.net"                        │
│    name= "RELAY SERVER 2" stat= "active" >                  │
│    <node div= "software"  ↘533-2                            │
│     group= "20070402133100@relay-server-1.abc.net"          │
│     id= "client-2@relay-server-2.abc.net"                   │
│     name= "CLIENT 2" site= "" />                            │
│  </site>                                                     │
│ </root>                                                      │
└─────────────────────────────────────────────────────────────┘
                                    ┌─63
┌─────────────────────────────────────────────────────────────┐
│ <?xml version= "1.0" encoding= "UTF-8" ?>                   │
│ -<root>                                                      │
│   <node div= "software"                                     │
│    group= "20070402133100@relay-server-1.abc.net"           │
│631 ─ node addr= "192.168.10.2" expr= "12139935960484"       │
│    id= "client-1@relay-server-1.abc.net"     ↘632           │
│    name= "CLIENT 1" pass= "client-1" port= "5070" />        │
│ </root>                                             ↘633    │
└─────────────────────────────────────────────────────────────┘
                                    ┌─72
┌─────────────────────────────────────────────────────────────┐
│ <?xml version= "1.0" encoding= "UTF-8" ?>                   │
│ -<root>                                                      │
│   <node div= "software"                                     │
│    group= "20070402133100@relay-server-1.abc.net"           │
│721 ─ node addr= "" expr= "0"                                 │
│    id= "client-2@relay-server-2.abc.net"                    │
│    name= "CLIENT 2" pass= "client-2" port= "" />            │
│ </root>                                           ↘723      │
└─────────────────────────────────────────────────────────────┘
```

FIG. 47

```
                                            ┌─42
                    ┌────────────────────────┴──────────────────────────┐
                    │ <?xml version= "1.0" encoding= "UTF-8" standalone= "no" ?> │
                    │ -<root>                                           │
                    │  -<group id= "20070402133100@relay-server-1.abc.net" │
                    │    lastmod= "20070402133100" name= "GROUP 1" >    │
                    │    <site id= "relay-server-1@abc.net" />          │
                    │    <site id= "relay-server-2@abc.net" />          │
                    │  </group>                                         │
                    │ </root>                                           │
                    └───────────────────────────────────────────────────┘

┌─54
                    ┌────────────────────────┴──────────────────────────┐
                    │ <?xml version= "1.0" encoding= "UTF-8" ?>         │
                    │ -<root>                                           │
                    │  -<site id= "relay-server-1@abc.net"              │
                    │    name= "RELAY SERVER 1" stat= "active" >        │
                    │    <node div= "software"      ⌒543-1              │
                    │     group= "20070402133100@relay-server-1.abc.net"│
                    │     id= "client-1@relay-server-1.abc.net"         │
                    │     name= "CLIENT 1" site= "relay-server-1@abc.net" /> │
                    │   </site>                                         │
                    │  -<site id= "relay-server-2@abc.net"              │
                    │    name= "RELAY SERVER 2" stat= "active" >        │
                    │    <node div= "software"      ⌒543-2              │⎫
                    │     group= "20070402133100@relay-server-1.abc.net"│⎬ 542
                    │     id= "client-2@relay-server-2.abc.net"         │⎭ -2
                    │     name= "CLIENT 2" site= "relay-server-2@abc.net" />│
                    │   </site>                    ⌒544-2               │
                    │ </root>                                           │
                    └───────────────────────────────────────────────────┘

┌─63
                    ┌────────────────────────┴──────────────────────────┐
                    │ <?xml version= "1.0" encoding= "UTF-8" ?>         │
                    │ -<root>                                           │
                    │   <node div= "software"                           │
                    │    group= "20070402133100@relay-server-1.abc.net" │
              631 ┌──│    node addr= "192.168.10.2" expr= "1213935960484"│
                    │    id= "client-1@relay-server-1.abc.net"          │
                    │    name= "CLIENT 1" pass= "client-1" port= "5070" />│
                    │ </root>                              ⌒633         │
                    └───────────────────────────────────────────────────┘

┌─74
                    ┌────────────────────────┴──────────────────────────┐
                    │ <?xml version= "1.0" encoding= "UTF-8" ?>         │
                    │ -<root>                                           │
                    │   <node div= "software"                           │
                    │    group= "20070402133100@relay-server-1.abc.net" │
              741 ┌──│    node addr= "192.168.1.10" expr= "1213935978484"│
                    │    id= "client-2@relay-server-2.abc.net"  ⌒742    │
                    │    name= "CLIENT 2" pass= "client-2" port= "5070" />│
                    │ </root>                              ⌒743         │
                    └───────────────────────────────────────────────────┘
```

FIG. 48

```
                                           ┌─42
┌──────────────────────────────────────────────────────┐
│ <?xml version= "1.0" encoding= "UTF-8" standalone= "no" ?> │
│ -<root>                                              │
│  -<group id= "20070402133100@relay-server-1.abc.net" │
│     lastmod= "20070402133100" name= "GROUP 1" >      │
│    <site id= "relay-server-1@abc.net" />             │
│    <site id= "relay-server-2@abc.net" />             │
│  </group>                                            │
│ </root>                                              │
└──────────────────────────────────────────────────────┘

┌─55
┌──────────────────────────────────────────────────────┐
│ <?xml version= "1.0" encoding= "UTF-8" ?>            │
│ -<root>                                              │
│  -<site id= "relay-server-1@abc.net"                 │
│      name= "RELAY SERVER 1" stat= "active" >         │
│    <node div= "software"                             │
│      group= "20070402133100@relay-server-1.abc.net"  │
│      id= "client-1@relay-server-1.abc.net"           │
│      name= "CLIENT 1" site= "relay-server-1@abc.net" />│
│  </site>                                             │
│  -<site id= "relay-server-2@abc.net"                 │
│      name= "RELAY SERVER 2" stat= "active" >         │
│    <node div= "software"                             │
│      group= "20070402133100@relay-server-1.abc.net"  │
│      id= "client-2@relay-server-2.abc.net"           │
│      name= "CLIENT 2" site= "relay-server-2@abc.net" />│
│    <node div= "software"                             │
│      group= "20070402133100@relay-server-1.abc.net" } 552-3
│      id= "client-3@relay-server-2.abc.net"           │
│      name= "CLIENT 3" site= "" />                    │
│  </site>                  554-3                      │
│ </root>                                              │
└──────────────────────────────────────────────────────┘
```

FIG. 50

```
                                              ┌─63
     ┌────────────────────────────────────────┴──────────────┐
     │ <?xml version= "1.0" encoding= "UTF-8" ?>              │
     │ -<root>                                                │
     │   <node div= "software"                                │
     │     group= "20070402133100@relay-server-1.abc.net"     │
     │     node addr= "192.168.10.2" expr= "1213935960484"    │
     │     id= "client-1@relay-server-1.abc.net"              │
     │     name= "CLIENT 1" pass= "client-1" port= "5070" />  │
     │ </root>                                                │
     └────────────────────────────────────────────────────────┘

┌─75
     ┌────────────────────────────────────────┴──────────────┐
     │ <?xml version= "1.0" encoding= "UTF-8" ?>              │
     │ -<root>                                                │
     │   <node div= "software"                                │
     │     group= "20070402133100@relay-server-1.abc.net"     │
     │     node addr= "192.168.1.10" expr= "1213935978484"    │
     │     id= "client-2@relay-server-2.abc.net"              │
     │     name= "CLIENT 2" pass= "client-2" port= "5070" />  │
     │   <node div= "software"                                │
     │     group= "20070402133100@relay-server-1.abc.net"     │
751 ─│     node addr= "" expr= "0"  ~752                      │
     │     id= "client-3@relay-server-2.abc.net"              │
     │     name= "CLIENT 3" pass= "client-3" port= "" />      │
     │ </root>                                        ~753    │
     └────────────────────────────────────────────────────────┘
```

FIG. 51

```
                                        ┌─42
┌─────────────────────────────────────────────────────────────┐
│ <?xml version= "1.0" encoding= "UTF-8" standalone= "no" ?>  │
│ -<root>                                                      │
│  -<group id= "20070402133100@relay-server-1.abc.net"        │
│    lastmod= "20070402133100" name= "GROUP 1" >              │
│    <site id= "relay-server-1@abc.net" />                    │
│    <site id= "relay-server-2@abc.net" />                    │
│  </group>                                                    │
│ </root>                                                      │
└─────────────────────────────────────────────────────────────┘

┌─56
┌─────────────────────────────────────────────────────────────┐
│ <?xml version= "1.0" encoding= "UTF-8" ?>                   │
│ -<root>                                                      │
│  -<site id= "relay-server-1@abc.net"                        │
│     name= "RELAY SERVER 1" stat= "active" >                 │
│    <node div= "software"                                    │
│      group= "20070402133100@relay-server-1.abc.net"         │
│      id= "client-1@relay-server-1.abc.net"                  │
│      name= "CLIENT 1" site= "relay-server-1@abc.net" />     │
│  </site>                                                     │
│  -<site id= "relay-server-2@abc.net"                        │
│     name= "RELAY SERVER 2" stat= "active" >                 │
│    <node div= "software"                                    │
│      group= "20070402133100@relay-server-1.abc.net"         │
│      id= "client-2@relay-server-2.abc.net"                  │
│      name= "CLIENT 2" site= "relay-server-2@abc.net" />     │
│    <node div= "software"                           ⎫        │
│      group= "20070402133100@relay-server-1.abc.net" ⎬ 562   │
│      id= "client-3@relay-server-2.abc.net"         ⎪ -3     │
│      name= "CLIENT 3" site= "relay-server-2@abc.net" />⎭    │
│  </site>              ⤹ 564-3                                │
│ </root>                                                      │
└─────────────────────────────────────────────────────────────┘
```

FIG. 52

```
                                            ╭─63
         ┌─────────────────────────────────────────────────────────────┐
         │ <?xml version= "1.0" encoding= "UTF-8" ?>                   │
         │ -<root>                                                     │
         │   <node div= "software"                                     │
         │     group= "20070402133100@relay-server-1.abc.net"          │
         │     node addr= "192.168.10.2" expr= "1213935960484"         │
         │     id= "client-1@relay-server-1.abc.net"                   │
         │     name= "CLIENT 1" pass= "client-1" port= "5070" />       │
         │ </root>                                                     │
         └─────────────────────────────────────────────────────────────┘

╭─76
         ┌─────────────────────────────────────────────────────────────┐
         │ <?xml version= "1.0" encoding= "UTF-8" ?>                   │
         │ -<root>                                                     │
         │   <node div= "software"                                     │
         │     group= "20070402133100@relay-server-1.abc.net"          │
         │     node addr= "192.168.1.10" expr= "1213935978484"         │
         │     id= "client-2@relay-server-2.abc.net"                   │
         │     name= "CLIENT 2" pass= "client-2" port= "5070" />       │
         │   <node div= "software"                                     │
         │     group= "20070402133100@relay-server-1.abc.net"          │
     761 │     node addr= "192.168.1.20" expr= "1213935978490"         │
         │     id= "client-3@relay-server-2.abc.net"      ╲─762        │
         │     name= "CLIENT 3" pass= "client-3" port= "5080" />       │
         │ </root>                                          ╲─763      │
         └─────────────────────────────────────────────────────────────┘
```

FIG. 53

```
                                    ╭─42
┌─────────────────────────────────────────────────────────────────┐
│ <?xml version= "1.0" encoding= "UTF-8" standalone= "no" ?>      │
│ -<root>                                                         │
│   -<group id= "20070402133100@relay-server-1.abc.net"           │
│      lastmod= "20070402133100" name= "GROUP 1" >                │
│     <site id= "relay-server-1@abc.net" />                       │
│     <site id= "relay-server-2@abc.net" />                       │
│   </group>                                                      │
│ </root>                                                         │
└─────────────────────────────────────────────────────────────────┘

╭─57
┌─────────────────────────────────────────────────────────────────┐
│ <?xml version= "1.0" encoding= "UTF-8" ?>                       │
│ -<root>                                                         │
│   -<site id= "relay-server-1@abc.net"                           │
│      name= "RELAY SERVER 1" stat= "active" >                    │
│     <node div= "software"        ~573-1                         │
│       group= "20070402133100@relay-server-1.abc.net"            │
│       id= "client-1@relay-server-1.abc.net"                     │
│       name= "CLIENT 1" site= "relay-server-1@abc.net" />        │
│   </site>                        ~574-1                         │
│   -<site id= "relay-server-2@abc.net"                           │
│      name= "RELAY SERVER 2" stat= "active" >                    │
│     <node div= "software"                          ⎫            │
│       group= "20070402133100@relay-server-1.abc.net" ⎬ 572-2    │
│       id= "client-2@relay-server-2.abc.net"        ⎪            │
│       name= "CLIENT 2" site= "" />                 ⎭            │
│     <node div= "software"        ~574-2                         │
│       group= "20070402133100@relay-server-1.abc.net"            │
│       id= "client-3@relay-server-2.abc.net"                     │
│       name= "CLIENT 3" site= "relay-server-2@abc.net" />        │
│   </site>                        ~574-3                         │
│ </root>                                                         │
└─────────────────────────────────────────────────────────────────┘
```

FIG. 54

```
                                                63
    ┌─────────────────────────────────────────────────┐
    │ <?xml version= "1.0" encoding= "UTF-8" ?>       │
    │ -<root>                                         │
    │   <node div= "software"                         │
    │     group= "20070402133100@relay-server-1.abc.net" │
    │     node addr= "192.168.10.2" expr= "1213935960484" │
    │     id= "client-1@relay-server-1.abc.net"       │
    │     name= "CLIENT 1" pass= "client-1" port= "5070" /> │
    │ </root>                                         │
    └─────────────────────────────────────────────────┘

77
    ┌─────────────────────────────────────────────────┐
    │ <?xml version= "1.0" encoding= "UTF-8" ?>       │
    │ -<root>                                         │
    │   <node div= "software"                         │
    │     group= "20070402133100@relay-server-1.abc.net" │
771 │     node addr= "" expr= "0"  ~772               │
    │     id= "client-2@relay-server-2.abc.net"       │
    │     name= "CLIENT 2" pass= "client-2" port= "" /> │
    │   <node div= "software"                   773   │
    │     group= "20070402133100@relay-server-1.abc.net" │
    │     node addr= "192.168.1.20" expr= "1213935978490" │
    │     id= "client-3@relay-server-2.abc.net"       │
    │     name= "CLIENT 3" pass= "client-3" port= "5080" /> │
    │ </root>                                         │
    └─────────────────────────────────────────────────┘
```

FIG. 55

RELAY SERVER AND RELAY COMMUNICATION SYSTEM

BACKGROUND OF THE INVENTION

1. Field of the Invention

The present invention relates to a relay server and a relay communication system, which enable a client terminal connected to a remote local area network (LAN) to communicate beyond a wide area network (WAN).

2. Description of the Related Art

Client terminals connected to remote LANs sometimes communicate with one another beyond a WAN. The virtual private network (VPN) can construct a network that appears as if the remote LANs were directly connected to each other. However, it is difficult for the VPN to construct a network having expandability and flexibility.

A relay communication system disclosed in Japanese Patent Laid-Open Publication No. 2008-129991 can construct a network that appears as if the remote LANs are directly connected to one another in a similar way to the VPN. Then, unlike the VPN, it is easy for the relay communication system to construct the network having expandability and flexibility.

The relay communication system includes a WAN and a plurality of LANs. Each of the LANs includes a relay server. Each relay server stores relay group information regarding relay servers provided in the relay communication system and shared resource information regarding resources shared in the relay communication system.

When a client terminal connected to one of the LANs manipulates resources stored by client terminals of other LANs, the relay servers connected to these LANS relay the manipulation for the resources based on the relay group information and the shared resource information.

The number of LANs provided in the relay communication system may sometimes be increased or reduced. The resources shared in the relay communication system may sometimes be updated. However, the relay communication system can update the relay group information and the shared resource information in response to these changes. Then, the relay communication system can construct the network having expandability and flexibility in response to these changes.

In the relay communication system disclosed in Japanese Patent Laid-Open Publication No. 2008-129991, a change may occur in the number of LANs and client terminals, and in the connection state between the LANs and the client terminals. However, Japanese Patent Laid-Open Publication No. 2008-129991 does not disclose the specific means for confirming in real time such changes in the number and the connection state of the LANs and the client terminals in the event that the client terminals and the relay servers designate destinations for communication. Moreover, Japanese Patent Laid-Open Publication No. 2008-129991 does not disclose any specific means capable of dynamically allocating virtual IP (internet protocol) addresses to the client terminals and the relay servers even if changes in the number and the connection state of the client terminals and the relay servers occur.

SUMMARY OF THE INVENTION

In consideration of the foregoing problems, a preferred embodiment of the present invention provides an apparatus and method that confirm in real time changes in the number and the connection state of the client terminals and the relay servers in the event that the apparatuses designate the destinations for communication in the relay communication system that allows the client terminals connected to the remote LANs to communicate with one another beyond the WAN. In addition, a preferred embodiment of the present invention provides an apparatus and method that dynamically allocate the virtual IP addresses to the client terminals and the relay servers even if changes in the number and the connection state of the client terminals and the relay servers occur.

In the relay communication system disclosed in Japanese Patent Laid-Open Publication No. 2008-129991, a change may occur in the number of LANs and client terminals and the connection state between the LANs and the client terminals. However, Japanese Patent Laid-Open Publication No. 2008-129991 does not disclose any specific means for confirming in real time such changes in the number and a connection state of the client terminals and relay servers in the event that they designate the destinations for communication. Moreover, activation states of applications stored in the client terminals and the relay servers may be changed. However, Japanese Patent Laid-Open Publication No. 2008-129991 does not disclose any specific means for confirming in real time the activation states of the applications stored in the client terminals and the relay servers in the event that the apparatuses designate the destinations for communication.

In this connection, in consideration of the foregoing problems, a preferred embodiment of the present invention provides an apparatus and method that confirm in real time changes in the number and the connection state of the client terminals and the relay servers in the event that the apparatuses designate the destinations for communication in the relay communication system that allows the client terminals connected to the remote LANs to communicate with one another beyond the WAN.

Another preferred embodiment of the present invention provides a specific device to confirm in real time the activation states of the applications stored in the client terminals and the relay servers in the event that the apparatuses designate the destinations for communication.

A relay communication system according to a preferred embodiment of the present invention a first network, a second network, a first relay server connected to the first network, and a second relay server connected to the second network. Each of the first relay server and the second relay server includes a relay group information creation unit that creates relay group information. The relay group information indicates a relay group including the first relay server and the second relay server, and virtual network addresses for use in the relay group. The first relay server includes a first relay server information creation unit that creates first relay server information. The first relay server information includes a first relay server activation information indicating an activation state of the first relay server, and a first client terminal registration information regarding a first client terminal connected to the first network, the first client terminal registration information including a connection state between the first relay server and the first client terminal which is registered in the first relay server. The second relay server includes a second relay server information creation unit that creates a second relay server information. The second relay server information includes a second relay server activation information indicating an activation state of the second relay server, and second client terminal registration information regarding a second client terminal connected to the second network, the second client terminal registration information including a connection state between the second relay server and the second client terminal which is registered in the second relay server. Each of the first relay server and the second relay server includes an inter-relay server sharing unit, and a virtual address management unit. The inter-relay server sharing unit shares the relay group information and relay server information including the first relay server information and the second relay server information between the first relay server and the second relay server. The virtual address management unit dynamically assigns virtual network addresses, which are managed so as to become unique with respect to each other in the relay group, to the first client terminal and the second client terminal at predetermined time, and registers information on the assigned virtual network addresses in the relay server information. The first relay server includes a first client terminal-oriented sharing unit that shares the relay group information and the relay server information between the first relay server and the first client terminal. The second relay server includes a second client terminal-oriented sharing unit that shares the relay group information and the relay server information between the second relay server and the second client terminal. The first relay server includes a communication execution unit that, based on the relay group information and the relay server information, performs communication, which is relayed by the first relay server, and in which the virtual network address of the second network, which is selected based on the relay group information and the relay server information, is designated as a destination for communication.

The relay group information preferably includes relay server connection establishment information indicating whether or not the first relay server and the second relay server have an established connection there between. The first relay server information includes a first client terminal connection establishment information indicating whether or not the first client terminal has established a connection with the first relay server. The second relay server information includes a second client terminal connection establishment information indicating whether or not the second client terminal has established a connection with the second relay server.

Each of the first relay server and the first client terminal preferably includes a map display unit that, based on the relay group information and the relay server information, displays a map visually representing a connection establishment status and the virtual addresses in the relay group.

A relay server according to another preferred embodiment of the present invention is a relay server for communicating with a first relay server connected to a first network, and functions as a second relay server connected to a second network. The relay server includes a relay group information creation unit, an inter-relay server sharing unit, and a client terminal-oriented sharing unit. The relay group information creation unit creates a relay group information indicating that the first relay server and the second relay server constitute a relay group. The inter-relay server sharing unit shares a relay server information and a relay group information between the first relay server and the second relay server. The relay server information includes a first relay server information, and a second relay server information. The first relay server information is created by the first relay server, and includes a first relay server activation information indicating an activation state of the first relay server, a first client terminal registration information regarding a first client terminal connected to the first network, including a connection state between the first relay server and the first client terminal which is registered in the first relay server, and a first application activation information indicating an activation state of a first application stored in one of the first relay server and the first client terminal. The second relay server information is created by the second relay server, and includes a second relay server activation information indicating an activation state of the second relay server, a second client terminal registration information regarding a second client terminal connected to the second network, including a connection state between the second relay server and the second client terminal which is registered in the second relay server, and a second application activation information indicating an activation state of a second application which sends the data to and receives the data from the first application, the second application being stored in one of the second relay server and the second client terminal. The client terminal-oriented sharing unit shares the relay group information and the relay server information between the second relay server and the second client terminal.

The relay server preferably further includes a communication execution unit that performs communication, which is relayed by the second relay server, with the first application selected based on the relay group information and the relay server information.

The relay server also preferably further includes an activation information update unit that updates the relay server information by updating the first application activation information and the second application activation information in response to changes in the respective activation states of the first application and the second application. The inter-relay server sharing unit shares the updated relay server information between the first relay server and the second relay server.

A relay communication system according to another preferred embodiment of the present invention includes a first network, a second network, a first relay server connected to the first network, and a second relay server connected to the second network. Each of the first relay server and the second relay server includes a relay group information creation unit that creates relay group information indicating that the first relay server and the second relay server constitute a relay group. The first relay server includes a first relay server information creation unit that creates a first relay server information. The first relay server information includes a first relay server activation information indicating an activation state of the first relay server, a first client terminal registration information regarding a first client terminal connected to the first network, which is registered in the first relay server and including a connection state between the first relay server and the first client terminal, and activation information of a first application stored in the first relay server or the first client terminal. The second relay server includes a second relay server information creation unit that creates a second relay server information. The second relay server information includes second relay server activation information indicating an activation state of the second relay server, second client terminal registration information regarding a second client terminal connected to the second network, which is registered in the second relay server and including a connection state between the second relay server and the second client terminal, and an activation information of a second application stored in one of the second relay server and the second client terminal. Each of the first relay server and the second relay server includes an inter-relay server sharing unit that shares the relay group information and relay server information including the first relay server information and the second relay server information between the first relay server and the second relay server. The first relay server includes a first client terminal-oriented sharing unit that shares the relay group information and the relay server information between the first relay server and the first client terminal. The second relay server includes a second client terminal-oriented sharing unit that shares the relay group information and the relay server information between the second relay server and the second client terminal.

The first relay server preferably includes a communication execution unit that performs communication, which is relayed by the first relay server, with the second application selected based on the relay group information and the relay server information.

Each of the first relay server and the second relay server preferably includes an activation information update unit that updates the relay server information by updating the first application activation information and the second application activation information in response to changes in the respective activation states of the first application and the second application. The inter-relay server sharing unit shares the updated relay server information between the first relay server and the second relay server.

The first (second) relay server information can include the information as to whether or not the communication is possible between the first (second) relay server and the first (second) client terminal. The first (second) relay server information can include the information as to whether or not the first (second) application of the terminal connected to the first (second) network is capable of executing communication. The respective apparatuses in the relay communication system can share the information regarding changes in the number and the connection state of the apparatuses. The respective apparatuses in the relay communication system can share the information regarding the activation states of the applications. The respective apparatuses in the relay communication system can select the applications of the client terminal and the relay server, which are opposite parties with which the data transmission/reception is executed, based on changes in the number and the connection state of the apparatuses.

A relay server according to another preferred embodiment of the present invention is capable of communicating with a first relay server connected to a first network, and functions as a second relay server connected to a second network. The relay server includes a relay group information creation unit, an inter-relay server sharing unit, and a client terminal-oriented sharing unit. The relay group information creation unit creates a relay group information indicating that the first relay server and the second relay server constitute a relay group. The inter-relay server sharing unit shares relay server information and relay group information between the first relay server and the second relay server. The relay server information includes a first relay server information, and a second relay server information. The first relay server information is created by the first relay server, and includes a first relay server activation information indicating an activation state of the first relay server, and a first client terminal registration information regarding a first client terminal connected to the first network, including a connection state between the first relay server and the first client terminal which is registered in the first relay server. The second relay server information is created by the second relay server, and includes a second relay server activation information indicating an activation state of the second relay server, and a second client terminal registration information regarding a second client terminal connected to the second network, including a connection state between the second relay server and the second client terminal which is registered in the second relay server. The client terminal-oriented sharing unit shares the relay group information and the relay server information between the second relay server and the second client terminal.

The relay server preferably further includes a client terminal information holding unit that holds a second client terminal information including a communication setting information regarding the second client terminal, which is used in communication between the second relay server and the second client terminal.

The relay server also preferably further includes a relay server activation information update unit; and a client terminal connection state update unit. The relay server activation information update unit updates the relay server information by updating the first relay server activation information and the second relay server activation information in response to changes in the respective activation states of the first relay server and the second relay server. The client terminal connection state update unit updates the relay server information by updating the second client terminal registration information in response to a change in the connection state between the second relay server and the second client terminal. The inter-relay server sharing unit shares the updated relay server information between the first relay server and the second relay server.

The relay server preferably further includes a relay group information update unit; and a client terminal registration state update unit. The relay group information update unit updates the relay group information in response to a change in a configuration of the relay group. The client terminal registration state update unit updates the relay server information by updating the second client terminal registration information in response to a change in a registration state of the second client terminal in the second relay server. The inter-relay server sharing unit shares the updated relay group information and relay server information between the first relay server and the second relay server. The client terminal-oriented sharing unit shares the updated relay group information and relay server information between the second relay server and the second client terminal.

The relay server may also preferably further include a data communication execution unit that performs data communication in which the second relay server is involved, which is performed with a destination for the communication in the first network, which is selected based on the relay group information and the relay server information. The data communication is at least one of block unit communication for performing the data communication in units of block without maintaining connection; and continuous communication for continuously performing the data communication while maintaining the connection.

A relay communication system according a further preferred embodiment of the present invention includes a first network; a second network; a first relay server connected to the first network; and a second relay server connected to the second network. Each of the first relay server and the second relay server includes a relay group information creation unit that creates a relay group information indicating that the first relay server and the second relay server constitute a relay group. The first relay server includes a first relay server information creation unit that creates a first relay server information. The first relay server information includes a first relay server activation information indicating an activation state of the first relay server and a first client terminal registration information regarding a first client terminal connected to the first network, the first client terminal registration information including a connection state between the first relay server and the first client terminal registered in the first relay server. The second relay server includes a second relay server information creation unit that creates second relay server information. The second relay server information includes second relay server activation information indicating an activation state of the second relay server, and a second client terminal registration information regarding a second client terminal connected to the second network, the second client terminal registration information including a connection state between the second relay server and the second client terminal which is registered in the second relay server. Each of the first relay server and the second relay server includes an inter-relay server sharing unit that shares the relay group information and relay server information including the first relay server information and the second relay server information between the first relay server and the second relay server. The first relay server includes a first client terminal-oriented sharing unit that shares the relay group information and the relay server information between the first relay server and the first client terminal. The second relay server includes a second client terminal-oriented sharing unit that shares the relay group information and the relay server information between the second relay server and the second client terminal.

In the relay communication system, the first relay server preferably includes a first client terminal information holding unit that holds a first client terminal information. The first client terminal information includes communication setting information regarding the first client terminal, which is used in communication between the first relay server and the first client terminal. The second relay server includes a second client terminal information holding unit that holds second client terminal information. The second client terminal information includes a communication setting information regarding the second client terminal, which is used in communication between the second relay server and the second client terminal.

In the relay communication system, each of the first relay server and the second relay server preferably includes a relay server activation information update unit, and a client terminal connection state update unit. The relay server activation information update unit updates the relay server information by updating the first relay server activation information and the second relay server activation information in response to changes in the respective activation states of the first relay server and the second relay server. The client terminal connection state update unit updates the relay server information by updating the first client terminal registration information in response to a change in the connection state between the first relay server and the first client terminal. The inter-relay server sharing unit shares the updated relay server information between the first relay server and the second relay server.

In the relay communication system, the relay group preferably includes a plurality of relay servers including the first relay server and the second relay server. The relay server information includes a plurality of individual relay server information created by the respective relay servers and includes the first relay server information and the second relay server information. Each of the first relay server and the second relay server includes a relay group information update unit, an individual relay server information update unit, and a client terminal registration state update unit. The relay group information update unit updates the relay group information in response to a change in a configuration of the relay group. The individual relay server information update unit updates the relay server information by updating any of the plurality of individual relay server information in response to a change in a configuration of the relay group. The client terminal registration state update unit updates the relay server information by updating the first client terminal registration information in response to a change in a registration state of the first client terminal in the first relay server. The inter-relay server sharing unit shares the updated relay group information and relay server information among the plurality of relay servers constituting the relay group with the changed configuration. The first client terminal-oriented sharing unit shares the updated relay group information and relay server information between the first relay server and the first client terminal.

In the relay communication system, the first relay server preferably includes a data communication execution unit that performs data communication in which the first relay server is involved, which is performed with a destination for the communication in the second network, which is selected based on the relay group information and the relay server information. The data communication preferably is at least one of: block unit communication that performs the data communication in units of block without maintaining connection; and continuous communication that continuously executes the data communication while maintaining the connection.

A relay communication system according to a preferred embodiment of the present invention includes the first network, and the second network. The first network includes the first relay server and the first client terminal. The second network includes the second relay server and the second client terminal. The first relay server and the second relay server relay the communication between the first client terminal and the second client terminal.

The first (second) relay server creates the relay group information, the first (second) relay server information, and the client terminal information. The relay group information is the information indicating the relay group constituted by the first relay server and the second relay server, the virtual network addresses allocated to the first relay server and the second relay server, and as to whether or not the first relay server and the second relay server have established the connection therebetween. The first (second) relay server information is the information indicating the first (second) client terminal capable of communicating with the first (second) relay server, the virtual network address allocated to the first (second) client terminal, and as to whether or the first (second) client terminal has established the connection. The client terminal information is the information indicating the connection environment of the first (second) client terminal in the first (second) network.

The first (second) relay server refers to the relay group information, and thereby can share the first relay server information and the second relay server information between the first relay server and the second relay server. The first (second) relay server can synthesize the first relay server information and the second relay server information with each other, and can create the relay server information. The first (second) relay server refers to the client terminal information of each thereof, and thereby can share the relay group information and the relay server information between the first (second) relay server and the first (second) client terminal.

The respective apparatuses in the relay communication system can share the information regarding changes in the number and the connection state of the apparatuses in real time. The respective apparatuses in the relay communication system can share the information regarding the virtual network addresses and connection establishment of the apparatuses in real time. The apparatuses in the relay communication system can flexibly execute the communication, in which the virtual network addresses are designated as the destinations for communication, in response to the change in the state of the relay communication system.

A relay communication system according to another preferred embodiment of the present invention includes the first network, and the second network. The first network includes the first relay server and the first client terminal. The terminal connected to the first network includes the first application. The second network includes the second relay server and the second client terminal. The terminal connected to the second network includes the second application. The first relay server and the second relay server relay the communication between the first application and the second application.

The first (second) relay server creates the relay group information, the first (second) relay server information, and the client terminal information. The relay group information is the information indicating that the first relay server and the second relay server constitute the relay group. The first (second) relay server information is the information indicating the first (second) client terminal capable of communicating with the first (second) relay server, and in addition, is the information indicating the first (second) application. The client terminal information is the information indicating the connection environment of the first (second) client terminal in the first (second) network.

The first (second) relay server refers to the relay group information, and thereby can share the first relay server information and the second relay server information between the first relay server and the second relay server. The first (second) relay server refers to the client terminal information of each thereof, and thereby can share the relay group information and the relay server information between the first (second) relay server and the first (second) client terminal.

A relay communication system according to a further preferred embodiment of the present invention includes the first network, and the second network. The first network includes the first relay server and the first client terminal. The second network includes the second relay server and the second client terminal. The first relay server and the second relay server relay the communication between the first client terminal and the second client terminal.

The first (second) relay server creates the relay group information, the first (second) relay server information, and the first (second) client terminal information. The relay group information is the information indicating that the first relay server and the second relay server constitute the relay group. The first (second) relay server information is the information indicating the first (second) client terminal capable of communicating with the first (second) relay server. The first (second) client terminal information includes the information indicating the connection environment of the first (second) client terminal in the first (second) network.

The first (second) relay server refers to the relay group information, and thereby can share the information including the first relay server information and the second relay server information between the first relay server and the second relay server. The first (second) relay server refers to the client terminal information of each thereof, and thereby can share the relay group information and the relay server information between the first (second) relay server and the first (second) client terminal.

The first (second) relay server information can include the information as to whether or not the communication is possible between the first (second) relay server and the first (second) client terminal. The respective apparatuses in the relay communication system can share the information regarding changes in the number and the connection state of the apparatuses. The respective apparatuses in the relay communication system can select the communication destinations, with which the data transmission/reception in units of block or the continuous data transmission/reception is executed, based on the information regarding changes in the number and the connection state of the apparatuses.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a view showing a specific example of relay server information in the First Preferred Embodiment of the present invention.

FIG. 6 is a view showing a specific example of client terminal information in the First Preferred Embodiment of the present invention.

FIG. 10 is a view showing information stored after Step S5 in the First Preferred Embodiment of the present invention.

FIG. 11 is a view showing a relay group map displayed after Step S5 in the First Preferred Embodiment of the present invention.

FIG. 12 is a view showing information stored after Step S4 in the First Preferred Embodiment of the present invention.

FIG. 14 is a view showing information stored after Step S6 in the First Preferred Embodiment of the present invention.

FIG. 16 is a view showing information stored after Step S9 in the First Preferred Embodiment of the present invention.

FIG. 18 is a view showing information stored after Step S13 in the First Preferred Embodiment of the present invention.

FIG. 20 is a view showing information stored after Step S17 in the First Preferred Embodiment of the present invention.

FIG. 22 is a view showing information stored after Step S21 in the First Preferred Embodiment of the present invention.

FIG. 29 is a view showing a specific example of relay server information in the Second Preferred Embodiment of the present invention.

FIG. 30 is a view showing a specific example of the client terminal in the Second Preferred Embodiment of the present invention.

FIG. 33 is a view showing information stored after Step S2 in the Second Preferred Embodiment of the present invention.

FIG. 34 is a view showing information stored after Step S4 in the Second Preferred Embodiment of the present invention.

FIG. 35 is a view showing information stored after Step S10 in the Second Preferred Embodiment of the present invention.

FIG. 36 is a view showing information stored after Step S14 in the Second Preferred Embodiment of the present invention.

FIG. 42 is a view showing a specific example of relay server information in the Third Preferred Embodiment of the present invention.

FIG. 43 is a view showing a specific example of client terminal information in the Third Preferred Embodiment of the present invention.

FIG. 45 is a view showing information stored after Step S2 in the Third Preferred Embodiment of the present invention.

FIG. 46 is a view showing information stored after Step S4 in the Third Preferred Embodiment of the present invention.

FIG. 47 is a view showing information stored after Step S7 in the Third Preferred Embodiment of the present invention.

FIG. 48 is a view showing information stored after Step S11 in the Third Preferred Embodiment of the present invention.

FIG. 50 is a view showing information stored after Step S25 in the Third Preferred Embodiment of the present invention.

FIG. 51 is a view showing information stored after Step S25 in the Third Preferred Embodiment of the present invention.

FIG. 52 is a view showing information stored after Step S29 in the Third Preferred Embodiment of the present invention.

FIG. 53 is a view showing information stored after Step S29 in the Third Preferred Embodiment of the present invention.

FIG. 54 is a view showing information stored after Step S32 in the Third Preferred Embodiment of the present invention.

FIG. 55 is a view showing information stored after Step S32 in the Third Preferred Embodiment of the present invention.

DETAILED DESCRIPTION OF THE PREFERRED EMBODIMENTS

Figure 1:
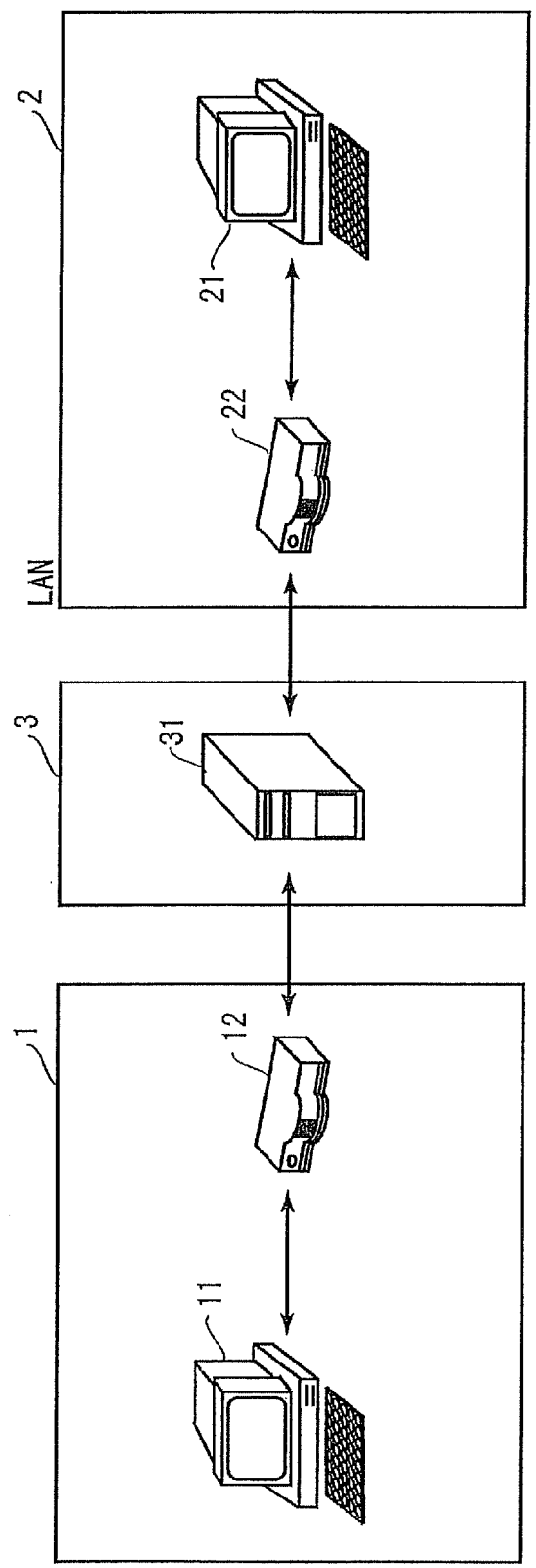
FIG. 1 is a view showing an overall configuration of a relay communication system in a First Preferred Embodiment of the present invention.

First Preferred Embodiment (1) Overall Configuration of Relay Communication System A description will be made below of preferred embodiments of the present invention with reference to the drawings. FIG. 1 is a view showing an overall configuration of a relay communication system. The relay communication system includes a LANs 1 and 2 and a WAN 3. The LANs 1 and 2 are small-scale networks constructed remotely from each other. The WAN 3 is a large-scale network such as the Internet.

The LAN 1 includes a client terminal 11 and a relay server 12. The LAN 2 includes a client terminal 21 and a relay server 22. The WAN 3 includes a SIP (Session Initiation Protocol) server 31.

The client terminals 11 and 21 preferably are personal computers and the like, for example. The relay servers 12 and 22 relay communication between the client terminals 11 and 21. The SIP server 31 relays communication between the relay servers 12 and 22.

In the present preferred embodiment, the SIP is preferably used as a communication protocol between the relay servers 12 and 22; however, protocols other than the SIP may be used. In the case of using protocols other than the SIP, the communication between the relay servers 12 and 22 may be directly executed.

(2) Constituent Elements of Relay Server

Figure 2:
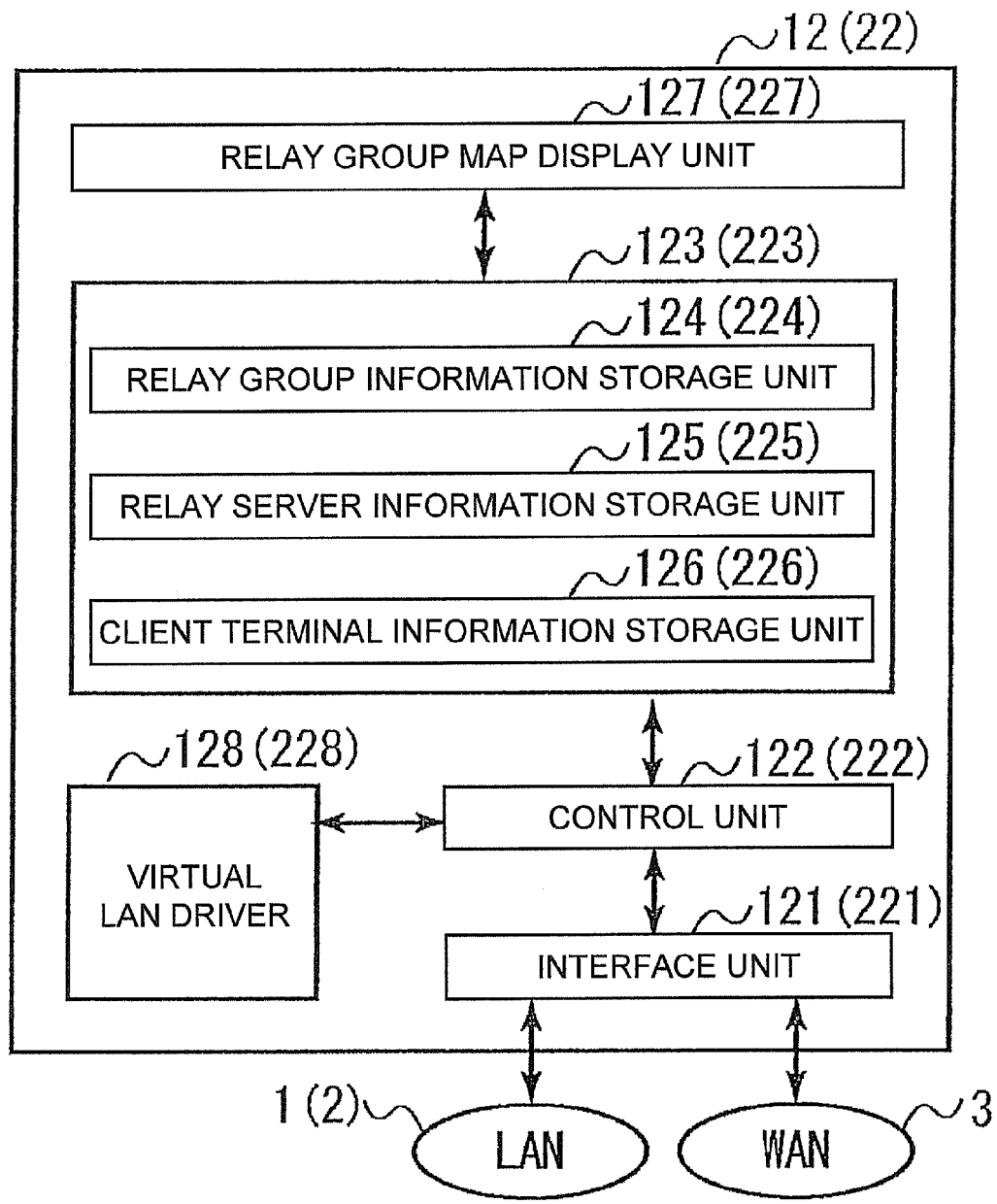
FIG. 2 is a view showing constituent elements of a relay server in the First Preferred Embodiment of the present invention.

FIG. 2 is a view showing constituent elements of the relay server 12(22). The relay server 12(22) includes an interface unit 121(221), a control unit 122(222), a database storage unit 123(223), a relay group map display unit 127(227), and a virtual LAN driver 128(228). Reference numerals not parenthesized are reference numerals for the relay server 12. Reference numerals parenthesized are reference numerals for the relay server 22.

The interface unit 121(221) performs communication with the client terminal 11(21), which is connected to the LAN 1(2), through a private IP address. The interface unit 121(221) performs communication with the SIP server 31, which is connected to the WAN 3, through a global IP address.

The control unit 122(222) performs control for relaying the communication between the client terminals 11 and 21. The control unit 122(222) creates or updates the information (to be described below) stored in the database storage unit 123 (223).

The database storage unit 123(223) includes a relay group information storage unit 124(224), a relay server information storage unit 125(225), and a client terminal information storage unit 126(226). The relay group map display unit 127(227) displays a relay group map on the relay server 12(22) by referring to relay group information and relay server information. The virtual LAN driver 128(228) registers a virtual private IP address of the relay server 12(22), which is virtually allocated in the relay communication system. A description will be made later of a method for allocating the virtual private IP addresses to the respective relay servers in the relay communication system. Moreover, a description will be also made later of specific examples of the above-mentioned information and the relay group map.

(3) Constituent Elements of Client Server

Figures 3, 4:
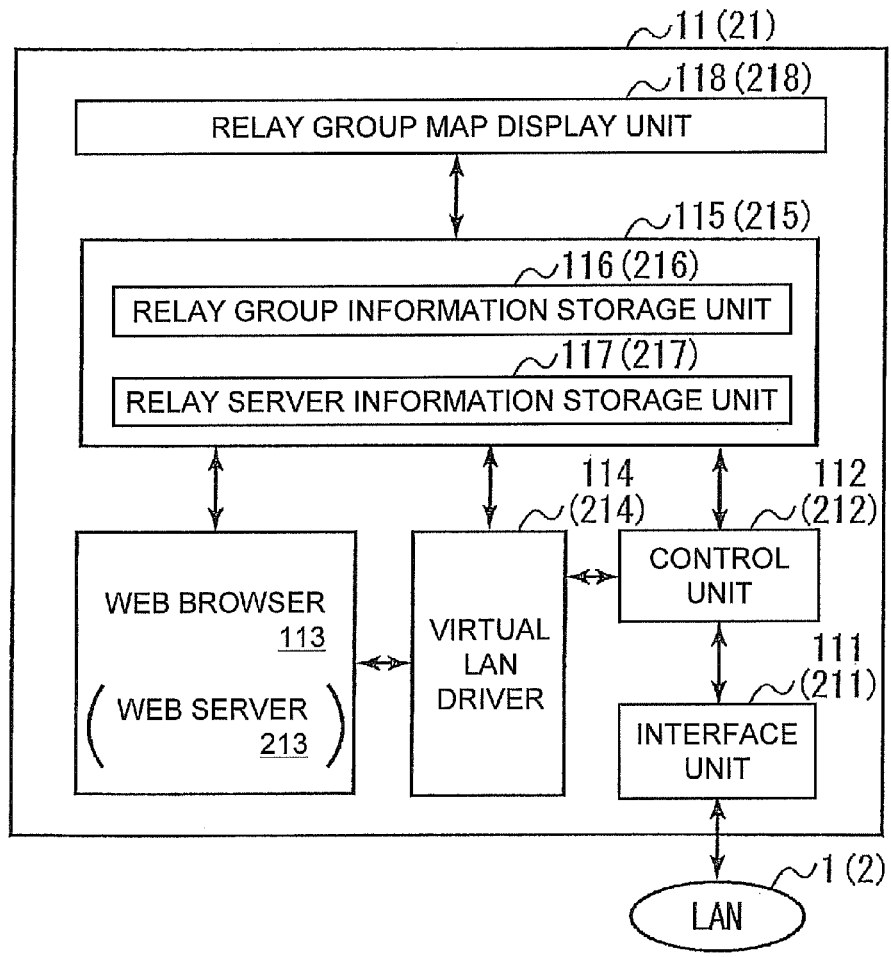
FIG. 3 is a view showing constituent elements of a client terminal in the First Preferred Embodiment of the present invention.
FIG. 4 is a view showing a specific example of relay group information in the First Preferred Embodiment of the present invention.

FIG. 3 is a view showing constituent elements of the client terminal 11(21). The client terminal 11(21) includes an interface unit 111(211), a control unit 112(212), a web browser 113 (web server 213), a virtual LAN driver 114(214), a database storage unit 115(215), and a relay group map display unit 118(218). Reference numerals not parenthesized are reference numerals for the client terminal 11. Reference numerals parenthesized are reference numerals for the client terminal 21.

The interface unit 111(211) performs communication with the relay server 12(22) connected to the LAN 1(2) through a private IP address.

The control unit 112(212) performs control for performing communication between the client terminal 11(21) and the relay server 12(22).

The control unit 112(212) inputs or outputs information to be processed by the web browser 113 (web server 213). The web browser 113 requests a content from the web server 213 through the WAN 3. The web server 213 provides the content to the web browser 113 through the WAN 3.

The virtual LAN driver 114(214) registers the virtual private IP address of the client terminal 11(21), which is virtually allocated in the relay communication system. A description will be made later of a method for allocating the virtual private IP addresses to the respective client terminals in the relay communication system.

The control unit 112(212) creates or updates the information (to be described below) stored in the database storage unit 115(215). The database storage unit 115(215) includes a relay group information storage unit 116(216) and a relay server information storage unit 117(217). The relay group map display unit 118(218) displays the relay group map on the client terminal 11(21) by referring to the relay group information and the relay server information. A description will be made later of the above-mentioned information and the relay group map.

(4) Specific Example of Relay Group Information

FIG. 4 is a view showing a relay group information 40 as a specific example of the relay group information. The relay group information is an information indicating outlines of the relay servers which constitute the relay communication system.

The relay group information 40 includes upper information 401 and lower information 402. The upper information 401 includes relay group virtual address information 403. The lower information 402 includes relay server virtual address information 404 and connection establishment information 405.

Upper information 401 is information regarding the relay group, which is an upper level. "id" indicates identification information of the relay group. "lastmod" indicates the latest update time of the relay group information. "name" indicates the name of the relay group. The relay group virtual address information 403 indicates the virtual private IP address (network address) of the relay group, which is virtually allocated in the relay communication system. In the relay communication system, a subnet mask is set at "255.255.255.0", and "*" is uniquely set for each of the apparatuses.

The lower information 402 is information regarding the relay server, which is a lower level. "id" indicates identification information of the relay server. The relay server virtual address information 404 indicates the virtual private IP address of the relay server, which is virtually allocated in the relay communication system. The connection establishment information 405 is information indicating whether or not a connection has been established between the respective relay servers, with the WAN 3 interposed in between.

The relay group information 40 is stored in the relay group information storage units 124, 224, 116 and 216. Specifically, the relay group information 40 is shared between the relay servers 12 and 22 and the client terminals 11 and 21.

When the connection for the IP communication using the virtual addresses is established between the relay servers via the WAN 3, it is described in the connection establishment information 405. When the connection for the IP communication using the virtual addresses is not established between the relay servers via the WAN 3, nothing is described in the connection establishment information 405. In such a way, the information as to whether the connection for the IP communication using the virtual addresses is established between the relay servers via the WAN 3 is shared in the whole relay communication system. Moreover, information regarding the virtual private IP addresses of the relay servers is shared in the whole relay communication system.

(5) Specific Example of Relay Server Information

FIG. 5 is a view showing a relay server information 50 as a specific example of the relay server information. The relay server information is an information indicating details of the relay servers which constitute the relay communication system, and is an information indicating outlines of the client terminals that constitute the relay communication system.

The relay server information 50 includes upper information 501-1 and 501-2 and lower information 502-1 and 502-2. The upper information 501-1 and 501-2 include relay server activation information 503-1 and 503-2, respectively. The lower information 502-1 and 502-2, respectively, include client terminal virtual address information 504-1 and 504-2, connection establishment information 505-1 and 505-2, and client terminal site information 506-1 and 506-2 indicating whether or not the client terminals are logged in to the relay servers.

The upper information 501-1 and 501-2 are information regarding the relay servers, which are the upper level. "id" indicates identification information of the relay server. "name" indicates the names of the relay servers. The relay server activation information 503-1 and 503-2 are information as to whether the relay servers are activated.

The lower information 502-1 and 502-2 are information regarding the client terminals, which are the lower level. "div" indicates the name of a division to which the client terminals belong. "group" indicates identification information of the relay group to which the client terminals belong. "id" indicates identification information of the client terminals. "name" indicates the names of the client terminals.

The client terminal virtual address information 504-1 and 504-2 indicate the virtual private IP addresses of the client terminals, which are virtually allocated in the relay communication system. The connection establishment information 505-1 and 505-2 are information as to whether the connections for the IP communication using the virtual addresses have been established between the client terminals and the relay servers in the same LANs. The client terminal site information 506-1 and 506-2 indicate the identification information of the relay servers to which the client terminals have logged in.

The relay server information 50 is stored in the relay server information storage units 125, 225, 117 and 217. Specifically, the relay server information 50 is shared between the relay servers 12 and 22 and the client terminals 11 and 21.

When the relay servers are activated, the relay server activation information 503-1 and 503-2 become "active". When the relay servers are not activated, the relay server activation information 503-1 and 503-2 are blank. In such a way, the information as to whether or not the relay servers are activated is shared in the whole relay communication system.

When the client terminals are logged on to the relay servers, it is described in the client terminal site information 506-1 and 506-2. When the client terminals are not logged on to the relay servers, nothing is described in the client terminal site information 506-1 and 506-2. In such a way, the information as to whether or not the client terminals are logged on to the relay servers is shared in the whole relay communication system.

When the connections for the IP communication using the virtual addresses are established between the client terminals and the relay servers in the same LANs, it is described in the connection establishment information 505-1 and 505-2. When the connections for the IP communication using the virtual addresses are not established between the client terminals and the relay servers in the same LANs, nothing is described in the connection establishment information 505-1 and 505-2. In such a way, the information as to whether or not the connections for the IP communication using the virtual addresses are established between the client terminals and the relay servers in the same LANs is shared in the whole relay communication system. Moreover, information regarding the virtual private IP addresses of the client terminals is shared in the whole relay communication system.

(6) Specific Example of Client Terminal Information

FIG. 6 is a view showing client terminal information 60 and 70 as specific examples of client terminal information. The client terminal information is an information indicating details of the client terminals which constitute the relay communication system.

The client terminal information 60 and 70, respectively, include client terminal address information 601 and 701, client terminal expiration period information 602 and 702, and client terminal port information 603 and 703. The client terminal address information 601 and 701 do not necessarily correspond to the client terminal virtual address information 504-1 and 504-2, respectively.

"div" indicates the name of a division to which the client terminals belong. "group" indicates identification information of the relay group to which the client terminals belong. The client terminal address information 601 and 701 indicate IP addresses of the client terminals which are uniquely allocated only in the LANs 1 and 2, respectively. The client terminal expiration period information 602 and 702 indicate registration expiration periods of the client terminals. "id" indicates identification information of the client terminals. "name" indicates the names of the client terminals. "pass" indicates passwords of the client terminals. The client terminal port information 603 and 703 indicate port numbers of the client terminals.

The client terminal information 60 is stored only in the client terminal information storage unit 126, and the client terminal information 70 is stored only in the client terminal information storage unit 226. In other words, the client terminal information 60 is owned only by the relay server 12, and the client terminal information 70 is owned only by the relay server 22.

(7) Flow of Information Sharing

Figure 7:
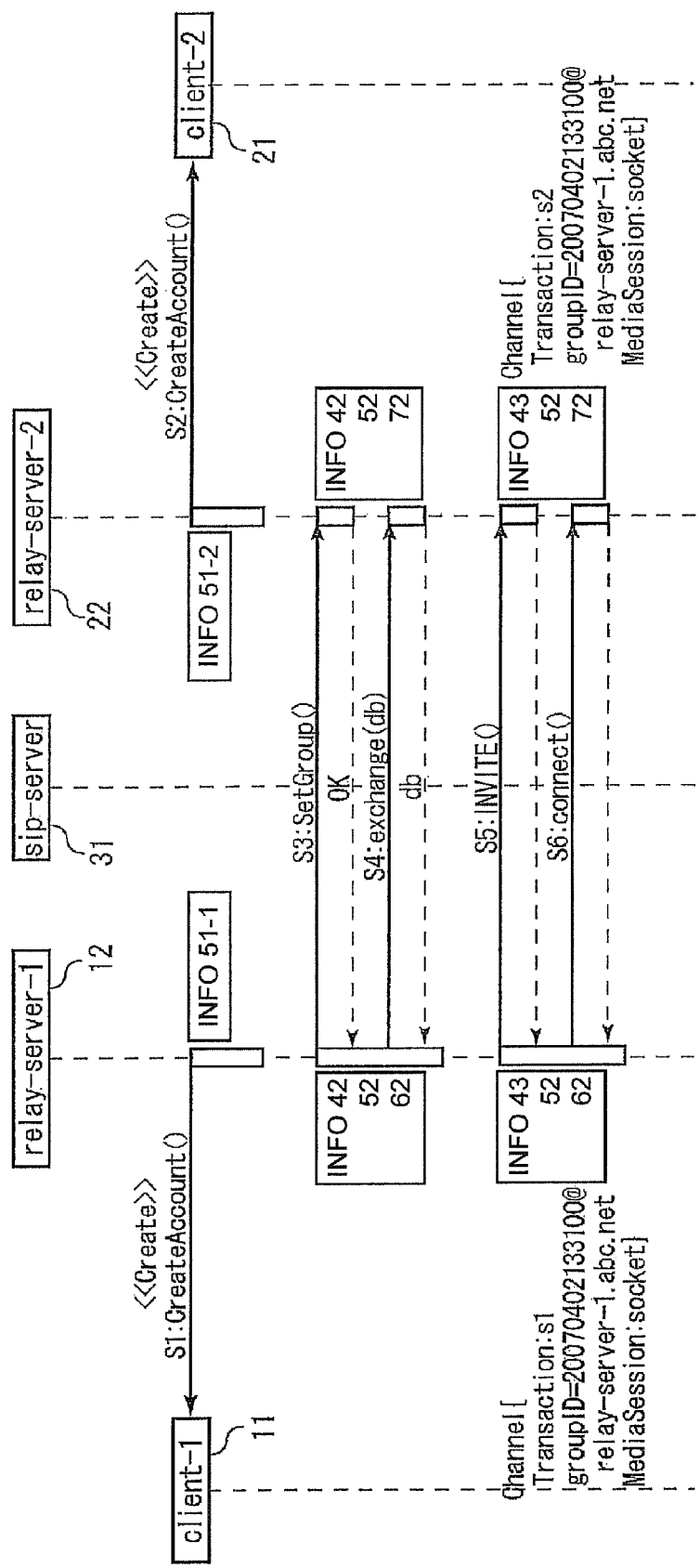
FIG. 7 is a view showing a flow of information sharing in the First Preferred Embodiment of the present invention.
Figure 8:
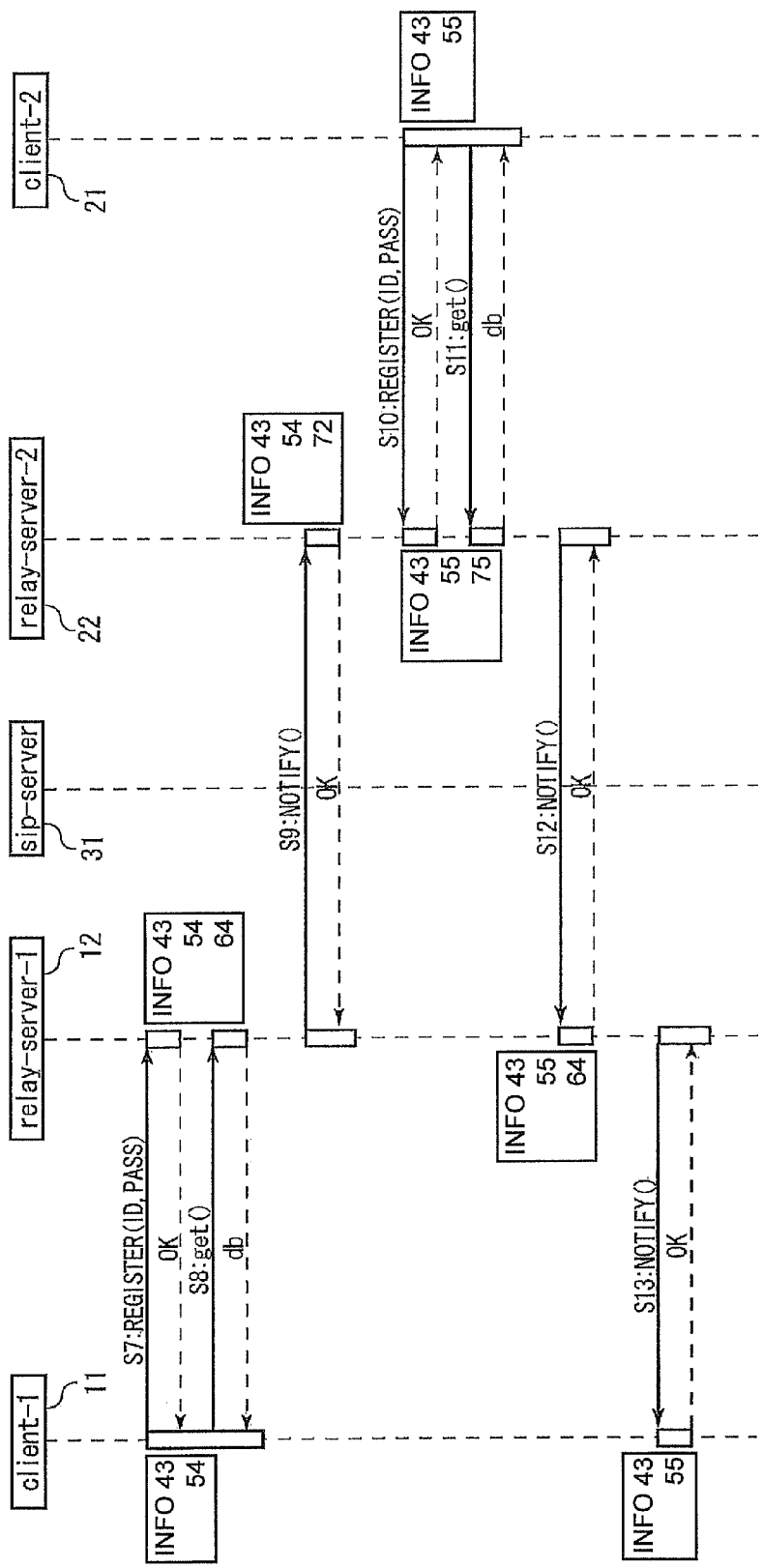
FIG. 8 is a view showing the flow of the information sharing in the First Preferred Embodiment of the present invention.
Figure 9:
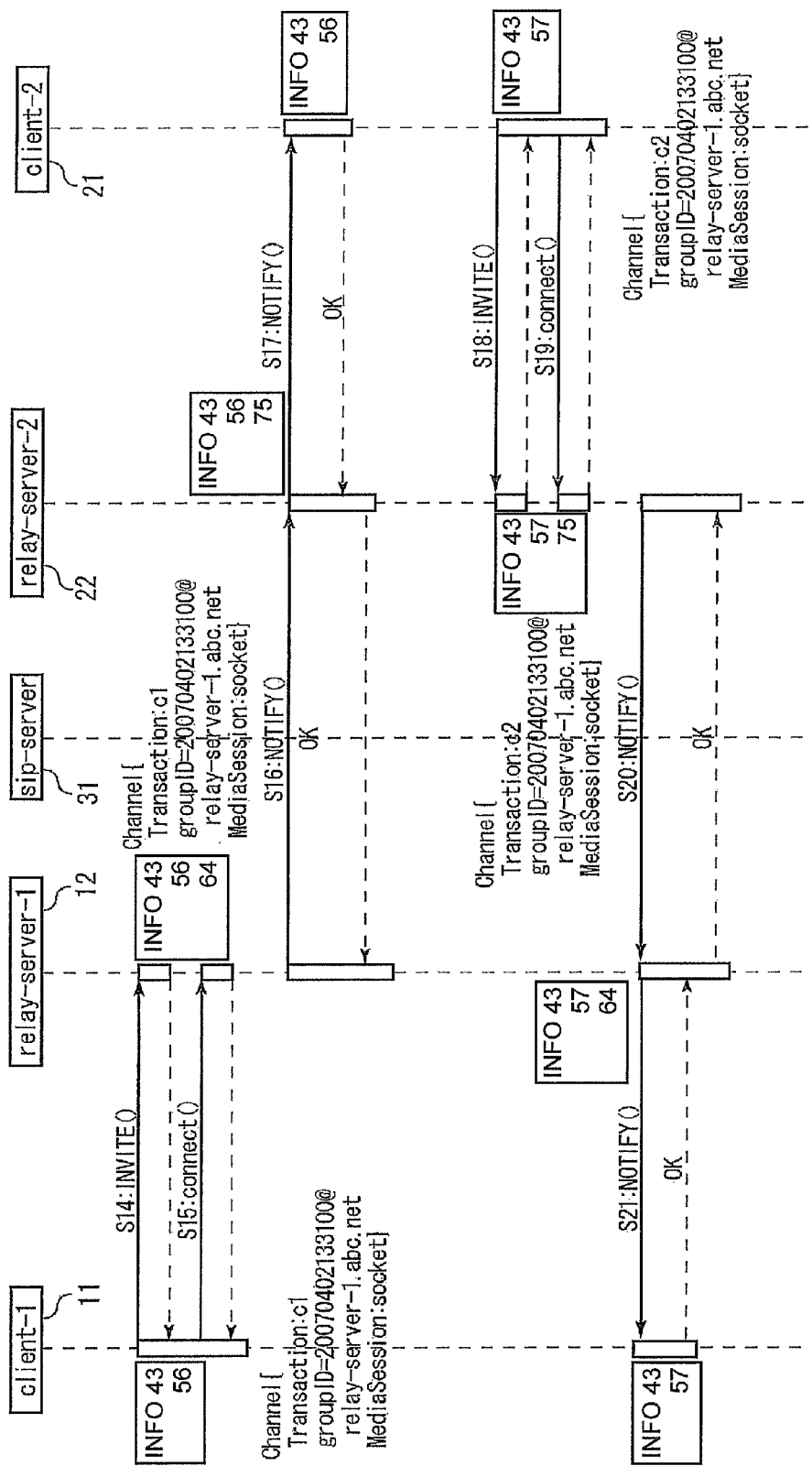
FIG. 9 is a view showing the flow of the information sharing in the First Preferred Embodiment of the present invention.

FIG. 7 to FIG. 9 are views showing a process flow in which the relay group information and the relay server information are shared in the relay communication system. The relay servers 12 and 22 are connected in the relay communication system. Then, a user of the client terminal 11 logs on to the relay server 12, and a user of the client terminal 21 logs on to the relay server 22. Moreover, in each of sections between the relay servers 12 and 22, between the client terminal 11 and the relay server 12, and between the client terminal 21 and the relay server 22, the connections for the IP communication using the virtual addresses are established.

(7-1) Processing Flow from Step S1 to Step S2

An administrator of the relay server 12 and an administrator of the relay server 22 make a contract to construct a group of the relay communication system between the LANs 1 and 2. The administrator of the relay server 12 and the administrator of the relay server 22 make a contract to set "255.255.255.0" as the subnet masks, to set "192.168.0.*" as the virtual private IP addresses, and to set, as "*", numeric values unique to the respective apparatuses.

The administrator of the relay server 12 creates an account for the user of the client terminal 11 (Step S1: CreateAccount( )). The control unit 122 creates a relay server information 51-1, and stores the relay server information 51-1 in the relay server information storage unit 125.

The administrator of the relay server 22 creates an account for the user of the client terminal 21 (Step S2: CreateAccount( )). The control unit 222 creates a relay server information 51-2, and stores the relay server information 51-2 in the relay server information storage unit 225.

Through the above-described process, the relay server 12 owns the relay server information 51-1. The relay server 22 owns the relay server information 51-2.

The contents within the first frame in FIG. 10 illustrate the relay server information 51-1. Upper information 511-1 is the information regarding the relay server 12, which is the upper level. As "id", "relay-server-1@abc.net" is set. As "name", "RELAY SERVER 1" is set. As relay server activation information 513-1, "active" is set. In other words, the relay server 12 is activated.

Lower information 512-1 is the information regarding the client terminal 11, which is the lower level. As "div", "software" is set. As "group", "20070402133100@relay-server-1.abc.net" is set. As "id", "client-1@relay-server-1.abc.net" is set. As "name", "CLIENT 1" is set. Client terminal site information 516-1 is blank. In other words, the user of the client terminal 11 has not logged on to the relay server 12. Therefore, the client terminal virtual address information and the connection establishment information have nothing described, yet.

The contents within the second frame in FIG. 10 illustrate the relay server information 51-2. Upper information 511-2 is the information regarding the relay server 22, which is the upper level. As "id", "relay-server-2@abc.net" is set. As "name", "RELAY SERVER 2" is set. As relay server activation information 513-2, "active" is set. In other words, the relay server 22 is activated.

Lower information 512-2 is the information regarding the client terminal 21, which is the lower level. As "div", "software" is set. As "group", "20070402133100@relay-server-1.abc.net" is set. As "id", "client-2@relay-server-2.abc.net" is set. As "name", "CLIENT 2" is set. Client terminal site information 516-2 is blank. In other words, the user of the client terminal 21 has not logged on to the relay server 22. Therefore, the client terminal virtual address information and the connection establishment information have nothing described, yet.

FIG. 11 shows a relay group map. At this point, the relay group is not formed yet, and accordingly, the relay group map display units 127, 227, 118 and 218 display a message indicating that there is no relay group to be displayed.

(7-2) Processing Flow from Step S3 to Step S4

In the following description, the communication between the relay servers 12 and 22 is relayed by the SIP server 31. A description will be made of a method in which the relay server 12(22) performs the communication with the relay server 22(12) through the SIP server 31.

The relay server 12(22) transmits, to the SIP server 31, data in which the account of the relay server 22(12) is designated as the communication destination, and the like. The SIP server 31 allows the accounts of the relay servers 12 and 22 to correspond to the global IP addresses of the relay servers 12 and 22, respectively. The SIP server 31 acquires the global IP address of the relay server 22(12) based on the account of the relay server 22(12). The SIP server 31 then transmits, to the relay server 22(12), data in which the global IP address of the relay server 22(12) is designated as the communication destination, and the like.

The relay server 12 requests the relay server 22 to construct the group of the relay communication system (Step S3: Set-Group( )). The control unit 122 creates a relay group information 42, and stores the relay group information 42 in the relay group information storage unit 124. The control unit 222 creates a relay group information 42, and stores the relay group information 42 in the relay group information storage unit 224.

The relay server 12 requests the relay server 22 to exchange the relay server information therewith (Step S4: exchange (db)). The relay server 12 transmits a copy of the relay server information 51-1 to the relay server 22. The relay server 22 transmits a copy of the relay server information 51-2 to the relay server 12.

The control unit 122 synthesizes the copy of the relay server information 51-2 and the relay server information 51-1, thereby creates relay server information 52, and stores the relay server information 52 in the relay server information storage unit 125. The control unit 222 synthesizes the copy of the relay server information 51-1 and the relay server information 51-2, thereby creates relay server information 52, and stores the relay server information 52 in the relay server information storage unit 225.

The control unit 122 creates client terminal information 62, and stores the client terminal information 62 in the client terminal information storage unit 126. The control unit 222 creates client terminal information 72, and stores the client terminal information 72 in the client terminal information storage unit 226. Creation process and storing process for the client terminal information 62 are executed in Step S1, and creation process and storing process for the client terminal information 72 are executed in Step S2.

Through the above-described process, the relay server 12 owns the relay group information 42, the relay server information 52 and the client terminal information 62. The relay server 22 owns the relay group information 42, the relay server information 52 and the client terminal information 72. The relay group information 42 and the relay server information 52 are shared between the relay servers 12 and 22.

The contents within the first frame in FIG. 12 illustrate the relay group information 42. Upper information 421 is the information regarding the relay group, which is the upper level. As "id", "20070402133100@relay-server-1.abc.net" is set. As "lastmod", "20070402133100" is set. As "name", "GROUP 1" is set. However, the connection has not been established between the relay servers 12 and 22. Therefore, the relay group virtual address information has nothing described yet.

Lower information 422 is the information regarding the relay servers 12 and 22, which are the lower level. As "id", "relay-server-1@abc.net" and "relay-server-2@abc.net" are set. However, the connection for the IP communication using the virtual addresses has not been established between the relay servers 12 and 22. Therefore, the relay server virtual address information and the connection establishment information have nothing described yet.

The contents within the second frame in FIG. 12 illustrate the relay server information 52. Upper information 521-1 and 521-2 are similar to the upper information 511-1 and 511-2 in FIG. 10, respectively. Lower information 522-1 and 522-2 are similar to the lower information 512-1 and 512-2 in FIG. 10, respectively.

The contents within the third frame in FIG. 12 illustrate the client terminal information 62. As "div", "software" is set. As "group", "20070402133100@relay-server-1.abc.net" is set. As "id", "client-1@relay-server-1.abc.net" is set. As "name", "CLIENT 1" is set. As "pass", "client-1" is set.

Client terminal address information 621 is blank. As client terminal expiration period information 622, "0" is set. Client terminal port information 623 is blank. In other words, the user of the client terminal 11 has not logged on to the relay server 12.

The contents within the fourth frame in FIG. 12 illustrate the client terminal information 72. As "div", "software" is set. As "group", "20070402133100@relay-server-1.abc.net" is set. As "id", "client-2@relay-server-2.abc.net" is set. As "name", "CLIENT 2" is set. As "pass", "client-2" is set.

Client terminal address information 721 is blank. As client terminal expiration period information 722, "0" is set. Client terminal port information 723 is blank. In other words, the user of the client terminal 21 has not logged on to the relay server 22.

Figure 13:
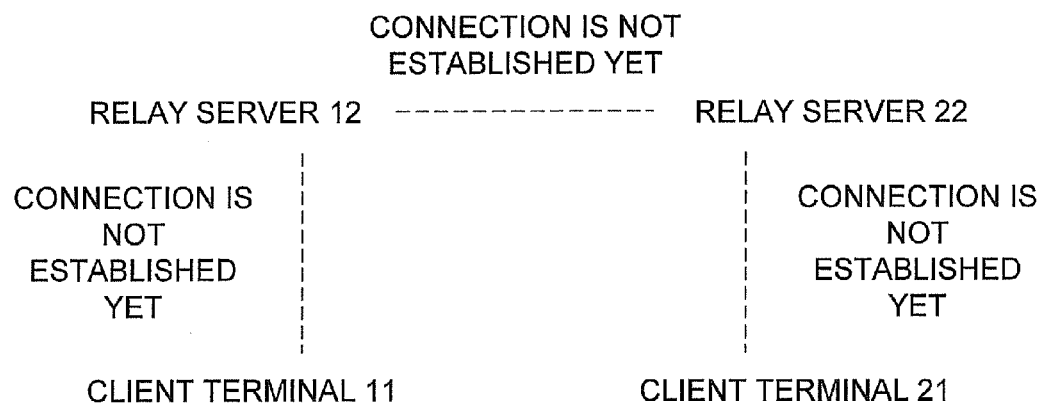
FIG. 13 is a view showing a relay group map displayed after Step S4 in the First Preferred Embodiment of the present invention.

FIG. 13 shows a relay group map. The relay group map display unit 127 of the relay server 12 and the relay group map display unit 227 of the relay server 22 display the relay group map by referring to the relay group information 42 and the relay server information 52.

The relay server 12 is requesting the relay server 22 to construct the group of the relay communication system. Therefore, the relay group map in FIG. 11 is synthesized, and the relay group map in FIG. 13 is displayed. However, in the relay group information 42, the connection establishment information has nothing described yet. Therefore, "connection is not established yet" and a dashed line located at the side thereof are illustrated between "relay server 12" and "relay server 22".

(7-3) Process Flow from Step S5 to Step S6

The relay server 12 executes call control for the relay server 12 (Step S5: INVITE( )), and requests the relay server 22 to establish the connection (Step S6: connect( )). The control unit 122 updates the relay group information 42, thereby creates relay group information 43, and stores the relay group information 43 in the relay group information storage unit 124. At the point when the connection between the relay server 12 and the relay server 22 is established, the relay server 12 and the relay server 22 allocate individual virtual private addresses thereto. The control unit 222 updates the relay group information 42, thereby creates relay group information 43, and stores the relay group information 43 in the relay group information storage unit 224. The control unit 122 does not update the relay server information 52 and the client terminal information 62. The control unit 222 does not update the relay server information 52 and the client terminal information 72.

Through the above-described process, the relay server 12 owns the relay group information 43, the relay server information 52 and the client terminal information 62. The relay server 22 owns the relay group information 43, the relay server information 52 and the client terminal information 72. The relay group information 43 and the relay server information 52 are shared between the relay servers 12 and 22.

The contents within the first frame in FIG. 14 illustrate the relay group information 43. The updated portions are underlined. The relay server 12 has established the connection for the IP communication with the relay server 22 using the virtual addresses.

Based on the contract made by the administrators of the relay servers 12 and 22, the control units 122 and 222 set the relay group virtual address information 433 of the upper information 431 at "192.168.0.*". In the relay communication system, "*" is uniquely set for each of the apparatuses.

Based on the relay group virtual address information 433, the control units 122 and 222 set the relay server virtual address information 434 for the relay servers 12 and 22 in the lower information 432 at numeric values different from each other. The control unit 122 sets "*" at "1", and sets "192.168.0.1" as the relay server virtual address information 434 for the relay server 12. The control unit 222 sets "*" at "2", and sets "192.168.0.2" as the relay server virtual address information 434 for the relay server 22.

The control unit 122 sets "s1" as the connection establishment information 435 for the relay server 12 in the lower information 432. The control unit 222 sets "s2" as the connection establishment information 435 for the relay server 22 in the lower information 432. In FIG. 7, in the connections for the IP communication using the virtual addresses between the relay servers 12 and 22, with regard to sockets of the relay servers 12 and 22, "Transaction" is set at "s1" and "s2", respectively.

"groupID" indicates the identification information of the relay group in which the connections are established, and is set at "20070402133100@relay-server-1.abc.net". "MediaSession" is set at "socket". These two types of information are similar in FIG. 7 and in FIG. 9.

The contents within the second frame in FIG. 14 illustrate the relay server information 52. In the process flow from Step S5 to Step S6, the user of the client terminal 11 has not logged on to the relay server 12, and the user of the client terminal 21 has not logged on to the relay server 22. Accordingly, the relay server information 52 is not updated.

The contents within the third frame in FIG. 14 illustrate the client terminal information 62. In the process flow from Step S5 to Step S6, the user of the client terminal 11 has not logged on to the relay server 12, and accordingly, the client terminal information 62 is not updated.

The contents within the fourth frame in FIG. 14 illustrate the client terminal information 72. In the process flow from Step S5 to Step S6, the user of the client terminal 21 has not logged on to the relay server 22, and accordingly, the client terminal information 72 is not updated.

Figure 15:
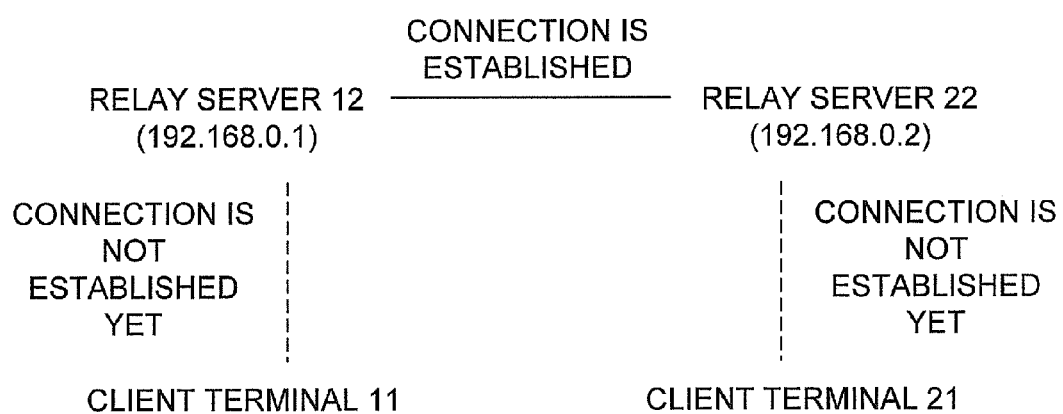
FIG. 15 is a view showing a relay group map displayed after Step S6 in the First Preferred Embodiment of the present invention.

FIG. 15 shows a relay group map. The relay group map display unit 127 of the relay server 12 and the relay group map display unit 227 of the relay server 22 display the relay group map by referring to the relay group information 43 and the relay server information 52.

The relay server 12 is executing the call control for the relay server 22, and is requesting the relay server 22 to establish the connection for the IP communication using the virtual addresses. Then, in the relay group information 43, the relay server virtual address information 434 and the connection establishment information 435 are specified. Therefore, the virtual private IP addresses of the relay servers 12 and 22 have come to be specified. Then, between "relay server 12" and "relay server 22", "connection is established" and a solid line located at the side thereof have come to be illustrated.

(7-4) Process Flow from Step S7 to Step S9

Referring now to FIG. 8, the user of the client terminal 11 inputs "client-1@relay-server-1.abc.net" as the identification information of the client terminal 11, and inputs "client-1" as a password of the client terminal 11. The user of the client terminal 11 logs on to the relay server 12 (Step S7: REGISTER (ID, PASS)). The control unit 122 performs authentication of the user of the client terminal 11 by referring to the client terminal information 62.

The control unit 122 receives the login of the user of the client terminal 11. The control unit 122 then updates the relay server information 52, thereby creates relay server information 54, and stores the relay server information 54 in the relay server information storage unit 125. At the point when the client terminal 11 logs on to the relay server 12, the relay server 12 allocates the virtual private address of the client terminal 11 thereto. The control unit 122 then updates the client terminal information 62, thereby creates client terminal information 64, and stores the client terminal information 64 in the client terminal information storage unit 126. The control unit 122 does not update the relay group information 43.

The client terminal 11 requests the relay server 12 to provide it with the relay group information and the relay server information (Step S8: get( )). The relay server 12 then transmits copies of the relay group information 43 and the relay server information 54 to the client terminal 11. The client terminal 11 stores the relay group information 43 in the relay group information storage unit 116, and stores the relay server information 54 in the relay server information storage unit 117.

By referring to the relay group information 43 and the relay server information 54, the control unit 122 determines a relay server which is to be notified that the relay server information 52 has been updated to the relay server information 54. The control unit 122 determines the relay server 22, in which relay server activation information 543-2 of the relay server information 54 is "active", as the relay server to be notified of the above-described update of the information.

The relay server 12 then notifies the relay server 22 that the relay server information 52 has been updated to the relay server information 54 (Step S9: NOTIFY( )). In response, the control unit 222 updates the relay server information 52, thereby creates the relay server information 54, and stores the relay server information 54 in the relay server information storage unit 225.

By referring to the client terminal information 72, the control unit 222 determines a client terminal which is to be notified that the relay server information 52 has been updated to the relay server information 54. The control unit 222 does not determine the client terminal 21, in which the client terminal address information 721 and the client terminal port information 723 of the client terminal information 72 are blank, as the client terminal to be notified of the update of the information.

Through the above-described process, the relay server 12 owns the relay group information 43, the relay server information 54 and the client terminal information 64. The relay server 22 owns the relay group information 43, the relay server information 54 and the client terminal information 72. The client terminal 11 owns the relay group information 43 and the relay server information 54. The relay group information 43 and the relay server information 54 are shared between the relay servers 12 and 22 and the client terminal 11.

The contents within the first frame in FIG. 16 illustrate the relay group information 43. In the process flow from Step S7 to Step S9, no new relay server has joined the relay communication system, and accordingly, the relay group information 43 is not updated.

The contents within the second frame in FIG. 16 illustrate the relay server information 54. The updated portions are underlined.

The user of the client terminal 11 is logged on to the relay server 12. Therefore, client terminal site information 546-1 of lower information 542-1 is determined at "relay-server-1@abc.net".

The control unit 122 sets "*" at "11", and sets "192.168.0.11" as client terminal virtual address information 544-1 for the client terminal 11 in the lower information 542-1. Here, the virtual private IP address in hand does not overlap the previously set virtual private IP address.

The control unit 122 sets connection establishment information 545-1 for the client terminal 11 to be blank in the lower information 542-1. In other words, between the client terminal 11 and the relay server 12, the connection for the IP communication using the virtual addresses has not been established yet.

The contents within the third frame in FIG. 16 illustrate the client terminal information 64. The updated portions are underlined. The user of the client terminal 11 is logged on to the relay server 12. Therefore, client terminal address information 641 is determined at "192.168.10.2". Here, with regard to the client terminal 11, such a physical private IP address "192.168.10.2" does not coincide with the virtual private IP address "192.168.0.11". Moreover, client terminal expiration period information 642 is determined at "1213935960484". Furthermore, client terminal port information 643 is determined at "5070".

The contents within the fourth frame in FIG. 16 illustrate the client terminal information 72. In the process flow from Step S7 to Step S9, the user of the client terminal 21 has not logged on to the relay server 22, and accordingly, the client terminal information 72 is not updated.

Figure 17:
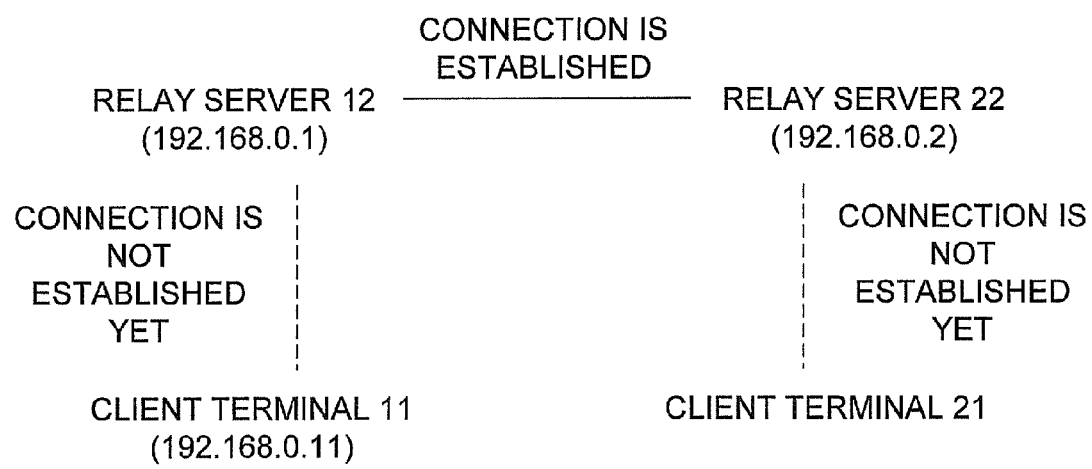
FIG. 17 is a view showing a relay group map displayed after Step S9 in the First Preferred Embodiment of the present invention.

FIG. 17 shows a relay group map. The relay group map display unit 118 of the client terminal 11, the relay group map display unit 127 of the relay server 12 and the relay group map display unit 227 of the relay server 22 display the relay group map by referring to the relay group information 43 and the relay server information 54.

The user of the client terminal 11 has logged on to the relay server 12. Then, in the relay server information 54, the client terminal virtual address information 544-1 is specified. Therefore, the virtual private IP address of the client terminal 11 has come to be specified. However, in the relay server information 54, the connection establishment information 545-1 has nothing described yet. Therefore, between "client terminal 11" and "relay server 12", "connection is established" and a solid line located at the side thereof are not displayed.

(7-5) Process Flow from Step S10 to Step S13

The user of the client terminal 21 inputs "client-2@relay-server-2.abc.net" as identification information of the client terminal 21, and inputs "client-2" as a password of the client terminal 21. The user of the client terminal 21 logs on to the relay server 22 (Step S10: REGISTER (ID, PASS)). The control unit 222 performs authentication of the user of the client terminal 21 by referring to the client terminal information 72.

The control unit 222 receives the login of the user of the client terminal 21. The control unit 222 then updates the relay server information 54, thereby creates relay server information 55, and stores the relay server information 55 in the relay server information storage unit 225. At the point when the client terminal 21 logs on to the relay server 22, the relay server 22 allocates the virtual private address of the client terminal 21 thereto. The control unit 222 then updates the client terminal information 72, thereby creates client terminal information 75, and stores the client terminal information 75 in the client terminal information storage unit 226. The control unit 222 does not update the relay group information 43.

The client terminal 21 requests the relay server 22 to provide it with the relay group information and the relay server information (Step S11: get( )). The relay server 22 then transmits copies of the relay group information 43 and the relay server information 55 to the client terminal 21. The client terminal 21 stores the relay group information 43 in the relay group information storage unit 216, and stores the relay server information 55 in the relay server information storage unit 217.

By referring to the relay group information 43 and the relay server information 55, the control unit 222 determines a relay server which is to be notified that the relay server information 54 has been updated to the relay server information 55. The control unit 222 determines the relay server 12, in which relay server activation information 553-1 of the relay server information 55 is "active", as the relay server to be notified of the above-described update of the information.

The relay server 22 then notifies the relay server 12 that the relay server information 54 has been updated to the relay server information 55 (Step S12: NOTIFY( )). In response, the control unit 122 updates the relay server information 54, thereby creates the relay server information 55, and stores the relay server information 55 in the relay server information storage unit 125.

By referring to the client terminal information 64, the control unit 122 determines a client terminal which is to be notified that the relay server information 54 has been updated to the relay server information 55. The control unit 122 determines the client terminal 11, in which the client terminal address information 641 and the client terminal port information 643 of the client terminal information 64 have been previously determined, as the client terminal to be notified of the update of the information.

The relay server 12 notifies the client terminal 11 that the relay server information 54 has been updated to the relay server information 55 (Step S13: NOTIFY( )). The control unit 112 then updates the relay server information 54, thereby creates the relay server information 55, and stores the relay server information 55 in the relay server information storage unit 117.

Through the above-described process, the relay server 12 owns the relay group information 43, the relay server information 55 and the client terminal information 64. The relay server 22 owns the relay group information 43, the relay server information 55 and the client terminal information 75. The client terminal 11 owns the relay group information 43 and the relay server information 55. The client terminal 21 owns the relay group information 43 and the relay server information 55. The relay group information 43 and the relay server information 55 are shared between the relay servers 12 and 22 and the client terminals 11 and 21.

The contents within the first frame in FIG. 18 illustrate the relay group information 43. In the process flow from Step S10 to Step S13, no new relay server has joined the relay communication system, and accordingly, the relay group information 43 is not updated.

The contents within the second frame in FIG. 18 illustrate the relay server information 55. The updated portions are underlined. The user of the client terminal 21 is logged on to the relay server 22. Therefore, client terminal site information 556-2 of lower information 552-2 is determined at "relay-server-2@abc.net".

The control unit 222 sets "*" at "12", and sets "192.168.0.12" as client terminal virtual address information 554-2 for the client terminal 21 in the lower information 552-2. Here, the virtual private IP address in hand does not overlap the previously set virtual private IP address.

The control unit 222 sets connection establishment information 555-2 for the client terminal 21 to be blank in the lower information 552-2. In other words, between the client terminal 21 and the relay server 22, the connection for the IP communication using the virtual addresses has not been established yet.

The contents within the third frame in FIG. 18 illustrate the client terminal information 64. In the flow of the processing from Step S10 to Step S13, the user of the client terminal 11 has not logged off from the relay server 12, and accordingly, the client terminal information 64 is not updated.

The contents within the fourth frame in FIG. 18 illustrate the client terminal information 75. The updated portions are underlined. The user of the client terminal 21 is logged on to the relay server 22. Therefore, client terminal address information 751 is determined at "192.168.1.10". Here, with regard to the client terminal 21, such a physical private IP address "192.168.1.10" does not coincide with the virtual private IP address "192.168.0.12". Moreover, client terminal expiration period information 752 is determined at "1213935978484". Furthermore, client terminal port information 753 is determined at "5070".

Figure 19:
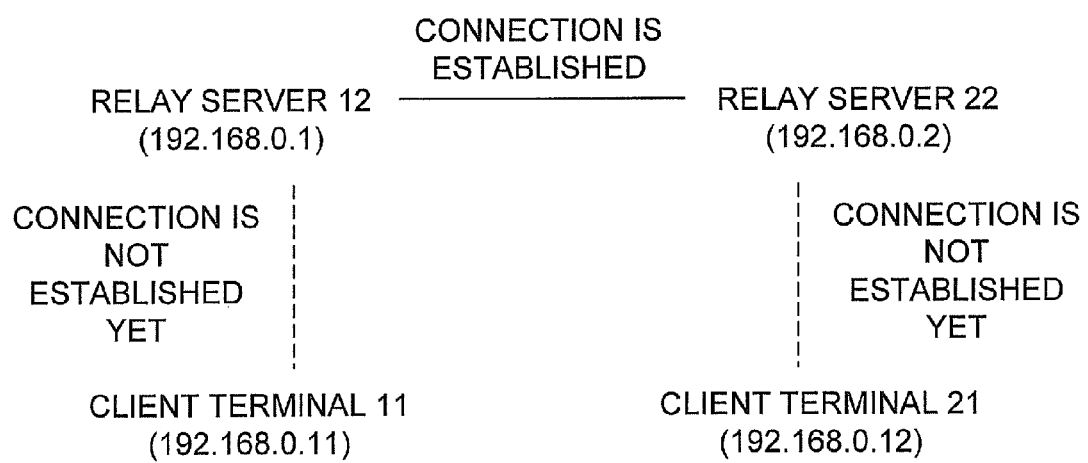
FIG. 19 is a view showing a relay group map displayed after Step S13 in the First Preferred Embodiment of the present invention.

FIG. 19 shows a relay group map. The relay group map display unit 118 of the client terminal 11, the relay group map display unit 218 of the client terminal 21, the relay group map display unit 127 of the relay server 12 and the relay group map display unit 227 of the relay server 22 display the group map by referring to the relay group information 43 and the relay server information 55.

The user of the client terminal 21 has logged on to the relay server 22. Then, in the relay server information 55, the client terminal virtual address information 554-2 is specified. Therefore, the virtual private IP address of the client terminal 21 has come to be specified. However, in the relay server information 55, the connection establishment information 555-2 has nothing described yet. Therefore, between "client terminal 21" and "relay server 22", "connection is established" and a solid line located at the side thereof are not illustrated.

(7-6) Process Flow from Step S14 to Step S17

Referring to FIG. 9, the client terminal 11 executes call control for the relay server 12 (Step S14: INVITE( )), and requests the relay server 12 to establish the connection for the IP communication using the virtual addresses (Step S15: connect( )). The control units 122 and 112 update the relay server information 55, thereby create relay server information 56, and store the relay server information 56 in the relay server information storage units 125 and 117. The control unit 122 does not update the relay group information 43 and the client terminal information 64. The control unit 112 does not update the relay group information 43.

The process flow from Step S16 to Step S17 is executed in a similar way to Steps S9, S12 and S13. The relay server 12 notifies the relay server 22 that the relay server information 55 has been updated to the relay server information 56 (Step S16: NOTIFY( )). The relay server 22 notifies the client terminal 21 that the relay server information 55 has been updated to the relay server information 56 (Step S17: NOTIFY( )).

Through the above-described process, the relay server 12 owns the relay group information 43, the relay server information 56 and the client terminal information 64. The relay server 22 owns the relay group information 43, the relay server information 56 and the client terminal information 75. The client terminal 11 owns the relay group information 43 and the relay server information 56. The client terminal 21 owns the relay group information 43 and the relay server information 56. The relay group information 43 and the relay server information 56 are shared between the relay servers 12 and 22 and the client terminals 11 and 21.

The contents within the first frame in FIG. 20 illustrate the relay group information 43. In the flow of the processing from Step S14 to Step S17, no new relay server has joined the relay communication system, and accordingly, the relay group information 43 is not updated.

The contents within the second frame in FIG. 20 illustrate the relay server information 56. The client terminal 11 have established the connection for the IP communication with the relay server 12 using the virtual addresses.

The control unit 122 and 112 set connection establishment information 565-1 of lower information 562-1 at "c1". In FIG. 9, in the connections between the client terminal 11 and the relay server 12, with regard to sockets of the client terminal 11 and the relay server 12, "Transaction" is set at "c1". "groupID" and "MediaSession" are as described above.

Here, the socket of the relay server 12 in the connection for the IP communication using the virtual addresses between the client terminal 11 and the relay server 12 and the socket of the relay server 12 in the connection for the IP communication using the virtual addresses between the relay server 12 and the relay server 22 are different from each other. However, these sockets are associated with each other by the same groupID.

The contents within the third frame in FIG. 20 illustrate the client terminal information 64. In the process flow from Step S14 to Step S17, the user of the client terminal 11 has not logged off from the relay server 12, and accordingly, the client terminal information 64 is not updated.

The contents within the fourth frame in FIG. 20 illustrate the client terminal information 75. In the process flow from Step S14 to Step S17, the user of the client terminal 21 has not logged off from the relay server 22, and accordingly, the client terminal information 75 is not updated.

Figure 21:
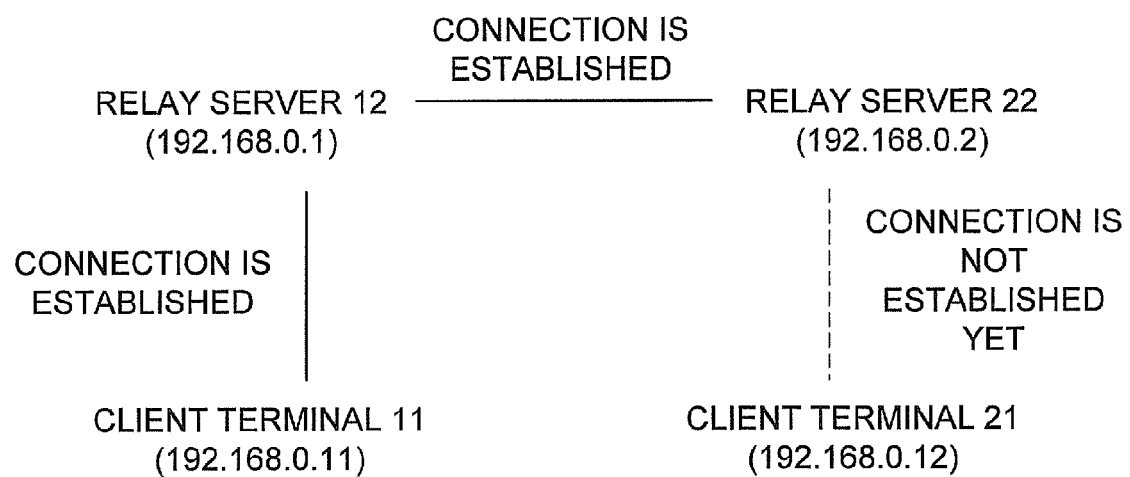
FIG. 21 is a view showing a relay group map displayed after Step S17 in the First Preferred Embodiment of the present invention.

FIG. 21 shows a relay group map. The relay group map display unit 118 of the client terminal 11, the relay group map display unit 218 of the client terminal 21, the relay group map display unit 127 of the relay server 12 and the relay group map display unit 227 of the relay server 22 display the relay group map by referring to the relay group information 43 and the relay server information 56.

The client terminal 11 has established the connection for the IP communication with the relay server 12 using the virtual addresses. Then, in the relay server information 56, the connection establishment information 565-1 is specified. Therefore, between "client terminal 11" and "relay server 12", "connection is established" and the solid line located at the side thereof have come to be illustrated.

(7-7) Process Flow from Step S18 to Step S21

The client terminal 21 executes call control for the relay server 22 (Step S18: INVITE( )), and requests the relay server 22 to establish the connection for the IP communication using the virtual addresses (Step S19: connect( )). The control units 222 and 212 update the relay server information 56, thereby create relay server information 57, and store the relay server information 57 in the relay server information storage units 225 and 217. The control unit 222 does not update the relay group information 43 and the client terminal information 75. The control unit 212 does not update the relay group information 43.

The process flow from Step S20 to Step S21 is executed in a similar way to Steps S9, S12 and S13. The relay server 22 notifies the relay server 12 that the relay server information 56 has been updated to the relay server information 57 (Step S20: NOTIFY( )). The relay server 12 notifies the client terminal 11 that the relay server information 56 has been updated to the relay server information 57 (Step S21: NOTIFY( )).

Through the above-described process, the relay server 12 owns the relay group information 43, the relay server information 57 and the client terminal information 64. The relay server 22 owns the relay group information 43, the relay server information 57 and the client terminal information 75. The client terminal 11 owns the relay group information 43 and the relay server information 57. The client terminal 21 owns the relay group information 43 and the relay server information 57. The relay group information 43 and the relay server information 57 are shared between the relay servers 12 and 22 and the client terminals 11 and 21.

The contents within the first frame in FIG. 22 illustrate the relay group information 43. In the flow of the processing from Step S18 to Step S21, no new relay server has joined the relay communication system, and accordingly, the relay group information 43 is not updated.

The contents within the second frame in FIG. 22 illustrate the relay server information 57. The client terminal 21 has established the connection for the IP communication with the relay server 22 using the virtual addresses.

The control unit 222 and 212 set connection establishment information 575-2 of lower information 572-2 at "c2". In FIG. 9, in the connections for the IP communication using the virtual addresses between the client terminal 21 and the relay server 22, with regard to sockets of the client terminal 21 and the relay server 22, "Transaction" is set at "c2". "groupID" and "MediaSession" are as described above.

Here, the socket of the relay server 22 in the connection for the IP communication using the virtual addresses between the client terminal 21 and the relay server 22 and the socket of the relay server 22 in the connection for the IP communication using the virtual addresses between the relay server 12 and the relay server 22 are different from each other. However, these sockets are associated with each other by the same groupID.

The contents within the third frame in FIG. 22 illustrate the client terminal information 64. In the process flow from Step S18 to Step S21, the user of the client terminal 11 has not logged off from the relay server 12, and accordingly, the client terminal information 64 is not updated.

The contents within the fourth frame in FIG. 22 illustrate the client terminal information 75. In the process flow from Step S18 to Step S21, the user of the client terminal 21 has not logged off from the relay server 22, and accordingly, the client terminal information 75 is not updated.

Figure 23:
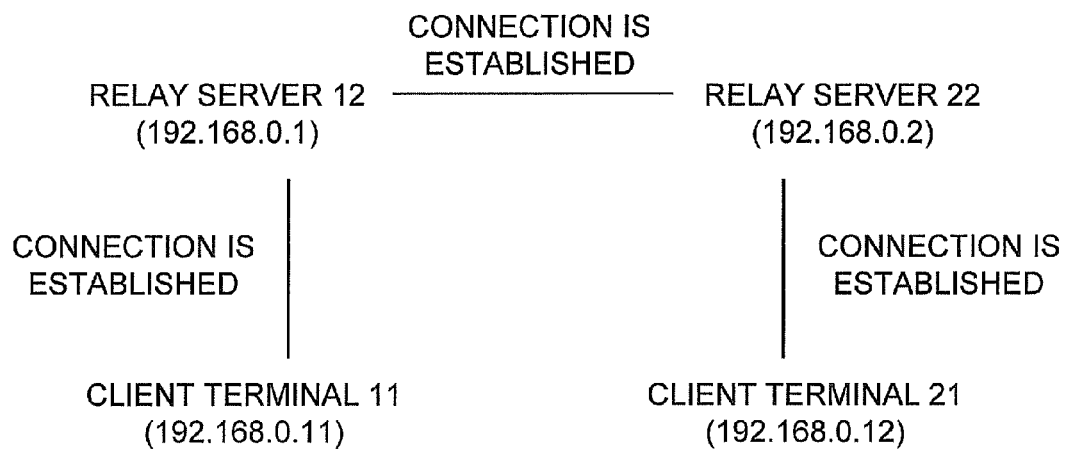
FIG. 23 is a view showing a relay group map displayed after Step S21 in the First Preferred Embodiment of the present invention.

FIG. 23 shows a relay group map. The relay group map display unit 118 of the client terminal 11, the relay group map display unit 218 of the client terminal 21, the relay group map display unit 127 of the relay server 12 and the relay group map display unit 227 of the relay server 22 display the group map by referring to the relay group information 43 and the relay server information 57.

The client terminal 21 has established the connection for the IP communication with the relay server 22 using the virtual addresses. Then, in the relay server information 57, the connection establishment information 575-2 is specified. Therefore, between "client terminal 21" and "relay server 22", "connection is established" and the solid line located at the side thereof have come to be illustrated.

(8) Summary of the Information Sharing

In the relay communication system, changes in the number and the connection state of the LANs and the client terminals may occur. Accordingly, when recognizing such changes, one of the relay servers immediately updates the relay group information, the relay server information and the client terminal information.

Then, the one of the relay servers immediately notifies the other relay server, which is described in the relay group information and the relay server information, that the relay group information and the relay server information have been updated. Moreover, the one of the relay servers immediately notifies the client terminal, which is described in the client terminal information, that the relay group information and the relay server information have been updated.

However, even if the other relay server is described in the relay group information and the relay server information, the one of the relay servers does not immediately notify the other relay server of the above-described update of the information upon having determined that the other relay server is in an unconnected state. Moreover, even if the client terminal is described in the client terminal information, the one of the relay servers does not immediately notify the client terminal of the update of the information upon having determined that the client terminal is in an unconnected state.

The administrator of one of the relay servers negotiates with the administrator of the other relay server, and thereby decides a method for allocating the virtual private IP addresses to the respective apparatuses. One of the relay servers communicates with the other relay server, and thereby decides the virtual private IP address for itself in a way such that the virtual private IP addresses of the respective apparatuses do not overlap each other. The relay server communicates with the client terminal that logs on to the relay server itself, and thereby decides the virtual private IP address of the client terminal so that the virtual private IP addresses of the respective apparatuses do not overlap each other.

The information regarding the virtual private IP addresses of respective apparatuses is included in the relay group information and the relay server information. The information regarding the establishment state of the connections for the IP communication using the virtual addresses of the respective apparatuses is included in the relay group information and the relay server information. When these pieces of information of the apparatuses are changed, the relay group information and the relay server information are updated over the whole relay communication system.

In such a way, the information regarding changes in the number and the connection state of the LANs and the client terminals is shared in the whole relay communication system in real time. Then, the information regarding the virtual private IP addresses of the apparatuses and the information regarding the establishment state of the connections for the IP communication using the virtual addresses of the respective apparatuses are shared in the whole relay communication system in real time. Moreover, all pieces of information described above are displayed on the respective apparatuses in real time.

Note that, in the above-described preferred embodiment, when the connection is established between the relay servers 12 and 22, or when the client terminals 11 and 21 log on to the relay servers 12 and 22, the relay servers 12 and 22 are adapted to allocate dynamically the virtual private addresses to the respective servers and the respective terminals. However, timing of allocating the virtual addresses is not limited to this. For example, at the point when the group is established, the virtual addresses may be collectively allocated to all the registered client terminals, or at the point when the relay servers and the client terminals are created, the virtual addresses may be allocated thereto. Even in these cases, it can be determined whether or not communication using virtual addresses is possible by referring to the logon state.

Moreover, in the above-described preferred embodiment, all the relay servers and all the client terminals include virtual LAN drivers and use the virtual addresses; however, a configuration may be adopted, in which only some of the servers and some of the client terminals include the virtual LAN drivers. A WEB server using a virtual LAN driver may be present in the relay group.

(9) Flow of Data Transmission/Reception

Figure 24:
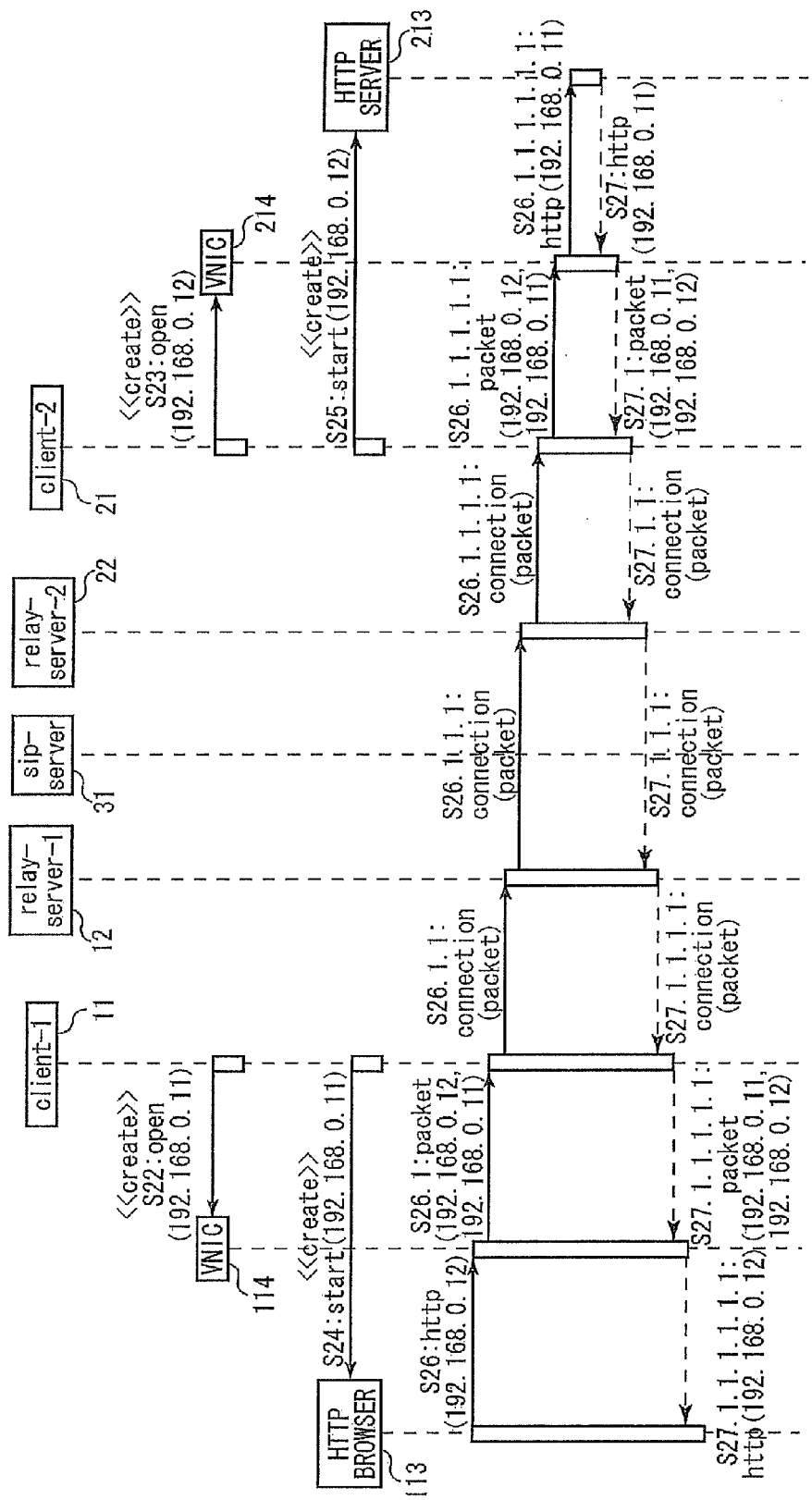
FIG. 24 is a view showing a flow of data transmission/reception in the First Preferred Embodiment of the present invention.

FIG. 24 is a view showing a flow of data transmission/ reception after the information sharing. After the information sharing, the relay group information 43, the relay server information 57, and the client terminal information 64 and 75, as shown in FIG. 22, are stored, and the relay group map shown in FIG. 23 is displayed. The web browser 113 requests content from the web server 213. The web server 213 provides the content to the web browser 113.

(9-1) Process Flow from Step S22 to Step S25

FIG. 24 is referred to. Prior to transmission/reception of the content, the virtual LAN driver 114 and the web browser 113 are activated. Based on the relay server information 57 stored in the relay server information storage unit 117, the virtual LAN driver 114 acquires "192.168.0.11" as the virtual private IP address of the client terminal 11 (Step S22: open (192.168.0.11)). In a similar way to Step S22, the web browser 113 acquires "192.168.0.11" as the virtual private IP address of the client terminal 11 (Step S24: start (192.168.0.11)).

The virtual LAN driver 214 and the web server 213 are activated prior to the transmission/reception of the content. Based on the relay server information 57 stored in the relay server information storage unit 217, the virtual LAN driver 214 acquires "192.168.0.12" as the virtual private IP address of the client terminal 21 (Step S23: open (192.168.0.12)). In a similar way to Step S23, the web server 213 acquires "192.168.0.12" as the virtual private IP address of the client terminal 21 (Step S25: start (192.168.0.12)).

(9-2) Process Flow of Step S26

The web browser 113 outputs, to the virtual LAN driver 114, a content request information which identifies that the virtual private IP address of a transmission destination is "192.168.0.12" (Step S26: http (192.168.0.12)).

The virtual LAN driver 114 outputs a communication packet of the content request information to the control unit 112. The virtual private IP address of the transmission destination is set at "192.168.0.12", and the virtual private IP address of the transmission source is set at "192.168.0.11" (Step S26.1: packet (192.168.0.12, 192.168.0.11)).

The control unit 112 refers to the client terminal virtual address information 574-2 in the relay server information 57 stored in the relay server information storage unit 117, and thereby confirms that the transmission destination is not in the LAN 1 but in the LAN 2 to be connected thereto through the WAN 3.

In the connection for the IP communication using the virtual address set at "groupID=20070402133100@relay-server-1.abc.net", i.e. the connection established in Step S15, the client terminal 11 outputs the encapsulated communication packet of the content request information toward the socket of itself, which is set at "Transaction: c1". The client terminal 11 then transmits the communication packet of the content request information to the relay server 12 (Step S26.1.1: connection(packet)).

The relay server 12 receives the communication packet from the client terminal 11. The control unit 122 refers to the client terminal virtual address information 574-2 in the relay server information 57 stored in the relay server information storage unit 125, and thereby confirms that the transmission destination is not in the LAN 1 but in the LAN 2 to be connected thereto through the WAN 3.

In the connection for the IP communication using the virtual address set at "groupID=20070402133100@relay-server-1.abc.net", i.e. the connection established in Step S6, the relay server 12 outputs the encapsulated communication packet of the content request information toward the socket of itself, which is set at "Transaction: s1". The relay server 12 then transmits the communication packet of the content request information to the relay server 22 (Step S26.1.1.1: connection(packet)).

The relay server 22 receives the communication packet from the relay server 12. The control unit 222 refers to the client terminal virtual address information 574-2 in the relay server information 57 stored in the relay server information storage unit 225, and thereby confirms that the transmission destination is not in the LAN 1 connected thereto through the WAN 3 but in the LAN 2.

In the connection for the IP communication using the virtual address set at "groupID=20070402133100@relay-server-1.abc.net", i.e. the connection established in Step S19, the relay server 22 outputs the encapsulated communication packet of the content request information toward the socket of itself, which is set at "Transaction: c2". The relay server 22 then transmits the communication packet of the content request information to the client terminal 21 (Step S26.1.1.1.1: connection(packet)).

The client terminal 21 receives the communication packet from the relay server 22. The control unit 212 outputs the communication packet of the content request information to the virtual LAN driver 214 (Step S26.1.1.1.1.1: packet (192.168.0.12, 192.168.0.11)).

The virtual LAN driver 214 outputs, to the web server 213, a content request information which identifies that the virtual private IP address of a transmission source is "192.168.0.11" (Step S26.1.1.1.1.1.1: http (192.168.0.11)). Through the above-described process, the request for the content is completed.

(9-3) Process Flow of Step S27

The web server 213 outputs, to the virtual LAN driver 214, the content in which the virtual private IP address of the transmission destination is identified at "192.168.0.11" (Step S27: http(192.168.0.11)).

The virtual LAN driver 214 outputs a communication packet of the content to the control unit 212. The virtual private IP address of the transmission destination is set at "192.168.0.11", and the virtual private IP address of the transmission source is set at "192.168.0.12" (Step S27.1: packet (192.168.0.11, 192.168.0.12)).

The control unit 212 refers to the client terminal virtual address information 574-1 in the relay server information 57 stored in the relay server information storage unit 217, and thereby confirms that the transmission destination is not in the LAN 2 but in the LAN 1 to be connected thereto through the WAN 3.

In the connection for the IP communication using the virtual address set at "groupID=20070402133100@relay-server-1.abc.net", i.e. the connection established in Step S19, the client terminal 21 outputs the encapsulated communication packet of the content toward the socket of itself, which is set at "Transaction: c2". The client terminal 21 then transmits the communication packet of the content to the relay server 22 (Step S27.1.1: connection(packet)).

The relay server 22 receives the communication packet from the client terminal 21. The control unit 222 refers to the client terminal virtual address information 574-1 in the relay server information 57 stored in the relay server information storage unit 225, and thereby confirms that the transmission destination is not in the LAN 2 but in the LAN 1 to be connected thereto through the WAN 3.

In the connection for the IP communication using the virtual address set at "groupID=20070402133100@relay-server-1.abc.net", i.e. the connection established in Step S6, the relay server 22 outputs the encapsulated communication packet of the content toward the socket of itself, which is set at "Transaction: s2". The relay server 22 then transmits the communication packet of the content to the relay server 12 (Step S27.1.1.1: connection(packet)).

The relay server 12 receives the communication packet from the relay server 22. The control unit 122 refers to the client terminal virtual address information 574-1 in the relay server information 57 stored in the relay server information storage unit 125, and thereby confirms that the transmission destination is not in the LAN 2 to be connected thereto through the WAN 3 but in the LAN 1.

In the connection for the IP communication using the virtual address set at "groupID=20070402133100@relay-server-1.abc.net", i.e. the connection established in Step S15, the relay server 12 outputs the encapsulated communication packet of the content toward the socket of itself, which is set at "Transaction: c1". The relay server 12 then transmits the communication packet of the content to the client terminal 11 (Step S27.1.1.1.1: connection(packet)).

The client terminal 11 receives the communication packet from the relay server 12. The control unit 112 outputs the communication packet of the content to the virtual LAN driver 114 (Step S27.1.1.1.1.1: packet(192.168.0.11, 192.168.0.12).

The virtual LAN driver 114 outputs, to the web browser 113, the content in which the virtual private IP address of the transmission source is identified at "192.168.0.12" (Step S27.1.1.1.1.1.1: http(192.168.0.12)). Through the above-described process, the providing of the content is completed.

(10) Summary of the Data Transmission/Reception

The virtual private IP addresses are allocated to respective apparatuses which constitute the relay communication system, and the connections for the IP communication using the virtual addresses are established between the apparatuses. The respective apparatuses which constitute the relay communication system share the information regarding the establishment of the connections for the IP communication using the virtual private IP addresses of all the apparatuses and the virtual addresses of all the apparatuses in real time in response to changes of the state of the relay communication system.

The data transmission side transmits the data in which the virtual private IP address of the data reception side is designated as the transmission destination. The data reception side receives the data in which the virtual private IP address of the data transmission side is designated as the transmission source. The communication packet of the transmission data is encapsulated in the WAN interposed between the remote LANs.

The respective apparatuses involved in the data transmission/reception collate the virtual private IP addresses of the data reception side with the relay server virtual address information or the client terminal virtual address information, and thereby decide to which apparatus the communication packet of the transmission data is to be transferred. The respective apparatuses involved in the data transmission/reception refer to the connection establishment information for the IP communication using the virtual addresses, and thereby decide to which connection socket the communication packet of the transmission data is to be outputted.

In the VPN of the conventional technology, the virtual private IP addresses are allocated to respective apparatuses. However, the respective apparatuses do not share the information regarding the virtual private IP addresses of all the apparatuses. In addition, the apparatuses do not share the information regarding the connection establishment among all the apparatuses. Therefore, there has been a problem in that, when a communication error occurs when the apparatuses transmit data, it cannot be specified whether it is because the virtual private IP address designated as the transmission destination is not present or because the apparatus designated as the transmission destination has not established the connection.

In the relay communication system according to a preferred embodiment of the present invention, the virtual private IP addresses are allocated to respective apparatuses. Moreover, the respective apparatuses share the information regarding the virtual private IP addresses of all the apparatuses. In addition, the apparatuses also share the information regarding the connection establishment among all the apparatuses. Therefore, the problem in the VPN of the conventional technology can be solved, and a virtual network having expandability and flexibility in response to changes of the state of the relay communication system can be constructed.

Figure 25:
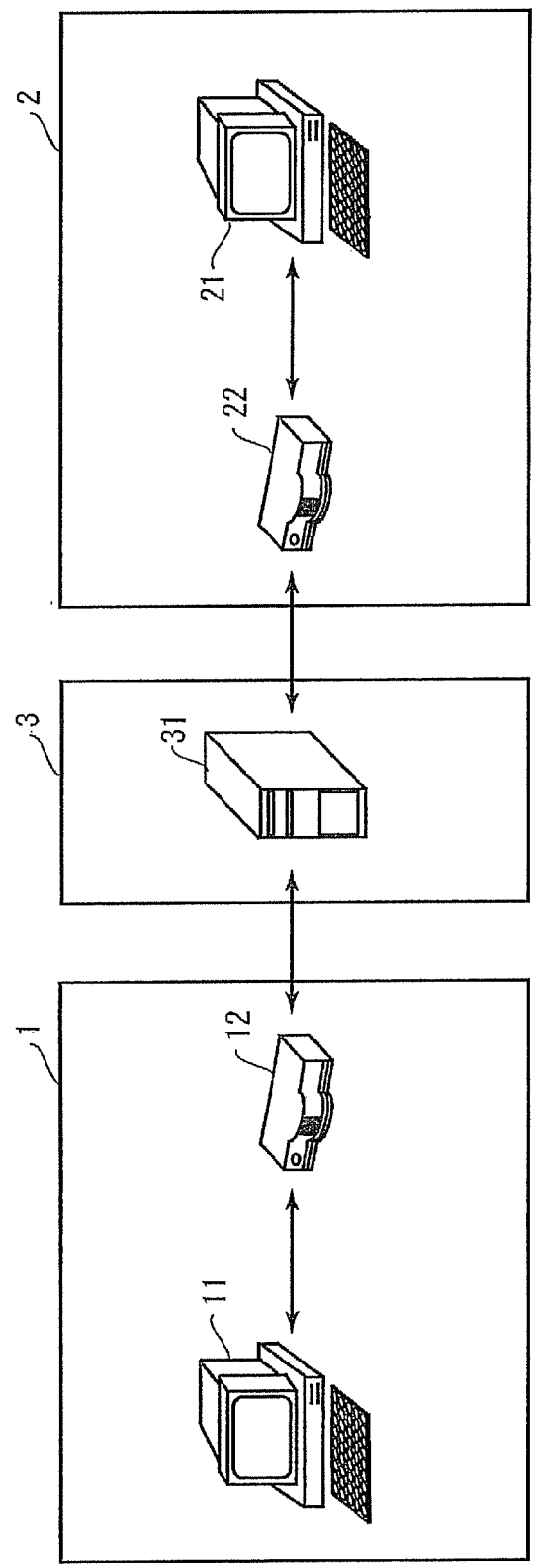
FIG. 25 is a view showing an overall configuration of a relay communication system in a Second Preferred Embodiment of the present invention.

Second Preferred Embodiment (1) Overall Configuration of Relay Communication System A description will be made below of another preferred embodiment of the present invention with reference to the drawings. FIG. 25 is a view showing an overall configuration of a relay communication system. The relay communication system includes LANs 1 and 2 and a WAN 3. The LANs 1 and 2 are small-scale networks constructed remotely from each other. The WAN 3 is a large-scale network such as the Internet.

The LAN 1 includes a client terminal 11 and a relay server 12. The LAN 2 includes a client terminal 21 and a relay server 22. The WAN 3 includes a SIP (Session Initiation Protocol) server 31.

The client terminals 11 and 21 preferably are personal computers and the like, for example. The relay servers 12 and 22 relay communication between the client terminals 11 and 21. The SIP server 31 relays communication between the relay servers 12 and 22.

In the present preferred embodiment, the SIP is preferably used as a communication protocol between the relay servers 12 and 22; however, protocols other than the SIP may be used. In the case of using protocols other than the SIP, the communications between the relay servers 12 and 22 may be directly executed.

(2) Constituent Elements of Relay Server

Figure 26:
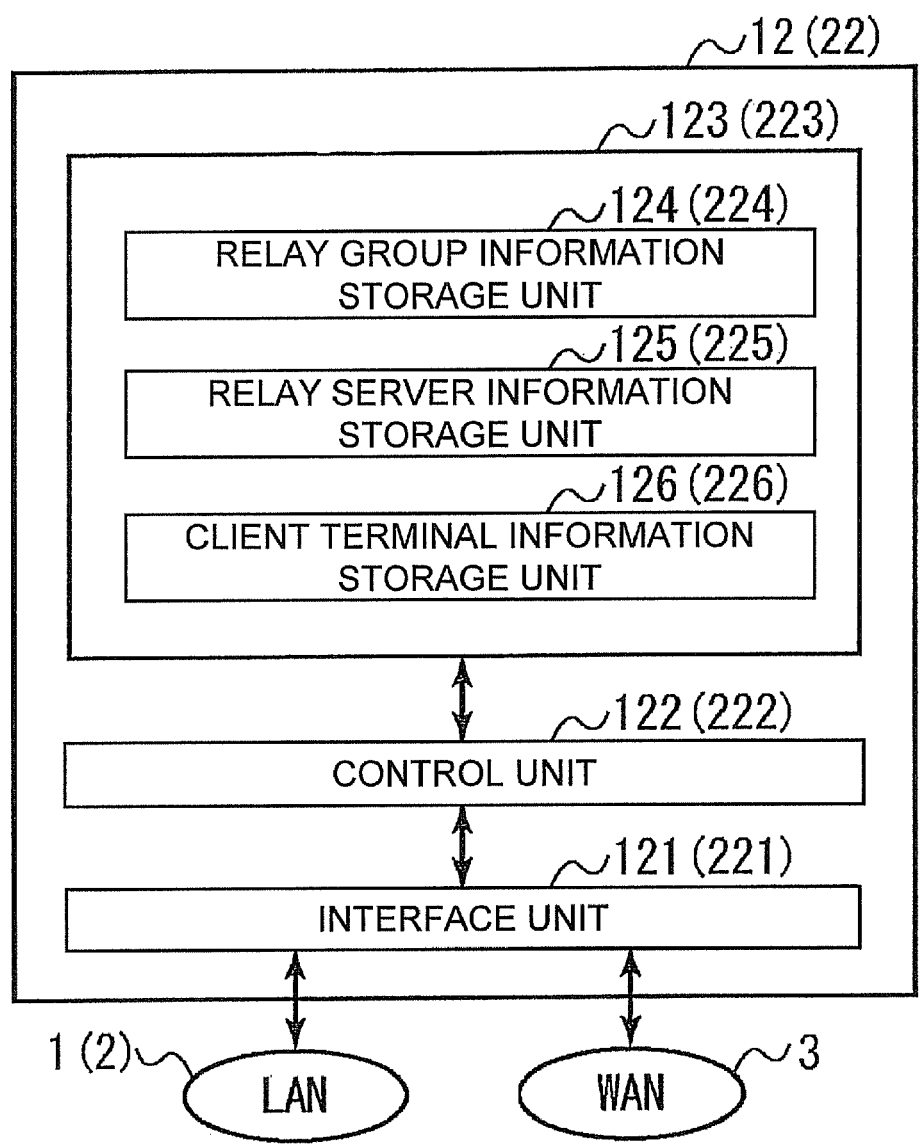
FIG. 26 is a view showing constituent elements of a relay server in the Second Preferred Embodiment of the present invention.

FIG. 26 is a view showing constituent elements of the relay server 12(22). The relay server 12(22) includes an interface unit 121(221), a control unit 122(222) and a database storage unit 123(223). Reference numerals not parenthesized are reference numerals for the relay server 12. Reference numerals parenthesized are reference numerals for the relay server 22.

The interface unit 121(221) performs communication with the client terminal 11(21) connected to the LAN 1(2) through a private IP address. The interface unit 121(221) performs communication with the SIP server 31 connected to the WAN 3 through a global IP address.

The control unit 122(222) performs control for relaying the communication between the client terminals 11 and 21. The control unit 122(222) creates or updates the information (to be described below) stored in the database storage unit 123(223).

The database storage unit 123(223) includes a relay group information storage unit 124(224), a relay server information storage unit 125(225), and a client terminal information storage unit 126(226). A description will be made later of specific examples of the above-mentioned information.

In the present preferred embodiment, unlike the client terminals 11 and 21 to be described later, the relay servers 12 and 22 do not include application programs (hereinafter, referred to as applications); however, they may also include applications in a similar way to the client terminals 11 and 21 to be described later. When the relay servers 12 and 22 include applications, identification information of the applications of the relay servers 12 and 22 may be included as activation information for the applications of the relay servers 12 and 22 in a relay server information to be described later.

(3) Constituent Elements of Client Server

Figures 27, 28:
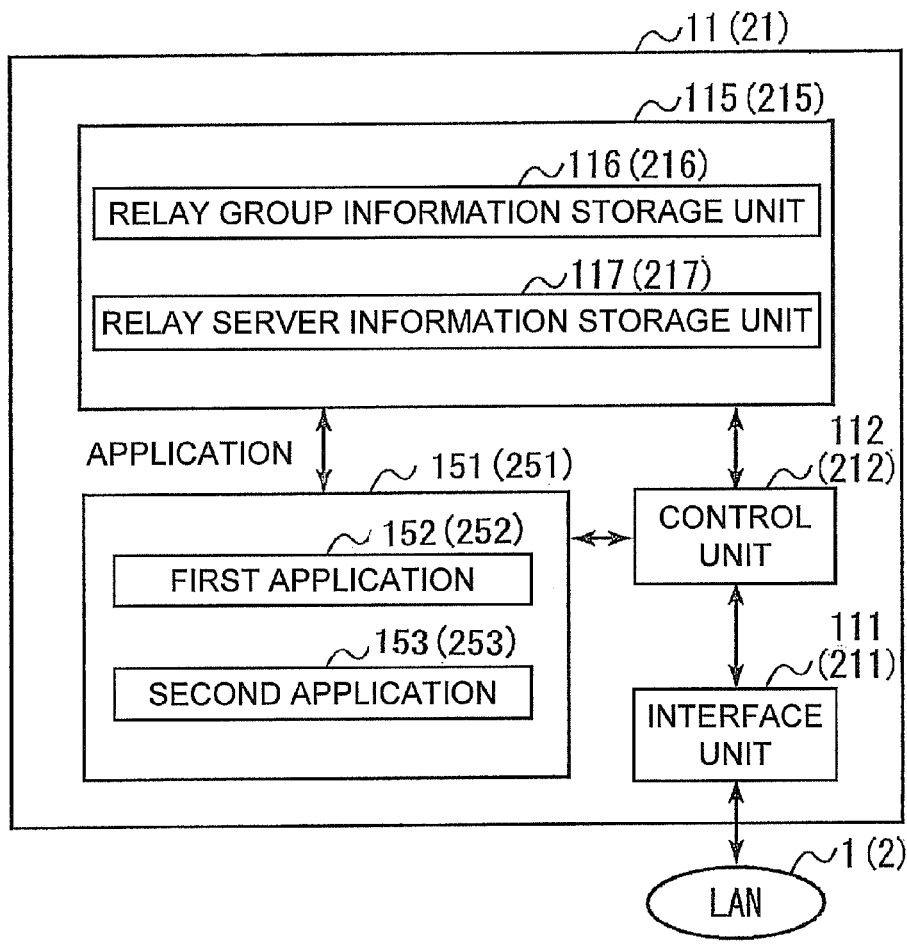
FIG. 27 is a view showing constituent elements of a client terminal in the Second Preferred Embodiment of the present invention.
FIG. 28 is a view showing a specific example of relay group information in the Second Preferred Embodiment of the present invention.

FIG. 27 is a view showing constituent elements of the client terminal 11(21). The client terminal 11(21) includes an interface unit 111(211), a control unit 112(212), an application 151(251) and a database storage unit 115(215). Reference numerals not parenthesized are reference numerals for the client terminal 11. Reference numerals parenthesized are reference numerals for the client terminal 21.

The interface unit 111(211) performs communication with the relay server 12(22) connected to the LAN 1(2) through a private IP address.

The control unit 112(212) performs control for performing communication between the client terminal 11(21) and the relay server 12(22).

The control unit 112(212) inputs or outputs application data to be processed by the application 151(251). The application 151(251) includes a first application 152(252) and a second application 153(253). The first applications 152 and 252 are the same applications. The second applications 153 and 253 are the same applications. The first applications 152 and 252 are different from the second applications 153 and 253.

The control unit 112(212) creates or updates the information (to be described below) stored in the database storage unit 115(215). The database storage unit 115(215) includes a relay group information storage unit 116(216) and a relay server information storage unit 117(217). A description will be made later of specific examples of the above-mentioned information.

(4) Specific Example of Relay Group Information

FIG. 28 is a view showing a relay group information 40 as a specific example of the relay group information. The relay group information is an information indicating outlines of the relay servers which constitute the relay communication system.

The relay group information 40 preferably includes upper information 401 and lower information 402.

Upper information 401 is information regarding the relay group, which is an upper level. "id" indicates identification information of the relay group. "lastmod" indicates the latest update time of the relay group information. "name" indicates the name of the relay group.

The lower information 402 is information regarding the relay server, which is a lower level. "id" indicates identification information of the relay server.

The relay group information 40 is stored in the relay group information storage units 124, 224, 116 and 216. In other words, the relay group information 40 is shared between the relay servers 12 and 22 and the client terminals 11 and 21.

(5) Specific Example of Relay Server Information

FIG. 29 is a view showing a relay server information 50 as a specific example of the relay server information. The relay server information is an information indicating details of the relay servers that constitute the relay communication system, and is an information indicating outlines of the client terminals that constitute the relay communication system.

The relay server information 50 is composed of upper information 501-1 and 501-2 and lower information 502-1 and 502-2. The upper information 501-1 and 501-2 include relay server activation information 503-1 and 503-2, respectively. The lower information 502-1 and 502-2, respectively, include application activation information 504-1 and 504-2 and client terminal site information 505-1 and 505-2 indicating as to whether or not the client terminals are logged in to the relay servers.

The upper information 501-1 and 501-2 are information regarding the relay servers, which are the upper level. "id" indicates identification information of the relay server. "name" indicates the names of the relay servers. The relay server activation information 503-1 and 503-2 are information as to whether or not the relay servers are activated.

The lower information 502-1 and 502-2 are information regarding the client terminals, which are the lower level. "div" indicates the name of a division to which the client terminals belong. The application activation information

504-1 and 504-2 is identification information of the applications, and is information indicating that the applications are activated. "group" indicates identification information of the relay group to which the client terminals belong. "id" indicates identification information of the client terminals. "name" indicates the names of the client terminals. The client terminal site information 505-1 and 505-2 indicate the identification information of the relay servers to which the client terminals have logged in.

The relay server information 50 is stored in the relay server information storage units 125, 225, 117 and 217. In other words, the relay server information 50 is shared between the relay servers 12 and 22 and the client terminals 11 and 21.

When the relay servers are activated, the relay server activation information 503-1 and 503-2 become "active". When the relay servers are not activated, the relay server activation information 503-1 and 503-2 are blank. In such a way, the information as to whether or not the relay servers are activated is shared in the whole relay communication system.

When the applications are activated, it is described in the application activation information 504-1 and 504-2. When the applications are not activated, nothing is described in the application activation information 504-1 and 504-2. In such a way, the information as to whether or not the applications are activated is shared in the whole relay communication system. Moreover, as mentioned above, the relay servers 12 and 22 sometimes store the applications, and activation states of the applications stored in the relay servers 12 and 22 can also be shared in the whole communication system. In this case, in the upper information 501-1 and 501-2, information similar to the application activation information 504-1 and 504-2 may be described as information on the activation states of the applications stored in the relay servers 12 and 22. Moreover, the number of applications for sharing the activation states in the whole relay communication system may be single or plural. The applications can also be stored in both the first client terminal 11 and the first relay server 12, and the activation states of both can be shared.

When the client terminals are logged on to the relay servers, it is described in the client terminal site information 505-1 and 505-2. When the client terminals are not logged on to the relay servers, nothing is described in the client terminal site information 505-1 and 505-2. In such a way, the information as to whether or not the client terminals are logged on to the relay servers is shared in the whole relay communication system.

(6) Specific Example of Client Terminal Information

FIG. 30 is a view showing client terminal information 60 and 70 as specific examples of client terminal information. The client terminal information is an information indicating details of the client terminals that constitute the relay communication system.

The client terminal information 60 and 70, respectively, include client terminal address information 601 and 701, client terminal expiration period information 602 and 702, and client terminal port information 603 and 703.

"div" indicates the names of divisions to which the client terminals belong. "group" indicates identification information of the relay group to which the client terminals belong. Client terminal address information 601 and 701 indicate IP addresses of the client terminals. The client terminal expiration period information 602 and 702 indicate registration expiration periods of the client terminals. "id" indicates identification information of the client terminals. "name" indicates the names of the client terminals. "pass" indicates passwords of the client terminals. The client terminal port information 603 and 703 indicate port numbers of the client terminals.

The client terminal information 60 is stored only in the client terminal information storage unit 126, and the client terminal information 70 is stored only in the client terminal information storage unit 226. In other words, the client terminal information 60 is owned only by the relay server 12, and the client terminal information 70 is owned only by the relay server 22.

(7) Flow of Information Sharing

Figure 31:
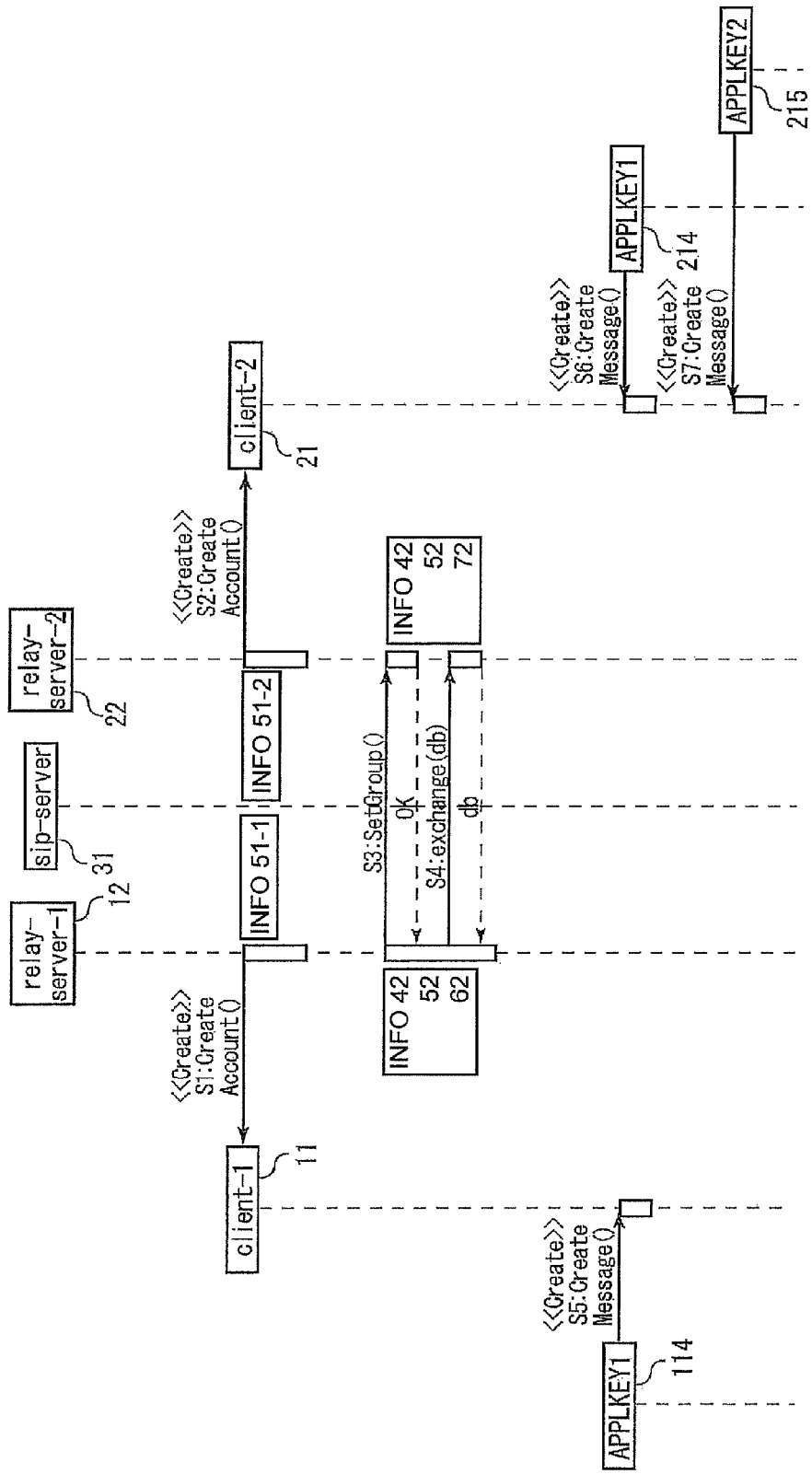
FIG. 31 is a view showing a flow of information sharing in the Second Preferred Embodiment of the present invention.
Figure 32:
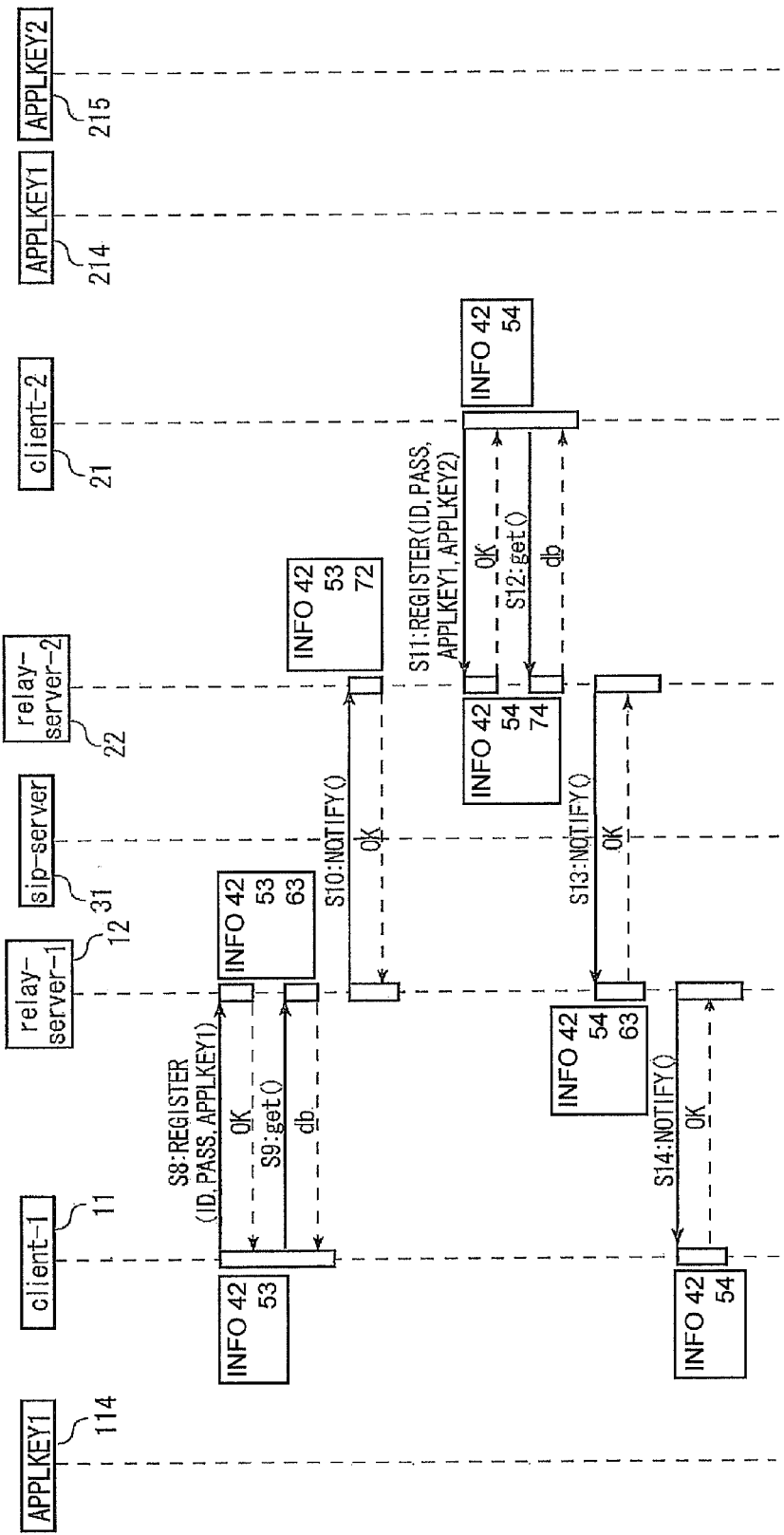
FIG. 32 is a view showing the flow of the information sharing in the Second Preferred Embodiment of the present invention.

FIG. 31 and FIG. 32 are views showing a process flow in which the relay group information and the relay server information are shared in the relay communication system. The relay servers 12 and 22 have joined in the relay communication system. A user of the client terminal 11 logs on to the relay server 12, and activates the first application 152, but meanwhile, does not activate the second applications 153. A user of the client terminal 21 logs on to the relay server 22, and activates the first application 252, and in addition, activates the second applications 253.

(7-1) Process Flow from Step S1 to Step S2

An administrator of the relay server 12 and an administrator of the relay server 22 make a contract to construct a group of the relay communication system between the LANs 1 and 2.

The administrator of the relay server 12 creates an account for the user of the client terminal 11 (Step S1: CreateAccount( )). The control unit 122 creates a relay server information 51-1, and stores the relay server information 51-1 in the relay server information storage unit 125.

The administrator of the relay server 22 creates an account for the user of the client terminal 21 (Step S2: CreateAccount( )). The control unit 222 creates a relay server information 51-2, and stores the relay server information 51-2 in the relay server information storage unit 225.

Through the above-described process, the relay server 12 owns the relay server information 51-1. The relay server 22 owns the relay server information 51-2.

The contents within the first frame in FIG. 33 illustrate the relay server information 51-1. Upper information 511-1 is the information regarding the relay server 12, which is the upper level. As "id", "relay-server-1@abc.net" is set. As "name", "RELAY SERVER 1" is set. As relay server activation information 513-1, "active" is set. In other words, the relay server 12 is activated.

Lower information 512-1 is the information regarding the client terminal 11, which is the lower level. As "div", "software" is set. As "group", "20070402133100@relay-server-1.abc.net" is set. As "id", "client-1@relay-server-1.abc.net" is set. As "name", "CLIENT 1" is set. Client terminal site information 515-1 is blank. In other words, the user of the client terminal 11 has not logged on to the relay server 12.

The application activation information has nothing described. In other words, the user of the client terminal 11 has not logged on to the relay server 12, and accordingly, the relay server 12 is not involved in whether or not the application stored in the client terminal 11 is activated.

The contents within the second frame in FIG. 33 illustrate the relay server information 51-2. Upper information 511-2 is the information regarding the relay server 22, which is the upper level. As "id", "relay-server-2@abc.net" is set. As "name", "RELAY SERVER 2" is set. As relay server activation information 513-2, "active" is set. In other words, the relay server 22 is activated.

Lower information 512-2 is the information regarding the client terminal 21, which is the lower level. As "div", "software" is set. As "group", "20070402133100@relay-server-1.abc.net" is set. As "id", "client-2@relay-server-2.abc.net" is set. As "name", "CLIENT 2" is set. Client terminal site information 515-2 is blank. In other words, the user of the client terminal 21 has not logged on to the relay server 22.

The application activation information has nothing described. In other words, the user of the client terminal 21 has not logged on to the relay server 22, and accordingly, the relay server 22 is not involved in whether or not the application stored in the client terminal 21 is activated.

(7-2) Process Flow from Step S3 to Step S4

In the following description, the communication between the relay servers 12 and 22 is relayed by the SIP server 31. A description will be made of a method in which the relay server 12(22) performs the communication with the relay server 22(12) through the SIP server 31.

The relay server 12(22) transmits, to the SIP server 31, data in which the account of the relay server 22(12) is designated as the communication destination, and the like. The SIP server 31 allows the accounts of the relay servers 12 and 22 to correspond to the global IP addresses of the relay servers 12 and 22, respectively. The SIP server 31 acquires the global IP address of the relay server 22(12) based on the account of the relay server 22(12). The SIP server 31 then transmits, to the relay server 22(12), data in which the global IP address of the relay server 22(12) is designated as the communication destination, and the like.

The relay server 12 requests the relay server 22 to construct the group of the relay communication system (Step S3: SetGroup( )). The control unit 122 creates a relay group information 42, and stores the relay group information 42 in the relay group information storage unit 124. The control unit 222 creates a relay group information 42, and stores the relay group information 42 in the relay group information storage unit 224.

The relay server 12 requests the relay server 22 to exchange the relay server information therewith (Step S4: exchange (db)). The relay server 12 transmits a copy of the relay server information 51-1 to the relay server 22. The relay server 22 transmits a copy of the relay server information 51-2 to the relay server 12.

The control unit 122 synthesizes the copy of the relay server information 51-2 and the relay server information 51-1, thereby creates relay server information 52, and stores the relay server information 52 in the relay server information storage unit 125. The control unit 222 synthesizes the copy of the relay server information 51-1 and the relay server information 51-2, thereby creates relay server information 52, and stores the relay server information 52 in the relay server information storage unit 225.

The control unit 122 creates client terminal information 62, and stores the client terminal information 62 in the client terminal information storage unit 126. The control unit 222 creates client terminal information 72, and stores the client terminal information 72 in the client terminal information storage unit 226. Creation process and storing process for the client terminal information 62 are executed in Step S1, and creation process and storing process for the client terminal information 72 are executed in Step S2.

Through the above-described process, the relay server 12 owns the relay group information 42, the relay server information 52 and the client terminal information 62. The relay server 22 owns the relay group information 42, the relay server information 52 and the client terminal information 72. The relay group information 42 and the relay server information 52 are shared between the relay servers 12 and 22.

The contents within the first frame in FIG. 34 illustrate the relay group information 42. Upper information 421 is the information regarding the relay group, which is the upper level. As "id", "20070402133100@relay-server-1.abc.net" is set. As "lastmod", "20070402133100" is set. As "name", "GROUP 1" is set.

Lower information 422 is the information regarding the relay servers 12 and 22, which is the lower level. As "id", "relay-server-1@abc.net" and "relay-server-2@abc.net" are set.

The contents within the second frame in FIG. 34 illustrate the relay server information 52. Upper information 521-1 and 521-2 are similar to the upper information 511-1 and 511-2 in FIG. 33, respectively. Lower information 522-1 and 522-2 are similar to the lower information 512-1 and 512-2 in FIG. 33, respectively.

The contents within the third frame in FIG. 34 illustrate the client terminal information 62. As "div", "software" is set. As "group", "20070402133100@relay-server-1.abc.net" is set. As "id", "client-1@relay-server-1.abc.net" is set. As "name", "CLIENT 1" is set. As "pass", "client-1" is set.

Client terminal address information 621 is blank. As client terminal expiration period information 622, "0" is set. Client terminal port information 623 is blank. In other words, the user of the client terminal 11 has not logged on to the relay server 12.

The contents within the fourth frame in FIG. 34 illustrate the client terminal information 72. As "div", "software" is set. As "group", "20070402133100@relay-server-1.abc.net" is set. As "id", "client-2@relay-server-2.abc.net" is set. As "name", "CLIENT 2" is set. As "pass", "client-2" is set.

Client terminal address information 721 is blank. As client terminal expiration period information 722, "0" is set. Client terminal port information 723 is blank. In other words, the user of the client terminal 21 has not logged on to the relay server 22.

(7-3) Process Flow from Step S5 to Step S7

The user of the client terminal 11 activates the first application 152, and creates a message desired to be shared in the relay communication system. The first application 152 registers preset self-identification information in the control unit 112 (Step S5: CreateMessage( )). The user of the client terminal 11 activates the first application 152, but meanwhile, does not activate the second application 153.

The user of the client terminal 21 activates the first application 252, and creates a message desired to be shared in the relay communication system. The first application 252 registers preset self-identification information in the control unit 212 (Step S6: CreateMessage( )). The user of the client terminal 21 activates the first application 252, and in addition, activates the second application 253 (Step S7: CreateMessage( )). Steps S6 and S7 are executed in a similar way.

(7-4) Process Flow from Step S8 to Step S10

The user of the client terminal 11 inputs "client-1@relay-server-1.abc.net" as the identification information of the client terminal 11, and inputs "client-1" as the password of the client terminal 11. The user of the client terminal 11 has activated the first application 152 in Step S5. The user of the client terminal 11 logs on to the relay server 12 (Step S8: REGISTER (ID, PASS, APPLKEY1)). The control unit 122 performs authentication of the user of the client terminal 11 by referring to the client terminal information 62.

The control unit 122 receives the login of the user of the client terminal 11. The control unit 122 then updates the relay server information 52, thereby creates relay server information 53, and stores the relay server information 53 in the relay server information storage unit 125. The control unit 122 updates the client terminal information 62, thereby creates client terminal information 63, and stores the client terminal information 63 in the client terminal information storage unit 126. The control unit 122 does not update the relay group information 42.

The client terminal 11 requests the relay server 12 to provide it with the relay group information and the relay server information (Step S9: get( )). The relay server 12 then transmits copies of the relay group information 42 and the relay server information 53 to the client terminal 11. The client terminal 11 stores the relay group information 42 in the relay group information storage unit 116, and stores the relay server information 53 in the relay server information storage unit 117.

By referring to the relay group information 42 and the relay server information 53, the control unit 122 determines a relay server which is to be notified that the relay server information 52 has been updated to the relay server information 53. The control unit 122 determines the relay server 22, in which relay server activation information 533-2 of the relay server information 53 is "active", as the relay server to be notified of the above-described update of the information.

The relay server 12 then notifies the relay server 22 that the relay server information 52 has been updated to the relay server information 53 (Step S10: NOTIFY( )). In response, the control unit 222 updates the relay server information 52, thereby creates the relay server information 53, and stores the relay server information 53 in the relay server information storage unit 225.

By referring to the client terminal information 72, the control unit 222 determines a client terminal which is to be notified that the relay server information 52 has been updated to the relay server information 53. The control unit 222 does not determine the client terminal 21, in which the client terminal address information 721 and the client terminal port information 723 of the client terminal information 72 are blank, as the client terminal to be notified of the update of the information.

Through the above-described process, the relay server 12 owns the relay group information 42, the relay server information 53 and the client terminal information 63. The relay server 22 owns the relay group information 42, the relay server information 53 and the client terminal information 72. The client terminal 11 owns the relay group information 42 and the relay server information 53. The relay group information 42 and the relay server information 53 are shared between the relay servers 12 and 22 and the client terminal 11.

The contents within the first frame in FIG. 35 illustrate the relay group information 42. In the process flow from Step S8 to Step S10, no new relay server has joined the relay communication system, and accordingly, the relay group information 42 is not updated.

The contents within the second frame in FIG. 35 illustrate the relay server information 53. The updated portions are underlined. The user of the client terminal 11 activates the first application 152, but meanwhile, does not activate the second application 153. Moreover, the user of the client terminal 11 is logged on to the relay server 12. Therefore, as application activation information 534-1 of lower information 532-1, "applkey="applkey1"" is described; however, "applkey="applkey2"" is not described. Moreover, client terminal site information 535-1 of the lower information 532-1 is determined at "relay-server-1@abc.net".

The contents within the third frame in FIG. 35 illustrate the client terminal information 63. The updated portions are underlined. The user of the client terminal 11 is logged on to the relay server 12. Therefore, client terminal address information 631 is determined at "192.168.10.2". Moreover, client terminal expiration period information 632 is determined at "1213935960484". Furthermore, client terminal port information 633 is determined at "5070".

The contents within the fourth frame in FIG. 35 illustrate the client terminal information 72. In the process flow from Step S8 to Step S10, the user of the client terminal 21 has not logged on to the relay server 22, and accordingly, the client terminal information 72 is not updated.

(7-5) Process Flow from Step S11 to Step S14

The user of the client terminal 21 inputs "client-2@relay-server-2.abc.net" as the identification information of the client terminal 21, and inputs "client-2" as the password of the client terminal 21. The user of the client terminal 21 has activated the first application 252 and the second application 253 in Steps S6 and S7. The user of the client terminal 21 logs on to the relay server 22 (Step S11: REGISTER (ID, PASS, APPLKEY1, APPLKEY2)). The control unit 222 performs authentication of the user of the client terminal 21 by referring to the client terminal information 72.

The control unit 222 receives the login of the user of the client terminal 21. The control unit 222 then updates the relay server information 53, thereby creates relay server information 54, and stores the relay server information 54 in the relay server information storage unit 225. The control unit 222 updates the client terminal information 72, thereby creates client terminal information 74, and stores the client terminal information 74 in the client terminal information storage unit 226. The control unit 222 does not update the relay group information 42.

The client terminal 21 requests the relay server 22 to provide it with the relay group information and the relay server information (Step S12: get( )). The relay server 22 then transmits copies of the relay group information 42 and the relay server information 54 to the client terminal 21. The client terminal 21 stores the relay group information 42 in the relay group information storage unit 216, and stores the relay server information 54 in the relay server information storage unit 217.

By referring to the relay group information 42 and the relay server information 54, the control unit 222 determines a relay server which is to be notified that the relay server information 53 has been updated to the relay server information 54. The control unit 222 determines the relay server 12, in which relay server activation information 543-1 of the relay server information 54 is "active", as the relay server to be notified of the above-described update of the information.

The relay server 22 then notifies the relay server 12 that the relay server information 53 has been updated to the relay server information 54 (Step S13: NOTIFY( )). In response, the control unit 122 updates the relay server information 53, thereby creates the relay server information 54, and stores the relay server information 54 in the relay server information storage unit 125.

By referring to the client terminal information 63, the control unit 122 determines a client terminal which is to be notified that the relay server information 53 has been updated to the relay server information 54. The control unit 122 determines the client terminal 11, in which the client terminal address information 631 and the client terminal port information 633 of the client terminal information 63 have previously been determined, as the client terminal to be notified of the update of the information.

The relay server 12 notifies the client terminal 11 that the relay server information 53 has been updated to the relay server information 54 (Step S14: NOTIFY( )). The control unit 112 then updates the relay server information 53, thereby creates the relay server information 54, and stores the relay server information 54 in the relay server information storage unit 117.

Through the above-described process, the relay server 12 owns the relay group information 42, the relay server information 54 and the client terminal information 63. The relay server 22 owns the relay group information 42, the relay server information 54 and the client terminal information 74. The client terminal 11 owns the relay group information 42 and the relay server information 54. The client terminal 21 owns the relay group information 42 and the relay server information 54. The relay group information 42 and the relay server information 54 are shared between the relay servers 12 and 22 and the client terminals 11 and 21.

The contents within the first frame in FIG. 36 illustrate the relay group information 42. In the process flow from Step S11 to Step S14, no new relay server has joined the relay communication system, and accordingly, the relay group information 42 is not updated.

The contents within the second frame in FIG. 36 illustrate the relay server information 54. The updated portions are underlined. The user of the client terminal 21 activates the first application 252, and in addition, activates the second applications 253. Moreover, the user of the client terminal 21 is logged on to the relay server 22. Therefore, as application activation information 544-2 of lower information 542-2, "applkey="applkey1, applkey2"" is described. Moreover, client terminal site information 545-2 of the lower information 542-2 is determined at "relay-server-2@abc.net".

The contents within the third frame in FIG. 36 illustrate the client terminal information 63. In the process flow from Step S11 to Step S14, the user of the client terminal 11 has not logged off from the relay server 12, and accordingly, the client terminal information 63 is not updated.

The contents within the fourth frame in FIG. 36 illustrate the client terminal information 74. The updated portions are underlined. The user of the client terminal 21 is logged on to the relay server 22. Therefore, client terminal address information 741 is determined at "192.168.1.10". Moreover, client terminal expiration period information 742 is determined at "1213935978484". Furthermore, client terminal port information 743 is determined at "5070".

(8) Summary of the Information Sharing

In the relay communication system, changes in the number and the connection state of the LANs and the client terminals may occur. Activation states of applications stored in the client terminals and the relay servers may also be changed. Accordingly, when recognizing such changes, one of the relay servers immediately updates the relay group information, the relay server information and the client terminal information.

Then, the one of the relay servers immediately notifies the other relay server, which is described in the relay group information and the relay server information, that the relay group information and the relay server information have been updated. Moreover, the one of the relay servers immediately notifies the client terminal, which is described in the client terminal information, that the relay group information and the relay server information have been updated.

However, even if the other relay server is described in the relay group information and the relay server information, the one of the relay servers does not immediately notify the other relay server of the above-described update of the information upon having determined that the other relay server is in an unconnected state. Moreover, even if the client terminal information is described in the client terminal information, the one of the relay servers does not immediately notify the client terminal of the update of the information upon having determined that the client terminal is in an unconnected state.

In such a way, the information regarding changes in the number and the connection state of the LANs and the client terminals and information regarding the activation states of the applications stored in the client terminals and the relay servers are shared in the whole relay communication system in real time.

(9) Flow of Data Transmission/Reception

Figure 37:
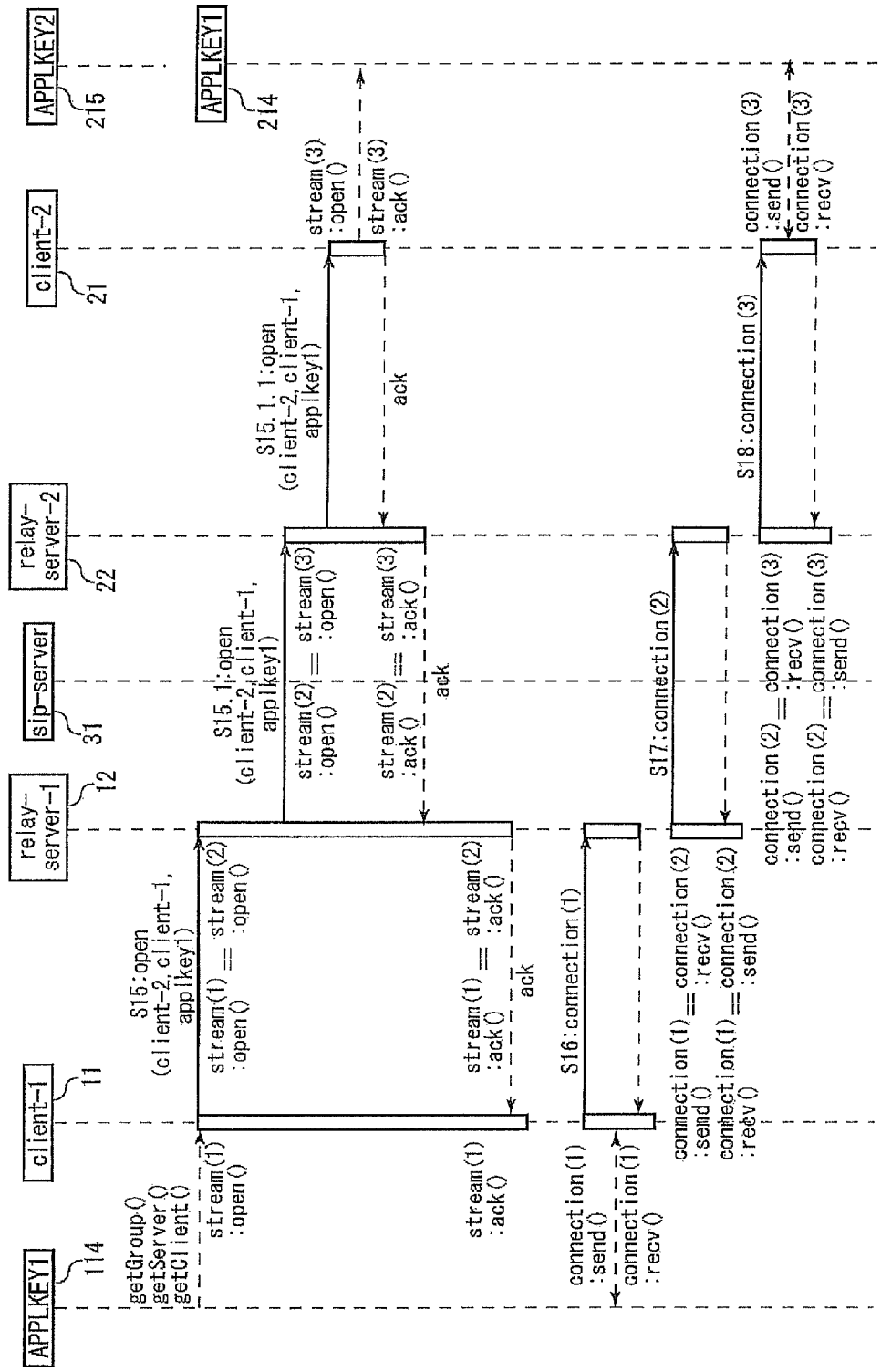
FIG. 37 is a view showing a flow of data transmission/reception in the Second Preferred Embodiment of the present invention.
Figure 38:
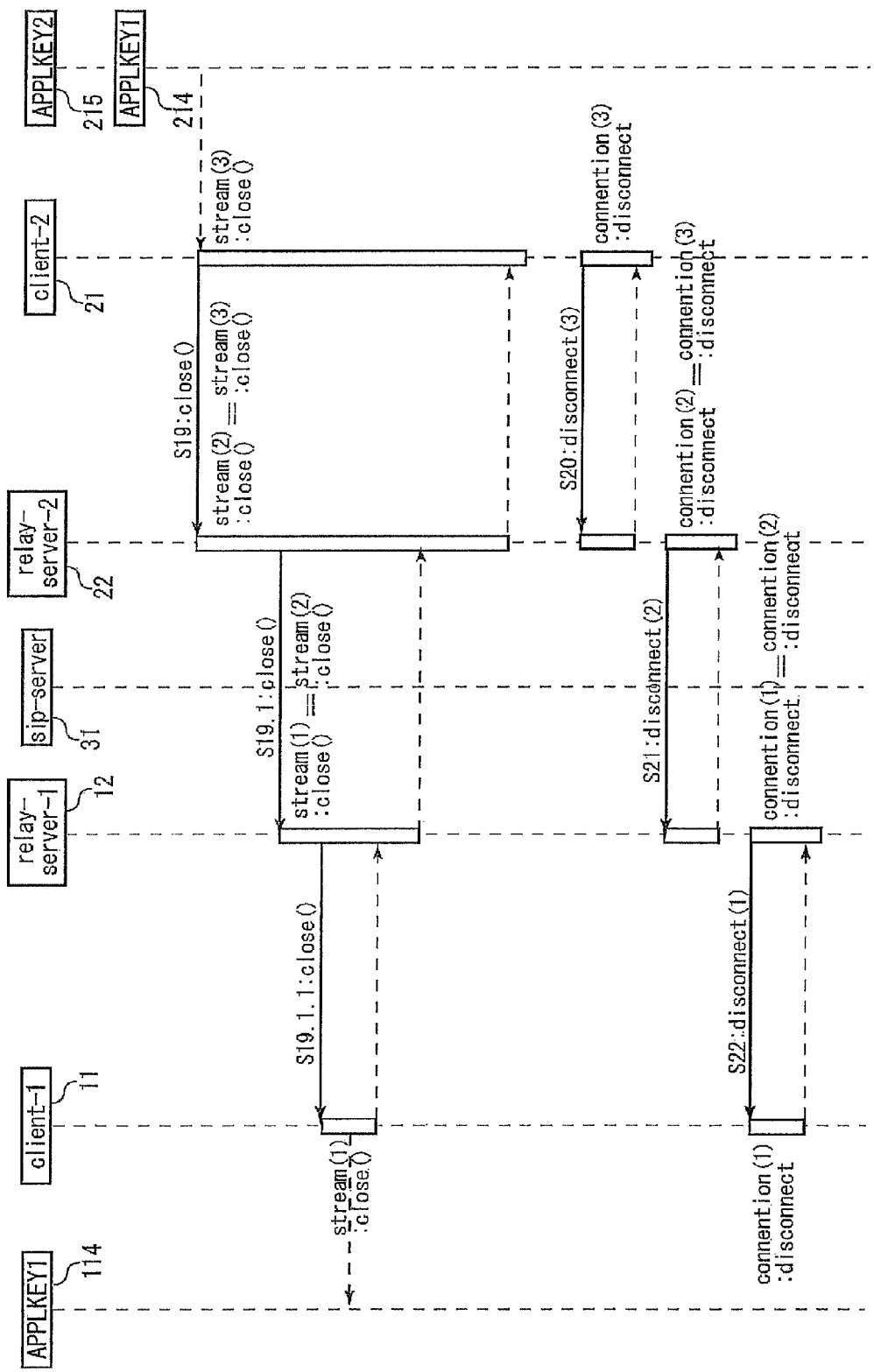
FIG. 38 is a view showing the flow of the data transmission/reception in the Second Preferred Embodiment of the present invention.

FIG. 37 and FIG. 38 are views showing a flow of data transmission/reception after the information sharing. After the information sharing, the relay group information 42, the relay server information 54, and the client terminal information 63 and 74, as shown in FIG. 36, are stored.

A user of the client terminal 11 logs on to the relay server 12, and activates the first application 152, but meanwhile, does not activate the second applications 153. A user of the client terminal 21 logs on to the relay server 22, and activates the first application 252, and in addition, activates the second applications 253.

The first applications 152 and 252 are the same applications. The second applications 153 and 253 are the same applications. The first applications 152 and 252 are different from the second applications 153 and 253.

(9-1) Process Flow from Step S15 to Step S18

FIG. 37 shows a process flow for establishing the connection before transmitting/receiving data. The user of the client terminal 11 confirms the relay group to which the client terminal 11 belongs. Specifically, the user of the client terminal 11 causes the relay group information 42 to be displayed on a display screen of the client terminal (getGroup( )). In the relay group information 42, "relay-server-1@abc.net" and "relay-server-2@abc.net", which are identification information of the relay servers 12 and 22, are set. The user of the client terminal 11 confirms that the client terminal 11 belongs to the relay group constituted by the relay servers 12 and 22.

The user of the client terminal 11 causes the relay server information 54, which corresponds to the relay group information 42, to be displayed on the display screen of the client terminal 11 (getServer( )). The user of the client terminal 11 refers to the relay server information 54 and confirms the information on the relay servers that constitute the relay group, on the client terminals connected to the relay servers, and on the applications activated in the relay group.

The user of the client terminal 11 refers to the relay server information 54 and confirms that the transmission/reception of the data with the client terminal 21 is possible. Moreover, the user of the client terminal 11 confirms that the first application 252 is activated in the client terminal 21, and that the communication therewith is possible.

The first application 152 confirms that, with regard to the relay server 12, relay server activation information 543-1 of the relay server information 54 is set at "active". In other words, the first application 152 confirms that the relay server 12 is activated.

The first application 152 confirms that, with regard to the relay server 22, relay server activation information 543-2 of the relay server information 54 is set at "active". In other words, the first application 152 confirms that the relay server 22 is activated.

The first application 152 confirms that, with regard to the client terminal 21, client terminal site information 545-2 of the relay server information 54 is set at "relay-server-2@abc.net". In other words, the first application 152 confirms that the client terminal 21 has logged on to the relay server 22.

The first application 152 confirms that, with regard to the client terminal 21, application activation information 544-2 of the relay server information 54 is set at "applkey1, applkey2". In other words, the first application 152 confirms that the first application 252 and the second application 253, which are stored in the client terminal 21, are activated.

The first application 152 confirms that the data can be transmitted through the relay servers 12 and 22 to the first application 252 stored in the client terminal 21. The first application 152 then decides to transmit the data to the first application 252 stored in the client terminal 21.

The first application 152 outputs a request information for connection establishment to the control unit 112. The client terminal then transmits the request information for the connection establishment to the relay server 12 in communication (stream(1)) between the client terminal 11 and the relay server 12 (Step S15: open (client-2, client-1, applkey1)).

The relay server 12 associates the stream(1) with communication (stream(2)) between the relay server 12 and the relay server 22 as communications to be relayed by the relay server 12 itself (stream(1): open( )==stream(2): open( )). In the stream(2), the relay server 12 transmits the request information for the connection establishment to the relay server 22 (Step S15.1: open(client-2, client-1, applkey1)).

The relay server 22 associates the stream(2) with communication (stream(3)) between the relay server 22 and the client terminal 21 as communications to be relayed by the relay server 22 itself (stream(2):open( )==stream(3):open( )). In the stream(3), the relay server 22 transmits the request information for the connection establishment to the client terminal 21 by using the client terminal information 74 (Step S15.1.1: open(client-2, client-1, applkey1)). Specifically, the request information for the connection establishment is transmitted to the client terminal 21 based on "192.168.1.10" as the client terminal information 742, "5070" as the client terminal port information 745, and the like, which correspond to the client terminal 21. The control unit 212 confirms that the request information for the connection establishment is to be outputted to the first application 252, and should not be outputted to the second application 253. The control unit 212 outputs the request information for the connection establishment to the first application 252.

In the stream(3), the client terminal 21 transmits a permission information for the connection establishment to the relay server 22 (ack to Step S15.1.1).

The relay server 22 refers to the association between the stream(2) and the stream(3) (stream(2):ack( )==stream(3): ack( )). In the stream(2), the relay server 22 transmits the permission information for the connection establishment to the relay server 12 (ack to Step S15.1).

The relay server 12 refers to the association between the stream(1) and the stream(2) (stream(1):ack( )==stream(2): ack( )). In the stream(1), the relay server 12 transmits the permission information for the connection establishment to the client terminal 11 (ack to Step S15).

For the relay server 12, the client terminal 11 establishes connection (connection(1)) between the client terminal 11 and the relay server 12 (Step S16: connection(1)).

For the relay server 22, the relay server 12 establishes connection (connection(2)) between the relay server 12 and the relay server 22 (Step S17: connection(2)). The relay server 12 associates the connection(1) and the connection(2) with each other as connections to be relayed by the relay server 12 itself.

For the client terminal 21, the relay server 22 establishes connection (connection(3)) between the relay server 22 and the client terminal 21 by using the client terminal information 74 (Step S18: connection(3)). The relay server 22 associates the connection(2) and the connection(3) with each other as connections to be relayed by the relay server 22 itself.

Through the above-described process, the first application 152 stored in the client terminal 11 and the first application 252 stored in the client terminal 21 can transmit/receive data bidirectionally, as will be described later.

A description is made of the case where the first application 152 stored in the client terminal 11 transmits data to the first application 252 stored in the client terminal 21. The first application 152 outputs the data to the control unit 112. The client terminal 11 transmits the data in the connection(1) (connection(1): send ( )). When receiving the data in the connection(1), the relay server 12 refers to the association between the connection(1) and the connection(2), and thereby transmits the data in the connection(2) (connection (1): recv( )==connection(2): send( )).

When receiving the data in the connection(2), the relay server 22 refers to the association between the connection(2) and the connection(3), and thereby transmits the data in the connection(3) (connection(2):recv( )==connection(3): send( )). The client terminal 21 receives the data in the connection(3) (connection(3): recv( )). The control unit 212 outputs the data to the first application 252.

A description is made of the case where the first application 252 stored in the client terminal 21 transmits data to the first application 152 stored in the client terminal 11. The first application 252 outputs the data to the control unit 212. The client terminal 21 transmits the data in the connection(3) (connection(3): send ( )). When receiving the data in the connection(3), the relay server 22 refers to the association between the connection(2) and the connection(3), and thereby transmits the data in the connection(2) (connection (2): send( )==connection(3): recv( )).

When receiving the data in the connection(2), the relay server 12 refers to the association between the connection(1) and the connection(2), and thereby transmits the data in the connection(1) (connection(1):send( )==connection(2): recv( )). The client terminal 11 receives the data in the connection(1) (connection(1): recv( )). The control unit 112 outputs the data to the first application 152.

(9-2) Process Flow from Step S19 to Step S22

FIG. 38 shows a process flow for disconnecting the connections after transmitting/receiving the data. In FIG. 37, the first application 152 stored in the client terminal 11 is transmitting the request information for the connection establishment to the first application 252 stored in the client terminal 21. In FIG. 38, the first application 252 stored in the client terminal 21 is transmitting a request information for connection disconnection to the first application 152 stored in the client terminal 11.

The first application 252 outputs the request information for the connection disconnection to the control unit 212. In the stream(3), the client terminal 21 transmits the request information for the connection disconnection to the relay server 22 (Step S19: close( )).

The relay server 22 refers to the association between the stream(2) and the stream(3) (stream(2):close ( )==stream(3): close( )). In the stream(2), the relay server 22 transmits the request information for the connection disconnection to the relay server 12 (Step S19.1: close( )).

The relay server 12 refers to the association between the stream(1) and the stream(2) (stream(1):close( )==stream(2): close( )). In the stream(1), the relay server 12 transmits the request information for the connection disconnection to the client terminal 11 (Step S19.1.1: close( )). The control unit 112 outputs the request information for the connection disconnection to the first application 152.

The client terminal 21 disconnects the connection(3) from the relay server 22 (Step S20: disconnect (3)).

The relay server 22 refers to the association between the connection(2) and the connection(3) (connection(2): disconnect=connection(3): disconnect). For the relay server 12, the relay server 22 disconnects the connection(2) (Step S21: disconnect(2)).

The relay server 12 refers to the association between the connection(1) and the connection(2) (connection(1): disconnect=connection(2): disconnect). For the client terminal 11, the relay server 12 disconnects the connection(1) (Step S22: disconnect(1)).

The client terminals and the relay servers refer to the relay group information and the relay server information. The client terminals and the relay servers can confirm changes in the number and the connection state of the other client terminals and relay servers, and in addition, the activation states of the applications stored in the other client terminals and relay servers. The client terminals and the relay servers can confirm the states of the other client terminals and relay servers and, thus, can transmit/receive data bidirectionally to and from the other client terminals and relay servers.

Figure 39:
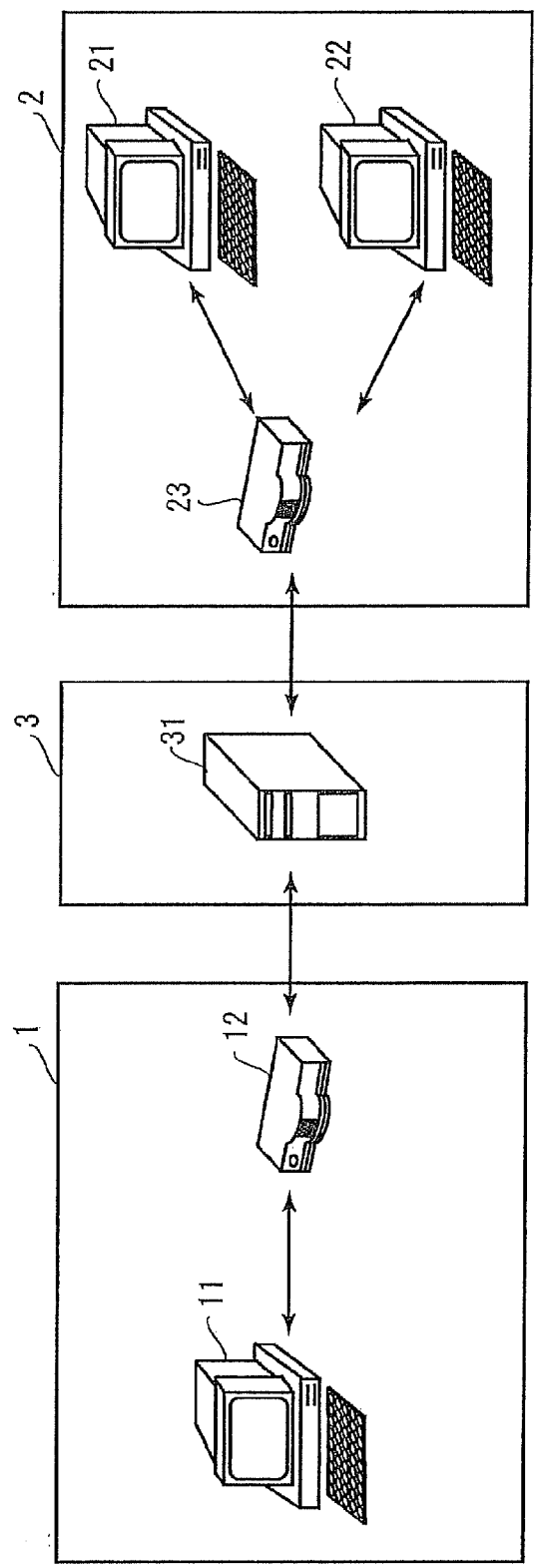
FIG. 39 is a view showing an overall configuration of a relay communication system in a Third Preferred Embodiment of the present invention.

Third Preferred Embodiment (1) Overall Configuration of Relay Communication System A description will be made below of an additional preferred embodiment of the present invention with reference to the drawings. FIG. 39 is a view showing an overall configuration of a relay communication system. The relay communication system includes LANs 1 and 2 and a WAN 3. The LANs 1 and 2 are small-scale networks constructed remotely from each other. The WAN 3 is a large-scale network such as the Internet.

The LAN 1 includes a client terminal 11 and a relay server 12. The LAN 2 includes client terminals 21 and 22 and a relay server 23. The WAN 3 includes a SIP (Session Initiation Protocol) server 31.

The client terminals 11, 21 and 22 preferably are personal computers and the like, for example. The relay servers 12 and 23 relay communication between the client terminal 11 and the client terminals 21 and 22. The SIP server 31 relays communication between the relay servers 12 and 23.

In this preferred embodiment, the SIP is preferably used as a communication protocol between the relay servers 12 and 23; however, protocols other than the SIP may be used. In the case of using protocols other than the SIP, the communication between the relay servers 12 and 23 may be directly executed.

(2) Constituent Elements of Relay Server

Figures 40, 41:
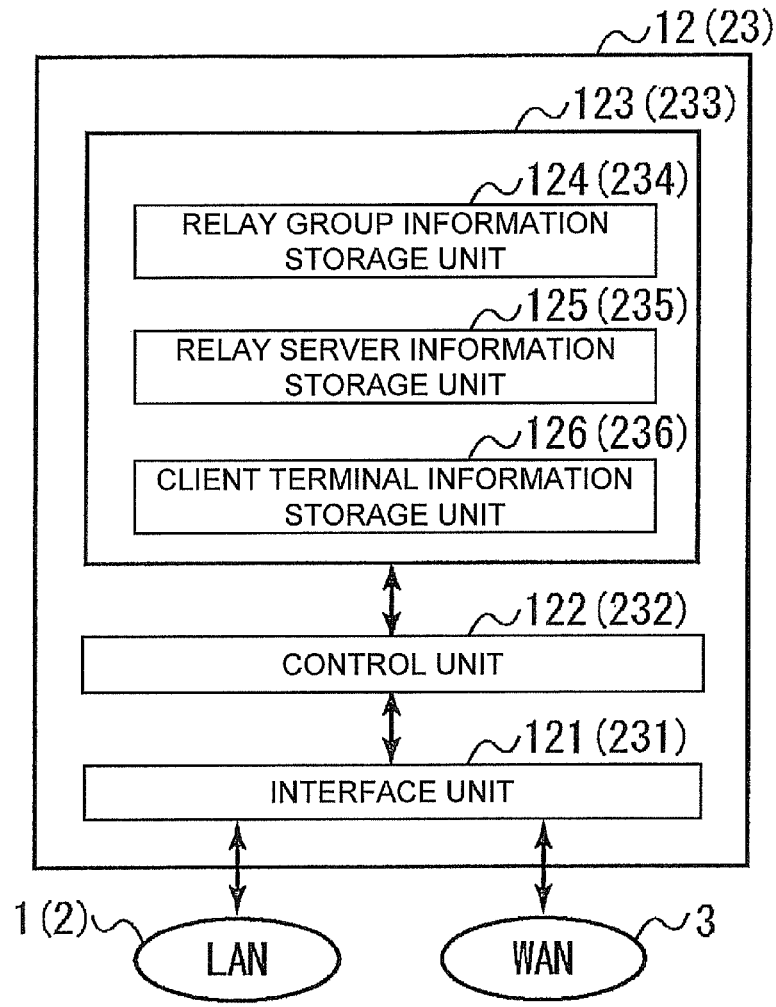
FIG. 40 is a view showing constituent elements of a relay server in the Third Preferred Embodiment of the present invention.
FIG. 41 is a view showing a specific example of relay group information in the Third Preferred Embodiment of the present invention.

FIG. 40 is a view showing constituent elements of the relay server 12(23). The relay server 12(23) includes an interface unit 121(231), a control unit 122(232) and a database storage unit 123(233). Reference numerals not parenthesized are reference numerals for the relay server 12. Reference numerals parenthesized are reference numerals for the relay server 23.

The interface unit 121(231) performs communication with the client terminal 11 (21, 22) connected to the LAN 1(2) through a private IP address. The interface unit 121(231) performs communication with the SIP server 31 connected to the WAN 3 using a global IP address.

The control unit 122(232) performs control for relaying the communication between the client terminal 11 and the client terminals 21 and 22. The control unit 122(232) creates or updates the information (to be described below) stored in the database storage unit 123(233).

The database storage unit 123(233) includes a relay group information storage unit 124(234), a relay server information storage unit 125(235), and a client terminal information storage unit 126(236). A description will be made below of specific examples of the above-mentioned information.

(3) Specific Example of Relay Group Information

FIG. 41 is a view showing a relay group information 40 as a specific example of the relay group information. The relay group information is an information indicating outlines of the relay servers that constitute the relay communication system.

The relay group information 40 preferably includes upper information 401 and lower information 402.

Upper information 401 is information regarding the relay group, which is the upper level. "id" indicates identification information of the relay group. "lastmod" indicates the latest update time of the relay group information. "name" indicates the name of the relay group.

The lower information 402 is information regarding the relay server, which is a lower level. "id" indicates identification information of the relay server.

The relay group information 40 is stored in the relay group information storage units 124 and 234. In other words, the relay group information 40 is shared between the relay servers 12 and 23. Moreover, the relay group information 40 may be shared between the relay servers and the client terminals.

(4) Specific Example of Relay Server Information

FIG. 42 is a view showing a relay server information 50 as a specific example of the relay server information. The relay server information is an information indicating details of the relay servers that constitute the relay communication system, and is an information indicating outlines of the client terminals that constitute the relay communication system.

The relay server information 50 is composed of upper information 501-1 and 501-2 and lower information 502-1 and 502-2. The upper information 501-1 and 501-2 include relay server activation information 503-1 and 503-2, respectively. The lower information 502-1 and 502-2, respectively, include client terminal site information 504-1 and 504-2 indicating as to whether or not the client terminals have logged on to the relay servers.

The upper information 501-1 and 501-2 are information regarding the relay servers, which are the upper level. "id" indicates identification information of the relay server. "name" indicates the names of the relay servers. The relay server activation information 503-1 and 503-2 are information as to whether the relay servers are activated.

The lower information 502-1 and 502-2 are information regarding the client terminals, which are the lower level. "div" indicates the name of a division to which the client terminals belong. "group" indicates identification information of the relay group to which the client terminals belong. "id" indicates identification information of the client terminals. "name" indicates the names of the client terminals. The client terminal site information 504-1 and 504-2 indicates the identification information of the relay servers to which the client terminals have logged in.

The relay server information 50 is stored in the relay server information storage units 125 and 235. In other words, the relay server information 50 is shared between the relay servers 12 and 23. Moreover, the relay server information 50 may be shared between the relay servers and the client terminals.

When the relay servers are activated, the relay server activation information 503-1 and 503-2 become "active". When the relay servers are not activated, the relay server activation information 503-1 and 503-2 are blank. In such a way, the information as to whether or not the relay servers are activated is shared in the whole relay communication system.

When the client terminals are logged on to the relay servers, it is described in the client terminal site information 504-1 and 504-2. When the client terminals are not logged on to the relay servers, nothing is described in the client terminal site information 504-1 and 504-2. In such a way, the information as to whether or not the client terminals are logged on to the relay servers is shared in the whole relay communication system.

(5) Specific Example of Client Terminal Information

FIG. 43 is a view showing client terminal information 60 and 70 as specific examples of client terminal information. The client terminal information is an information indicating details of the client terminals that constitute the relay communication system.

The client terminal information 60 and 70, respectively, include client terminal address information 601 and 701, client terminal expiration period information 602 and 702, and client terminal port information 603 and 703.

"div" indicates the name of a division to which the client terminals belong. "group" indicates identification information of the relay group to which the client terminals belong. Client terminal address information 601 and 701 indicate IP addresses of the client terminals. The client terminal expiration period information 602 and 702 indicate registration expiration periods of the client terminals. "id" indicates identification information of the client terminals. "name" indicates the names of the client terminals. "pass" indicates passwords of the client terminals. The client terminal port information 603 and 703 indicate port numbers of the client terminals.

The client terminal information 60 is stored only in the client terminal information storage unit 126, and the client terminal information 70 is stored only in the client terminal information storage unit 236. In other words, the client terminal information 60 is owned only by the relay server 12, and the client terminal information 70 is owned only by the relay server 23.

(6) Flow of Information Sharing—First Setting

Figure 44:
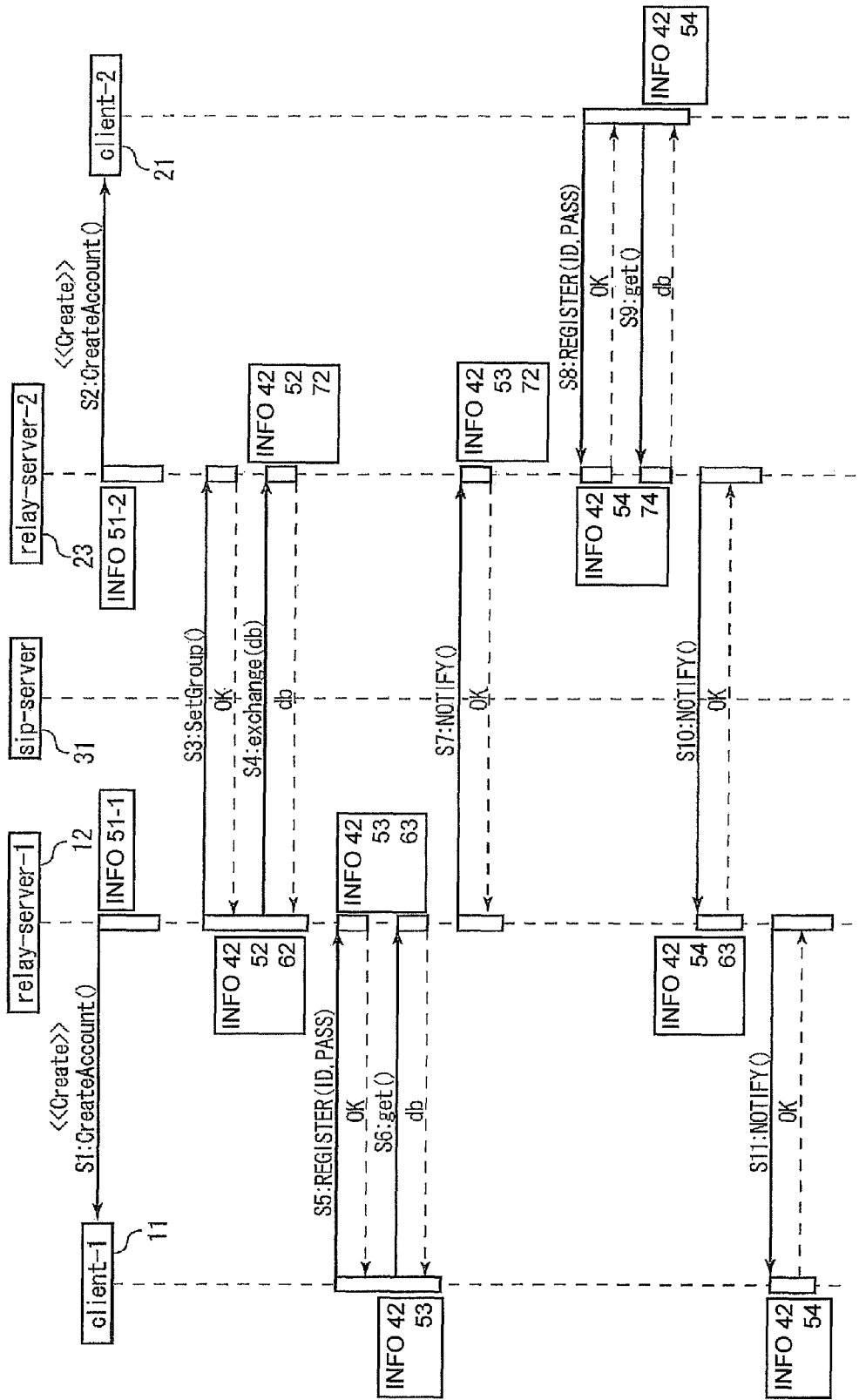
FIG. 44 is a view showing a flow of first-time information sharing in the Third Preferred Embodiment of the present invention.

FIG. 44 is a view showing a process flow in which the relay group information and the relay server information are shared. In FIG. 44, first setting is executed. In other words, the relay servers 12 and 23 have joined in the relay communication system. Then, a user of the client terminal 11 logs on to the relay server 12, and a user of the client terminal 21 logs on to the relay server 23.

(6-1) Process Flow from Step S1 to Step S2

An administrator of the relay server 12 and an administrator of the relay server 23 make a contract to construct a group of the relay communication system between the LANs 1 and 2.

The administrator of the relay server 12 creates an account for the user of the client terminal 11 (Step S1: CreateAccount( )). The control unit 122 creates a relay server information 51-1, and stores the relay server information 51-1 in the relay server information storage unit 125.

The administrator of the relay server 23 creates an account for the user of the client terminal 21 (Step S2: CreateAccount( )). The control unit 232 creates a relay server information 51-2, and stores the relay server information 51-2 in the relay server information storage unit 235.

Through the above-described process, the relay server 12 owns the relay server information 51-1. The relay server 23 owns the relay server information 51-2.

The contents within the first frame in FIG. 45 illustrate the relay server information 51-1. Upper information 511-1 is the information regarding the relay server 12, which is the upper level. As "id", "relay-server-1@abc.net" is set. As "name", "RELAY SERVER 1" is set. As relay server activation information 513-1, "active" is set. In other words, the relay server 12 is activated.

Lower information 512-1 is the information regarding the client terminal 11, which is the lower level. As "div", "software" is set. As "group", "20070402133100@relay-server-1.abc.net" is set. As "id", "client-1@relay-server-1.abc.net" is set. As "name", "CLIENT 1" is set. Client terminal site information 514-1 is blank. In other words, the user of the client terminal 11 has not logged on to the relay server 12.

The contents within the second frame in FIG. 45 illustrate the relay server information 51-2. Upper information 511-2 is the information regarding the relay server 23, which is the upper level. As "id", "relay-server-2@abc.net" is set. As "name", "RELAY SERVER 2" is set. As relay server activation information 513-2, "active" is set. In other words, the relay server 23 is activated.

Lower information 512-2 is the information regarding the client terminal 21, which is the lower level. As "div", "software" is set. As "group", "20070402133100@relay-server-1.abc.net" is set. As "id", "client-2@relay-server-2.abc.net" is set. As "name", "CLIENT 2" is set. Client terminal site information 514-2 is blank. In other words, the user of the client terminal 21 has not logged on to the relay server 23.

(6-2) Process Flow from Step S3 to Step S4

In the following description, the communication between the relay servers 12 and 23 is relayed by the SIP server 31. A description is made of a method in which the relay server 12(23) performs the communication with the relay server 23(12) through the SIP server 31.

The relay server 12(23) transmits, to the SIP server 31, data in which the account of the relay server 23(12) is designated as the communication destination, and the like. The SIP server 31 allows the accounts of the relay servers 12 and 23 to correspond to the global IP addresses of the relay servers 12 and 23, respectively. The SIP server 31 acquires the global IP address of the relay server 23(12) based on the account of the relay server 23(12). The SIP server 31 then transmits, to the relay server 23(12), data in which the global IP address of the relay server 23(12) is designated as the communication destination, and the like.

The relay server 12 requests the relay server 23 to construct the group of the relay communication system (Step S3: Set-Group( )). The control unit 122 creates a relay group information 42, and stores the relay group information 42 in the relay group information storage unit 124. The control unit 232 creates a relay group information 42, and stores the relay group information 42 in the relay group information storage unit 234.

The relay server 12 requests the relay server 23 to exchange the relay server information therewith (Step S4: exchange (db)). The relay server 12 transmits a copy of the relay server information 51-1 to the relay server 23. The relay server 23 transmits a copy of the relay server information 51-2 to the relay server 12.

The control unit 122 synthesizes the copy of the relay server information 51-2 and the relay server information 51-1, thereby creates relay server information 52, and stores the relay server information 52 in the relay server information storage unit 125. The control unit 232 synthesizes the copy of the relay server information 51-1 and the relay server information 51-2, thereby creates relay server information 52, and stores the relay server information 52 in the relay server information storage unit 235.

The control unit 122 creates client terminal information 62, and stores the client terminal information 62 in the client terminal information storage unit 126. The control unit 232 creates client terminal information 72, and stores the client terminal information 72 in the client terminal information storage unit 236. Creation process and storing process for the client terminal information 62 are executed in Step S1, and creation process and storing process for the client terminal information 72 are executed in Step S2.

Through the above-described process, the relay server 12 owns the relay group information 42, the relay server information 52 and the client terminal information 62. The relay server 23 owns the relay group information 42, the relay server information 52 and the client terminal information 72. The relay group information 42 and the relay server information 52 are shared between the relay servers 12 and 23.

The contents within the first frame in FIG. 46 illustrate the relay group information 42. Upper information 421 is the information regarding the relay group, which is the upper level. As "id", "20070402133100@relay-server-1.abc.net" is set. As "lastmod", "20070402133100" is set. As "name", "GROUP 1" is set.

Lower information 422 is the information regarding the relay servers 12 and 23, which are the lower level. As "id", "relay-server-1@abc.net" and "relay-server-2@abc.net" are set.

The contents within the second frame in FIG. 46 illustrate the relay server information 52. Upper information 521-1 and 521-2 are similar to the upper information 511-1 and 511-2 in FIG. 45, respectively. Lower information 522-1 and 522-2 are similar to the lower information 512-1 and 512-2 in FIG. 45, respectively.

The contents within the third frame in FIG. 46 illustrate the client terminal information 62. As "div", "software" is set. As "group", "20070402133100@relay-server-1.abc.net" is set. As "id", "client-1@relay-server-1.abc.net" is set. As "name", "CLIENT 1" is set. As "pass", "client-1" is set.

Client terminal address information 621 is blank. As client terminal expiration period information 622, "0" is set. Client terminal port information 623 is blank. In other words, the user of the client terminal 11 has not logged on to the relay server 12.

The contents within the fourth frame in FIG. 46 illustrate the client terminal information 72. As "div", "software" is set. As "group", "20070402133100@relay-server-1.abc.net" is set. As "id", "client-2@relay-server-2.abc.net" is set. As "name", "CLIENT 2" is set. As "pass", "client-2" is set.

Client terminal address information 721 is blank. As client terminal expiration period information 722, "0" is set. Client terminal port information 723 is blank. In other words, the user of the client terminal 21 has not logged on to the relay server 23.

(6-3) Process Flow from Step S5 to Step S7

The user of the client terminal 11 inputs "client-1@relay-server-1.abc.net" as the identification information of the client terminal 11, and inputs "client-1" as the password of the client terminal 11. The user of the client terminal 11 logs on to the relay server 12 (Step S5: REGISTER (ID, PASS)). The control unit 122 performs authentication of the user of the client terminal 11 by referring to the client terminal information 62.

The control unit 122 receives the login of the user of the client terminal 11. The control unit 122 updates the relay server information 52, thereby creates relay server information 53, and stores the relay server information 53 in the relay server information storage unit 125. The control unit 122 then updates the client terminal information 62, thereby creates client terminal information 63, and stores the client terminal information 63 in the client terminal information storage unit 126. The control unit 122 does not update the relay group information 42.

The client terminal 11 requests the relay server 12 to provide it with the relay group information and the relay server information (Step S6: get( )). The relay server 12 then transmits copies of the relay group information 42 and the relay server information 53 to the client terminal 11. The client terminal 11 stores the relay group information 42 and the relay server information 53.

By referring to the relay group information 42 and the relay server information 53, the control unit 122 determines a relay server which is to be notified that the relay server information 52 has been updated to the relay server information 53. The control unit 122 determines the relay server 23, in which relay server activation information 533-2 of the relay server information 53 is "active", as the relay server to be notified of the above-described update of the information.

The relay server 12 notifies the relay server 23 that the relay server information 52 has been updated to the relay server information 53 (Step S7: NOTIFY( )). In response, the control unit 232 updates the relay server information 52, thereby creates the relay server information 53, and stores the relay server information 53 in the relay server information storage unit 235.

By referring to the client terminal information 72, the control unit 232 determines a client terminal which is to be notified that the relay server information 52 has been updated to the relay server information 53. The control unit 232 does not determine the client terminal 21, in which the client terminal address information 721 and the client terminal port information 723 of the client terminal information 72 are blank, as the client terminal to be notified of the update of the information.

Through the above-described process, the relay server 12 owns the relay group information 42, the relay server information 53 and the client terminal information 63. The relay server 23 owns the relay group information 42, the relay server information 53 and the client terminal information 72. The client terminal 11 owns the relay group information 42 and the relay server information 53. The relay group information 42 and the relay server information 53 are shared between the relay servers 12 and 23 and the client terminal 11.

The contents within the first frame in FIG. 47 illustrates the relay group information 42. In the process flow from Step S5 to Step S7, no new relay server has joined the relay communication system, and accordingly, the relay group information 42 is not updated.

The contents within the second frame in FIG. 47 illustrate the relay server information 53. The updated portions are underlined. The user of the client terminal 11 is logged on to the relay server 12. Therefore, client terminal site information 534-1 of lower information 532-1 is determined at "relay-server-1@abc.net".

The contents within the third frame in FIG. 47 illustrate the client terminal information 63. The updated portions are underlined. The user of the client terminal 11 is logged on to the relay server 12. Therefore, client terminal address information 631 is determined at "192.168.10.2". Moreover, client terminal expiration period information 632 is determined at "1213935960484". Furthermore, client terminal port information 633 is determined at "5070".

The contents within the fourth frame in FIG. 47 illustrate the client terminal information 72. In the process flow from Step S5 to Step S7, the user of the client terminal 21 has not logged on to the relay server 23, and accordingly, the client terminal information 72 is not updated.

(6-4) Process Flow from Step S8 to Step S11

The user of the client terminal 21 inputs "client-2@relay-server-2.abc.net" as the identification information of the client terminal 21, and inputs "client-2" as the password of the client terminal 21. The user of the client terminal 21 logs on to the relay server 23 (Step S8: REGISTER (ID, PASS)). The control unit 232 performs authentication of the user of the client terminal 21 by referring to the client terminal information 72.

The control unit 232 receives the login of the user of the client terminal 21. The control unit 232 then updates the relay server information 53, thereby creates relay server information 54, and stores the relay server information 54 in the relay server information storage unit 235. The control unit 232 updates the client terminal information 72, thereby creates client terminal information 74, and stores the client terminal information 74 in the client terminal information storage unit 236. The control unit 232 does not update the relay group information 42.

The client terminal 21 requests the relay server 23 to provide it with the relay group information and the relay server information (Step S9: get( )). The relay server 23 then transmits copies of the relay group information 42 and the relay server information 54 to the client terminal 21. The client terminal 21 stores the relay group information 42 and the relay server information 54.

By referring to the relay group information 42 and the relay server information 54, the control unit 232 determines a relay server which is to be notified that the relay server information 53 has been updated to the relay server information 54. The control unit 232 determines the relay server 12, in which relay server activation information 543-1 of the relay server information 54 is "active", as the relay server to be notified of the above-described update of the information.

The relay server 23 then notifies the relay server 12 that the relay server information 53 has been updated to the relay server information 54 (Step S10: NOTIFY( )). In response, the control unit 122 updates the relay server information 53, thereby creates the relay server information 54, and stores the relay server information 54 in the relay server information storage unit 125.

By referring to the client terminal information 63, the control unit 122 determines a client terminal which is to be notified that the relay server information 53 has been updated to the relay server information 54. The control unit 122 determines the client terminal 11, in which the client terminal address information 631 and the client terminal port information 633 of the client terminal information 63 have been previously determined, as the client terminal to be notified of the update of the information.

The relay server 12 notifies the client terminal 11 that the relay server information 53 has been updated to the relay server information 54 (Step S11: NOTIFY( )). The client terminal 11 then updates the relay server information 53, thereby creates the relay server information 54, and stores the relay server information 54.

Through the above-described process, the relay server 12 owns the relay group information 42, the relay server information 54 and the client terminal information 63. The relay server 23 owns the relay group information 42, the relay server information 54 and the client terminal information 74. The client terminal 11 owns the relay group information 42 and the relay server information 54. The client terminal 21 owns the relay group information 42 and the relay server information 54. The relay group information 42 and the relay server information 54 are shared between the relay servers 12 and 23 and the client terminals 11 and 21.

The contents within the first frame in FIG. 48 illustrate the relay group information 42. In the process flow from Step S8 to Step S11, no new relay server has joined the relay communication system, and accordingly, the relay group information 42 is not updated.

The contents within the second frame in FIG. 48 illustrate the relay server information 54. The updated portions are underlined. The user of the client terminal 21 is logged on to the relay server 23. Therefore, client terminal site information 544-2 of lower information 542-2 is determined at "relay-server-2@abc.net".

The contents within the third frame in FIG. 48 illustrate the client terminal information 63. In the flow of the processing from Step S8 to Step S11, the user of the client terminal 11 has not logged off from the relay server 12, and accordingly, the client terminal information 63 is not updated.

The contents within the fourth frame in FIG. 48 illustrate the client terminal information 74. The updated portions are underlined. The user of the client terminal 21 is logged on to the relay server 23. Therefore, client terminal address information 741 is determined at "192.168.1.10". Moreover, client terminal expiration period information 742 is determined at "1213935978484". Furthermore, client terminal port information 743 is determined at "5070".

(7) Flow of Information Sharing—Second Setting

Figure 49:
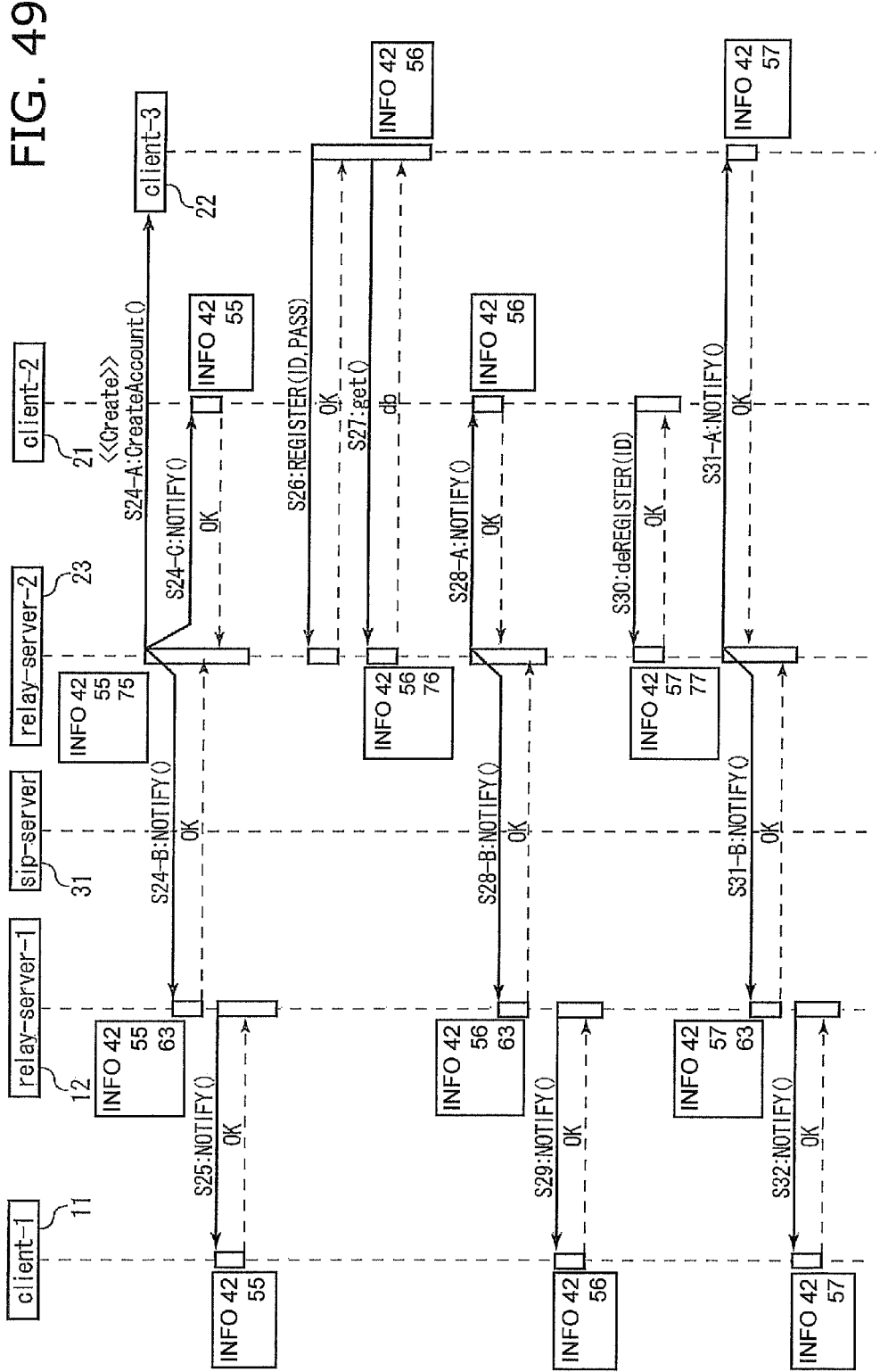
FIG. 49 is a view showing a flow of second-time information sharing in the Third Preferred Embodiment of the present invention.

FIG. 49 is a view showing a process flow in which the relay group information and the relay server information are shared. In FIG. 49, second setting is executed. Specifically, the relay servers 12 and 23 remain in the relay communication system. Then, the user of the client terminal 11 remains logged on to the relay server 12. Moreover, the user of the client terminal 22 logs on to the relay server 23, and the user of the client terminal 21 logs off from the relay server 23.

(7-1) Process Flow from Step S24 to Step S25

The administrator of the relay server 23 creates an account for the user of the client terminal 22 (Step S24-A: CreateAccount( )). The control unit 232 updates the relay server information 54, and thereby creates relay server information 55. The control unit 232 updates the relay server information 74, and thereby creates client terminal information 75. The control unit 232 does not update the relay group information 42.

Step S24-B is substantially the same as Steps S7 and S10. The control unit 232 refers to the relay group information 42 and the relay server information 55. The control unit 232 decides to notify the relay server 12 that the relay server information 54 has been updated to the relay server information 55. The relay server 23 then notifies the relay server 12 that the relay server information 54 has been updated to the relay server information 55 (Step S24-B: NOTIFY( )).

Step S24-C is substantially the same as Step S11. The control unit 232 refers to the client terminal information 75. The control unit 232 decides to notify the client terminal 21 that the relay server information 54 has been updated to the relay server information 55. The relay server 23 then notifies the client terminal 21 that the relay server information 54 has been updated to the relay server information 55 (Step S24-C: NOTIFY( )).

Step S25 is substantially the same as Step S11. The control unit 122 refers to the client terminal information 63. The control unit 122 decides to notify the client terminal 11 that the relay server information 54 has been updated to the relay server information 55. The relay server 12 then notifies the client terminal 11 that the relay server information 54 has been updated to the relay server information 55 (Step S25: NOTIFY( )).

The contents within the first frame in FIG. 50 illustrate the relay group information 42. The contents within the first frame in FIG. 51 illustrates the client terminal information 63. In the process flow from Step S24 to Step S25, the relay group information 42 and the client terminal information 63 are not updated.

The contents within the second frame in FIG. 50 illustrate the relay server information 55. The updated portions are underlined. Here, the administrator of the relay server 23 has created the account for the user of the client terminal 22. Therefore, for the client terminal 22, lower information 552-3 is created. However, the user of the client terminal 22 is not logged on to the relay server 23. Therefore, for the client terminal 22, client terminal site information 554-3 is blank.

The contents within the second frame in FIG. 51 illustrate the client terminal information 75. The updated portions are underlined. Here, the administrator of the relay server 23 has created the account for the user of the client terminal 22. Therefore, for the client terminal 22, the client terminal information 75 is created. However, the user of the client terminal 22 has not logged on to the relay server 23. Therefore, for the client terminal 22, the client terminal address information 751 and the client terminal port information 753 are blank, and the client terminal expiration period information 752 is set at "0".

(7-2) Process Flow from Step S26 to Step S29

The user of the client terminal 22 logs on to the relay server 23 (Step S26: REGISTER (ID, PASS)). The control unit 232 updates the relay server information 55, and thereby creates relay server information 56. The control unit 232 updates the relay server information 75, and thereby creates client terminal information 76. The control unit 232 does not update the relay group information 42.

The client terminal 22 requests the relay server 23 to provide it with the relay group information and the relay server information (Step S27: get( )). The relay server 23 then transmits copies of the relay group information 42 and the relay server information 56 to the client terminal 22.

Step S28-A is substantially the same as Step S11. The control unit 232 refers to the client terminal information 76. The control unit 232 decides to notify the client terminal 21 that the relay server information 55 has been updated to the relay server information 56. The relay server 23 then notifies the client terminal 21 that the relay server information 55 has been updated to the relay server information 56 (Step S28-A: NOTIFY( )).

Step S28-B is substantially the same as Steps S7 and S10. The control unit 232 refers to the relay group information 42 and the relay server information 56. The control unit 232 decides to notify the relay server 12 that the relay server information 55 has been updated to the relay server information 56. The relay server 23 then notifies the relay server 12 that the relay server information 55 has been updated to the relay server information 56 (Step S28-B: NOTIFY( )).

Step S29 is substantially the same as Step S11. The control unit 122 refers to the client terminal information 63. The control unit 122 decides to notify the client terminal 11 that the relay server information 55 has been updated to the relay server information 56. The relay server 12 then notifies the client terminal 11 that the relay server information 55 has been updated to the relay server information 56 (Step S29: NOTIFY( )).

The contents within the first frame in FIG. 52 illustrate the relay group information 42. The contents within the first frame in FIG. 53 illustrate the client terminal information 63. In the process flow from Step S26 to Step S29, the relay group information 42 and the client terminal information 63 are not updated.

The contents within the second frame in FIG. 52 illustrate the relay server information 56. The updated portions are underlined. Here, the user of the client terminal 22 is logged on to the relay server 23. Therefore, for the client terminal 22, client terminal site information 564-3 of lower information 562-3 is determined.

The contents within the second frame in FIG. 53 illustrate the client terminal information 76. The updated portions are underlined. Here, the user of the client terminal 22 is logged on to the relay server 23. Therefore, for the client terminal 22, client terminal address information 761 and client terminal port information 763 are determined, and client terminal expiration period information 762 is set at information that is not "0".

(7-3) Process Flow from Step S30 to Step S32

The user of the client terminal 21 logs off from the relay server 23 (Step S30: deREGISTER(ID)). The control unit 232 updates the relay server information 56, and thereby creates relay server information 57. The control unit 232 updates the client terminal information 76, and thereby creates client terminal information 77. The control unit 232 does not update the relay group information 42.

Step S31-A is substantially the same as Step S11. The control unit 232 refers to the client terminal information 77. The control unit 232 decides to notify the client terminal 22 that the relay server information 56 has been updated to the relay server information 57. The relay server 23 then notifies the client terminal 22 that the relay server information 56 has been updated to the relay server information (Step S31-A: NOTIFY( )).

Step S31-B is substantially the same as Steps S7 and S10. The control unit 232 refers to the relay group information 42 and the relay server information 57. The control unit 232 decides to notify the relay server 12 that the relay server information 56 has been updated to the relay server information 57. The relay server 23 then notifies the relay server 12 that the relay server information 56 has been updated to the relay server information 57 (Step S31-B: NOTIFY( )).

Step S32 is substantially the same as step S11. The control unit 122 refers to the client terminal information 63. The control unit 122 decides to notify the client terminal 11 that the relay server information 56 has been updated to the relay server information 57. The relay server 12 then notifies the client terminal 11 that the relay server information 56 has been updated to the relay server information (Step S32: NOTIFY( )).

The contents within the first frame in FIG. 54 illustrate the relay group information 42. The contents within the first frame in FIG. 55 illustrate the client terminal information 63. In the process flow from Step S30 to Step S32, the relay group information 42 and the client terminal information 63 are not updated.

The contents within the second frame in FIG. 55 illustrate the relay server information 57. The updated portions are underlined. Here, the user of the client terminal 21 is logged off from the relay server 23. Therefore, for the client terminal 21, client terminal site information 574-2 of lower information 572-2 is blank.

The contents within the second frame in FIG. 55 illustrate the client terminal information 77. The updated portions are underlined. Here, the user of the client terminal 21 is logged off from the relay server 23. Therefore, for the client terminal 21, client terminal address information 771 and client terminal port information 773 are blank, and client terminal expiration period information 772 is set at "0".

(8) Summary of the Information Sharing

In the relay communication system, changes in the number and the connection state of the LANs and the client terminals may occur. Accordingly, when recognizing such changes, one of the relay servers immediately updates the relay group information, the relay server information and the client terminal information.

Then, the one of the relay servers immediately notifies the other relay server, which is described in the relay group information and the relay server information, that the relay group information and the relay server information have been updated. Moreover, the one of the relay servers immediately notifies the client terminal, which is described in the client terminal information, that the relay group information and the relay server information have been updated.

However, even if the other relay server is described in the relay group information and the relay server information, the one of the relay servers does not immediately notify the other relay server of the above-described update of the information upon having determined that the other relay server is in an unconnected state. Moreover, even if the client terminal is described in the client terminal information, the one of the relay servers does not immediately notify the client terminal of the update of the information upon having determined that the client terminal is in an unconnected state.

In such a way, the information regarding changes in the number and the connection state of the LANs and the client terminals is shared in the whole relay communication system in real time.

(9) Flow of Data Transmission/Reception—After First Setting

Figure 56:
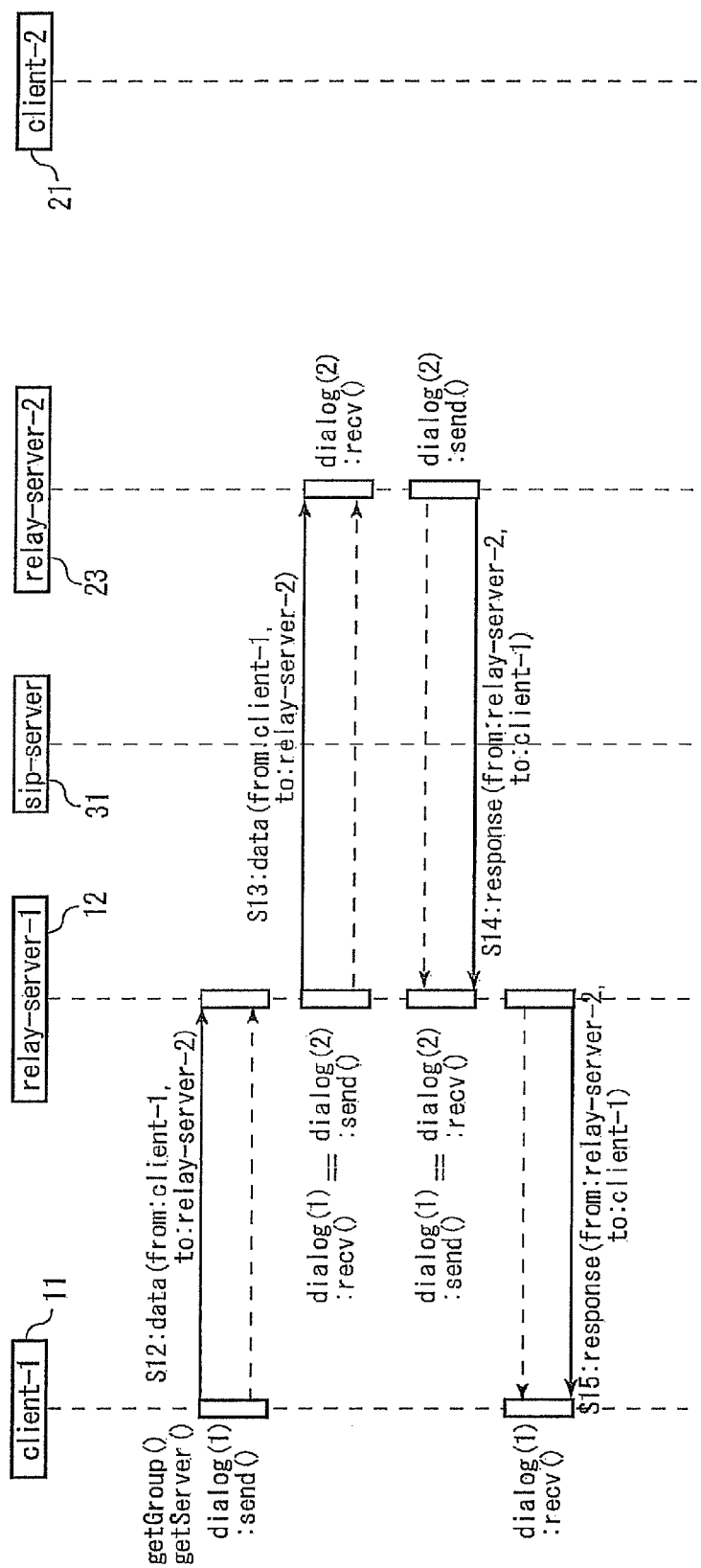
FIG. 56 is a view showing a flow of data transmission/reception after first-time information sharing in the Third Preferred Embodiment of the present invention.
Figure 57:
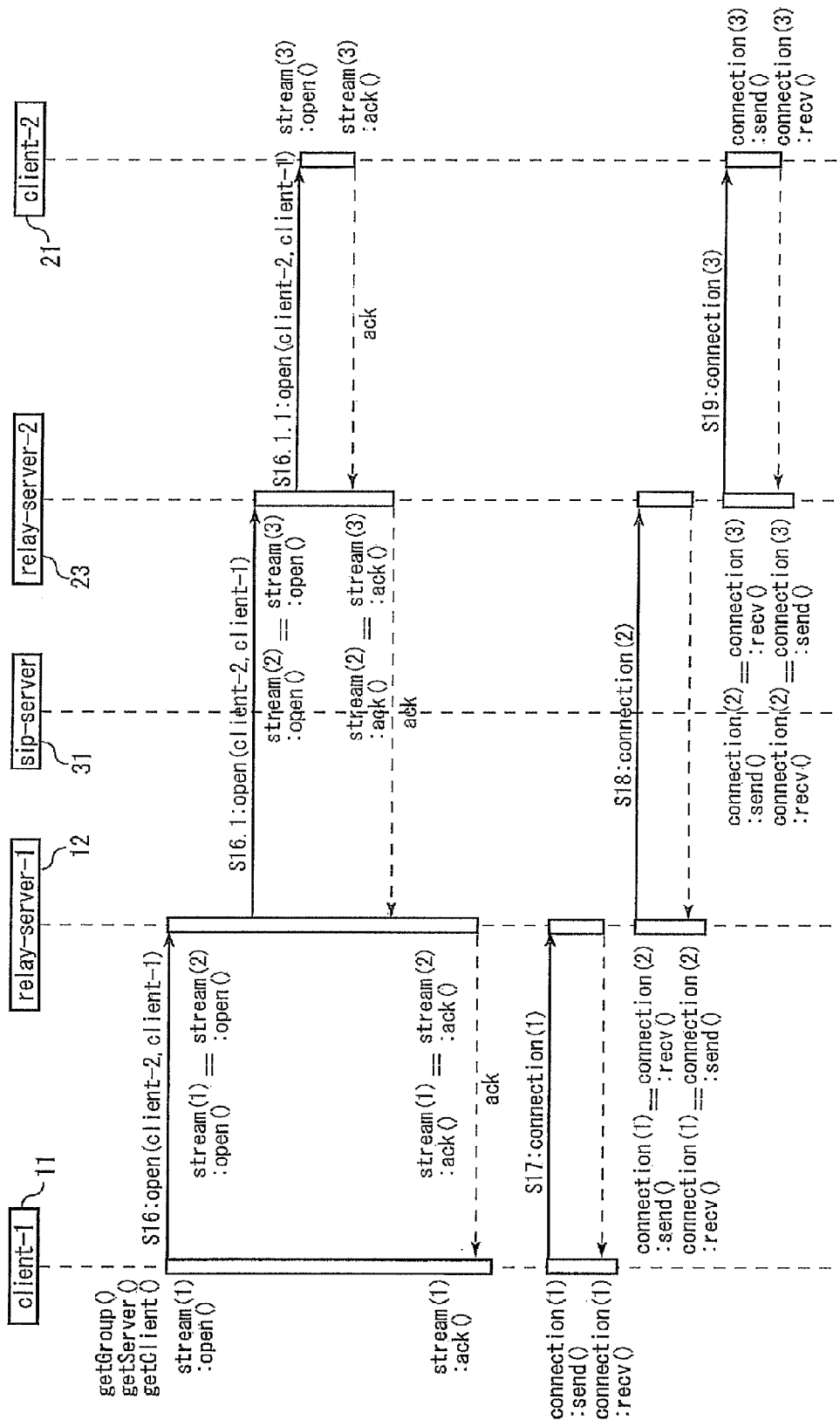
FIG. 57 is a view showing the flow of the data transmission/reception after the first-time information sharing in the Third Preferred Embodiment of the present invention.
Figure 58:
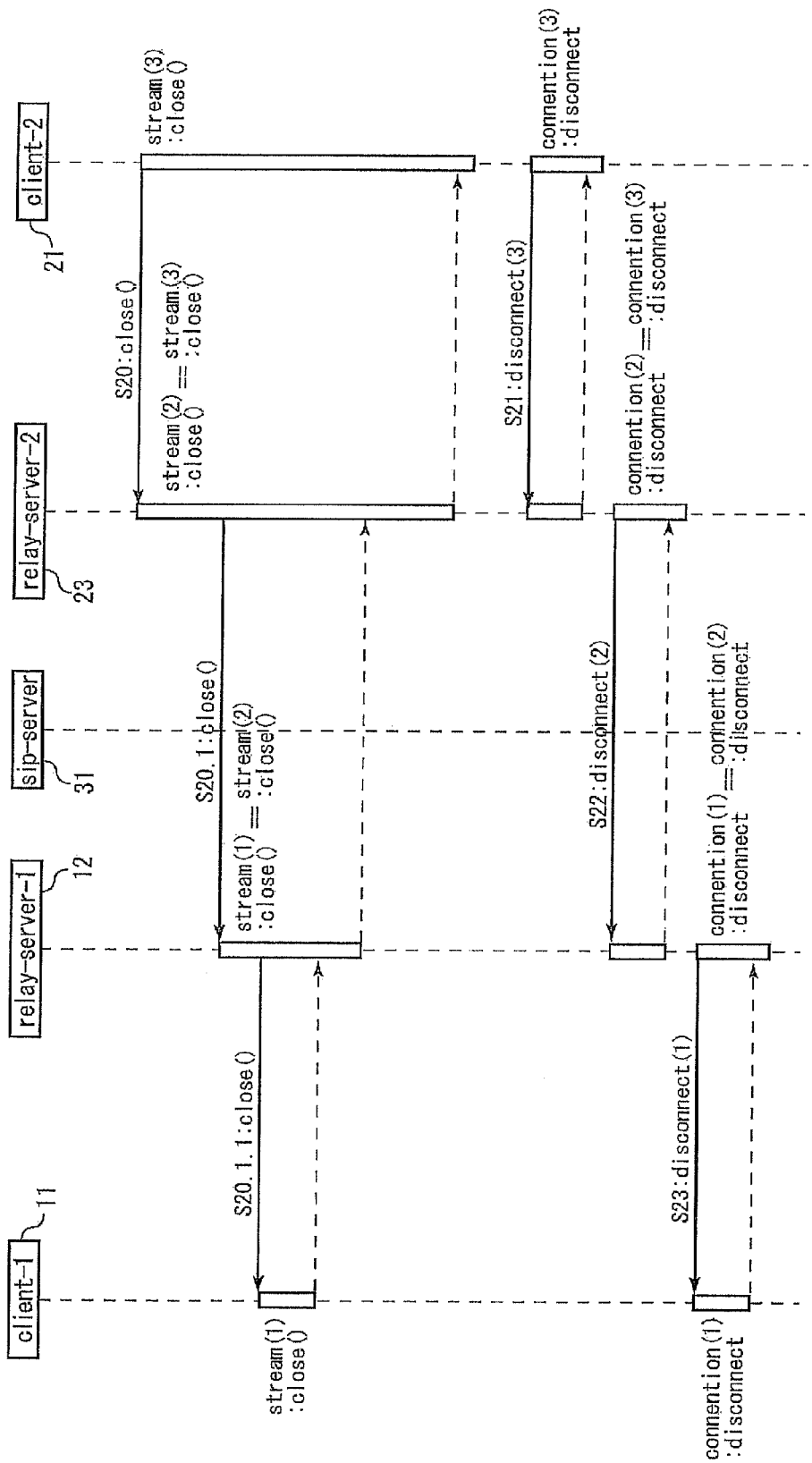
FIG. 58 is a view showing the flow of the data transmission/reception after the first-time information sharing in the Third Preferred Embodiment of the present invention.

FIG. 56 to FIG. 58 are views showing a flow of data transmission/reception after the first information sharing. After the first information sharing, the relay group information 42, the relay server information 54, and the client terminal information 63 and 74, as shown in FIG. 48, are stored. The user of the client terminal 11 is logged on to the relay server 12. The user of the client terminal 21 is logged on to the relay server 23. For the user of the client terminal 22, the account thereof has not been created by the administrator of the relay server 23.

(9-1) Process Flow from Step S12 to Step S15

FIG. 56 shows a process flow for transmitting/receiving data in units of block. The user of the client terminal 11 confirms the relay group to which the client terminal 11 belongs. Specifically, the user of the client terminal 11 causes the relay group information 42 to be displayed on a display screen of the client terminal 11 (getGroup( )). In the relay group information 42, "relay-server-1@abc.net" and "relay-server-2@abc.net", which are identification information of the relay servers 12 and 23, are set. The user of the client terminal 11 confirms that the client terminal 11 belongs to the relay group constituted by the relay servers 12 and 23.

The user of the client terminal 11 causes the relay server information 54, which corresponds to the relay group information 42, to be displayed on the display screen of the client terminal 11 (getServer( )). The user of the client terminal 11 refers to the relay server information 54, and confirms the relay servers that constitute the relay group and the client terminals connected to the relay servers.

The user of the client terminal 11 refers to the relay server information 54 and confirms that the transmission/reception of the data with the relay server 23 is possible. The user of the client terminal 11 confirms that, with regard to the relay server 12, relay server activation information 543-1 of the relay server information 54 is set at "active". In other words, the user of the client terminal 11 confirms that the relay server 12 is activated.

The user of the client terminal 11 confirms that, with regard to the relay server 23, relay server activation information 543-2 of the relay server information 54 is set at "active". In other words, the user of the client terminal 11 confirms that the relay server 23 is activated.

The user of the client terminal 11 confirms that the data can be transmitted to the relay server 23 through the relay server 12. The user of the client terminal 11 then decides to transmit the data to the relay server 23 in units of block.

In the communication (dialog(1)) between the client terminal 11 and the relay server 12, the client terminal 11 transmits the data in units of block, which is addressed to the relay server 23 (Step S12: data(from: client-1, to: relay-server-2)). In the dialog(1), the relay server 12 receives the data from the client terminal 11 in units of block.

In the communication (dialog(2)) between the relay server 12 and the relay server 23, the relay server 12 transmits the data to the relay server 23 in units of block (Step S13: data (from: client-1, to: relay-server-2)). In the dialog(2), the relay server 23 receives the data from the relay server 12 in units of block.

In the dialog(2), the relay server 23 transmits, to the relay server 12, a response indicating that the data has been received in units of block (Step S14: response (from: relay-server-2, to: client-1)). In the dialog(2), the relay server 12 receives, from the relay server 23, the response indicating that the data has been received in units of block.

In the dialog(1), the relay server 12 transmits, to the client terminal 11, the response indicating that the data has been received in units of block (Step S15: response(from: relay-server-2, to: client-1)). In the dialog(1), the client terminal 11 receives, from the relay server 12, the response indicating that the data has been received in units of block.

The dialog(1) is the communication between the client terminal 11 and the relay server 12. The dialog(2) is the communication between the relay server 12 and the relay server 23. The relay server 12 associates the dialog(1) and the dialog(2), which are located in different sections adjacent to each other, with each other.

When receiving the data in the dialog(1), the relay server 12 creates an information indicating that the dialog(1) and the dialog(2) are associated with each other, and then transmits the data in the dialog(2). In the transmission/reception of the data, the dialog(1) and the dialog(2) being associated with each other is represented by "dialog(1): recv( )==dialog(2): send( )".

When receiving the response in the dialog(2), the relay server 12 refers to the information indicating that the dialog (1) and the dialog(2) are associated with each other, and then transmits the response in the dialog(1). In the transmission/reception of the response, the dialog(1) and the dialog(2) being associated with each other is represented by "dialog(1): send( )==dialog(2): recv( )".

(9-2) Process Flow from Step S16 to Step S19

FIG. 57 shows a process flow for establishing the connection before continuously transmitting/receiving the data. The user of the client terminal 11 confirms the relay group to which the client terminal 11 belongs. Specifically, the user of the client terminal 11 causes the relay group information 42 to be displayed on a display screen of the client terminal 11 (getGroup( )). In the relay group information 42, "relay-server-1@abc.net" and "relay-server-2@abc.net", which are identification information of the relay servers 12 and 23, are set. The user of the client terminal 11 confirms that the client terminal 11 belongs to the relay group constituted by the relay servers 12 and 23.

The user of the client terminal 11 causes the relay server information 54, which corresponds to the relay group information 42, to be displayed on the display screen of the client terminal 11 (getServer( )). The user of the client terminal 11 refers to the relay server information 54, and confirms the relay servers that constitute the relay group and the client terminals connected to the relay servers.

The user of the client terminal 11 refers to the relay server information 54 and confirms that the transmission/reception of the data with the client terminal 21 is possible. In a similar way to the process flow from Step S12 to Step S15, the user of the client terminal 11 confirms that the relay servers 12 and 23 are activated.

The user of the client terminal 11 confirms that, with regard to the client terminal 21, the client terminal site information 544-2 of the relay server information 54 is set at "relay-server-2@abc.net". In other words, the user of the client terminal 11 confirms that the client terminal 21 is logged on to the relay server 23.

The user of the client terminal 11 confirms that the data can be transmitted to the client terminal 21 through the relay servers 12 and 23. The user of the client terminal 11 then decides to continuously transmit the data to the client terminal 21.

In the communication (stream(1)) between the client terminal 11 and the relay server 12, the client terminal 11 transmits a request information for connection establishment to the relay server 12 (Step S16: open(client-2, client-1)).

The relay server 12 associates the stream(1) with the communication (stream(2)) between the relay server 12 and the relay server 23 (stream(1):open( )==stream(2):open( )). In the stream(2), the relay server 12 transmits the request information for the connection establishment to the relay server 23 (Step S16.1: open(client-2, client-1)).

The relay server 23 associates the stream(2) with the communication (stream3)) between the relay server 23 and the client terminal 21 (stream(2):open( )==stream3):open( )). In the stream3), the relay server 23 transmits the request information for the connection establishment to the client terminal 21 by using the client terminal information 74 (Step S16.1.1: open(client-2, client-1)). Specifically, the request information for the connection establishment is transmitted to the client terminal 21 based on "192.168.1.10" as the client terminal information 741, "5070" as the client terminal port information 743, and the like, which correspond to the client terminal 21.

In the stream3), the client terminal 21 transmits a permission information for the connection establishment to the relay server 23 (ack to Step S16.1.1).

The relay server 23 refers to the association between the stream(2) and the stream3) (stream(2):ack( )==stream3):ack( )). In the stream(2), the relay server 23 transmits the permission information for the connection establishment to the relay server 12 (ack to Step S16.1).

The relay server 12 refers to the association between the stream(1) and the stream(2) (stream(1):ack( )==stream(2):ack( )). In the stream(1), the relay server 12 transmits the permission information for the connection establishment to the client terminal 11 (ack to Step S16).

For the relay server 12, the client terminal 11 establishes connection (connection(1)) between the client terminal 11 and the relay server 12 (Step S17: connection(1)).

For the relay server 23, the relay server 12 establishes connection (connection(2)) between the relay server 12 and the relay server 23 (Step S18: connection(2)). The relay server 12 associates the connection(1) and the connection(2) with each other.

For the client terminal 21, the relay server 23 establishes connection (connection(3)) between the relay server 23 and the client terminal 21 by using the client terminal information 74 (Step S19: connection(3)). The relay server 23 associates the connection(2) and the connection(3) with each other.

Through the above-described process, the client terminal 11 and the client terminal 21 can transmit/receive data bidirectionally and continuously, as will be described later.

A description is made of the case where the client terminal 11 continuously transmits data to the client terminal 21. The client terminal 11 transmits the data in the connection(1) (connection(1): send ( )). When receiving the data in the connection(1), the relay server 12 refers to the association between the connection(1) and the connection(2), and thereby transmits the data in the connection(2) (connection(1): recv( )==connection(2): send( )). When the relay server 23 receives the data in the connection(2), the relay server 23 refers to the association between the connection(2) and the connection(3), and thereby transmits the data in the connection(3) (connection(2):recv( )==connection(3):send( )). The client terminal 21 receives the data in the connection(3) (connection(3): recv( )).

A description is made of the case where the client terminal 21 continuously transmits data to the client terminal 11. The client terminal 21 transmits the data in the connection(3) (connection(3): send ( )). When receiving the data in the connection(3), the relay server 23 refers to the association between the connection(2) and the connection(3), and thereby transmits the data in the connection(2) (connection(2): send( )==connection(3): recv( )). When the relay server 12 receives the data in the connection(2), the relay server 12 refers to the association between the connection(1) and the connection(2), and thereby transmits the data in the connection(1) (connection(1):send( )==connection(2):recv( )). The client terminal 11 receives the data in the connection(1) (connection(1): recv( )).

(9-3) Process Flow from Step S20 to Step S23

FIG. 58 shows a process flow for disconnecting the connection after continuously transmitting/receiving the data. In FIG. 57, the client terminal 11 is transmitting the request information for the connection establishment to the client terminal 21. In FIG. 58, the client terminal 21 is transmitting a request information for disconnecting such connection to the client terminal 11.

In the stream3), the client terminal 21 transmits the request information for the connection disconnection to the relay server 23 (Step S20: close( )).

The relay server 23 refers to the association between the stream(2) and the stream3) (stream(2):close( )==stream3): close( )). In the stream(2), the relay server 23 transmits the request information for the connection disconnection to the relay server 12 (Step S20.1: close( )).

The relay server 12 refers to the association between the stream(1) and the stream(2) (stream(1): close( )==stream(2): close( )). In the stream(1), the relay server 12 transmits the request information for the connection disconnection to the client terminal 11 (Step S20.1.1: close( )).

For the relay server 23, the client terminal 21 disconnects the connection(3) (Step S21: disconnect(3)).

The relay server 23 refers to the association between the connection(2) and the connection(3) (connection(2): disconnect==connection(3):disconnect). For the relay server 12, the relay server 23 disconnects the connection(2) (Step S22: disconnect(2)).

The relay server 12 refers to the association between the connection(1) and the connection(2) (connection(1): disconnect==connection(2): disconnect). For the client terminal 11, the relay server 12 disconnects the connection(1) (Step S23: disconnect(1)).

(10) Flow of Data Transmission/Reception—After Second Setting

Figure 59:
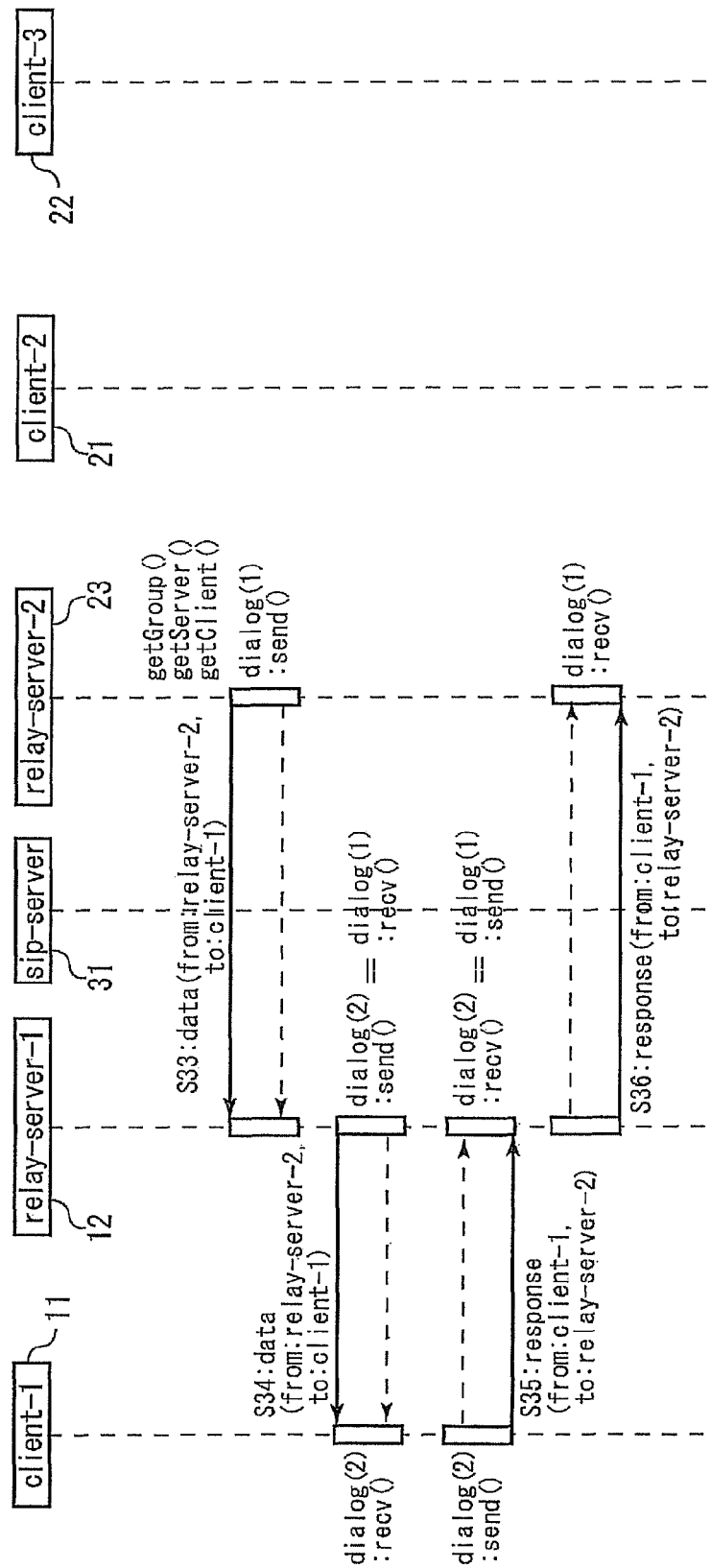
FIG. 59 is a view showing a flow of data transmission/reception after second-time information sharing in the Third Preferred Embodiment of the present invention.
Figure 60:
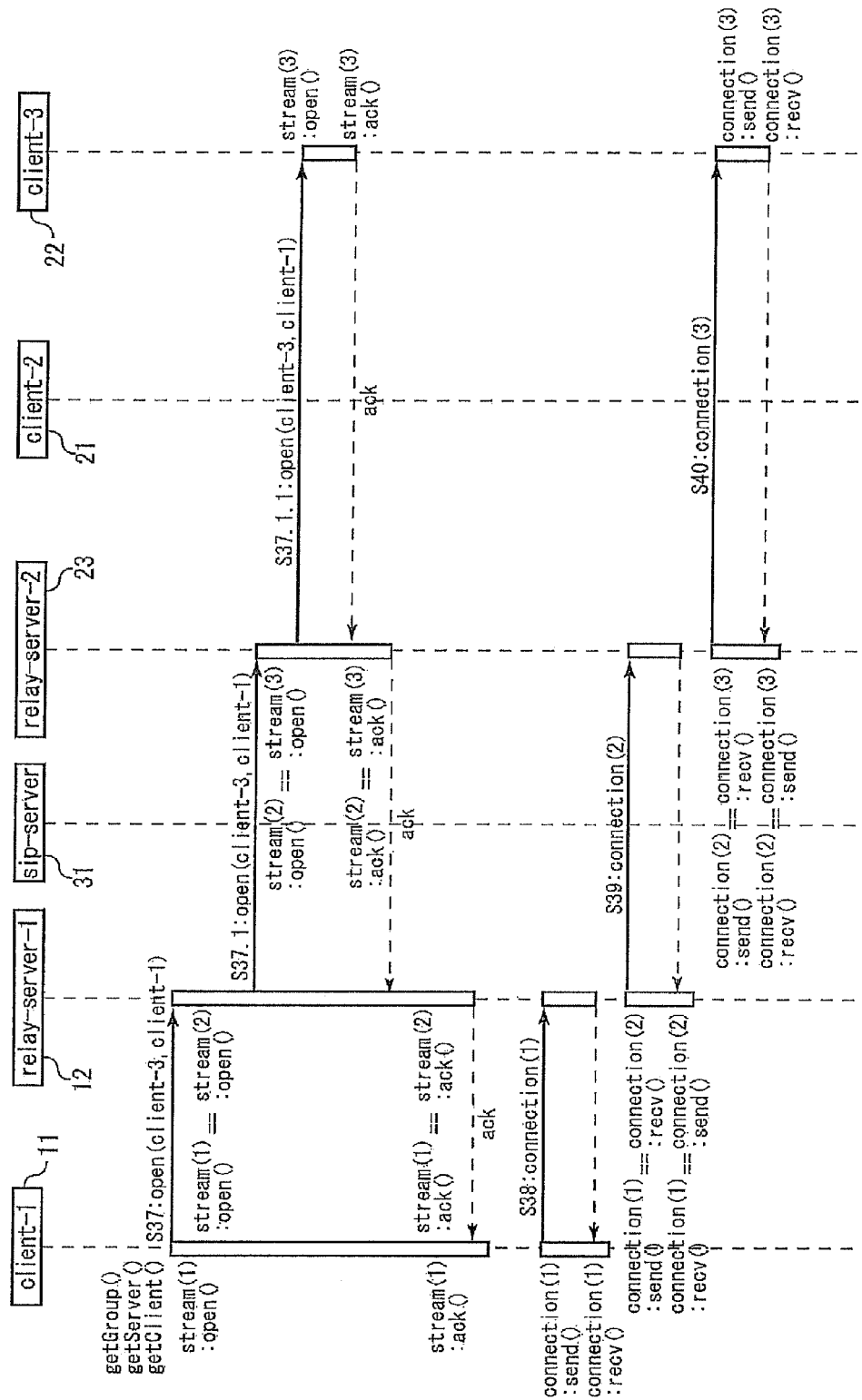
FIG. 60 is a view showing the flow of the data transmission/reception after the second-time information sharing in the Third Preferred Embodiment of the present invention.
Figure 61:
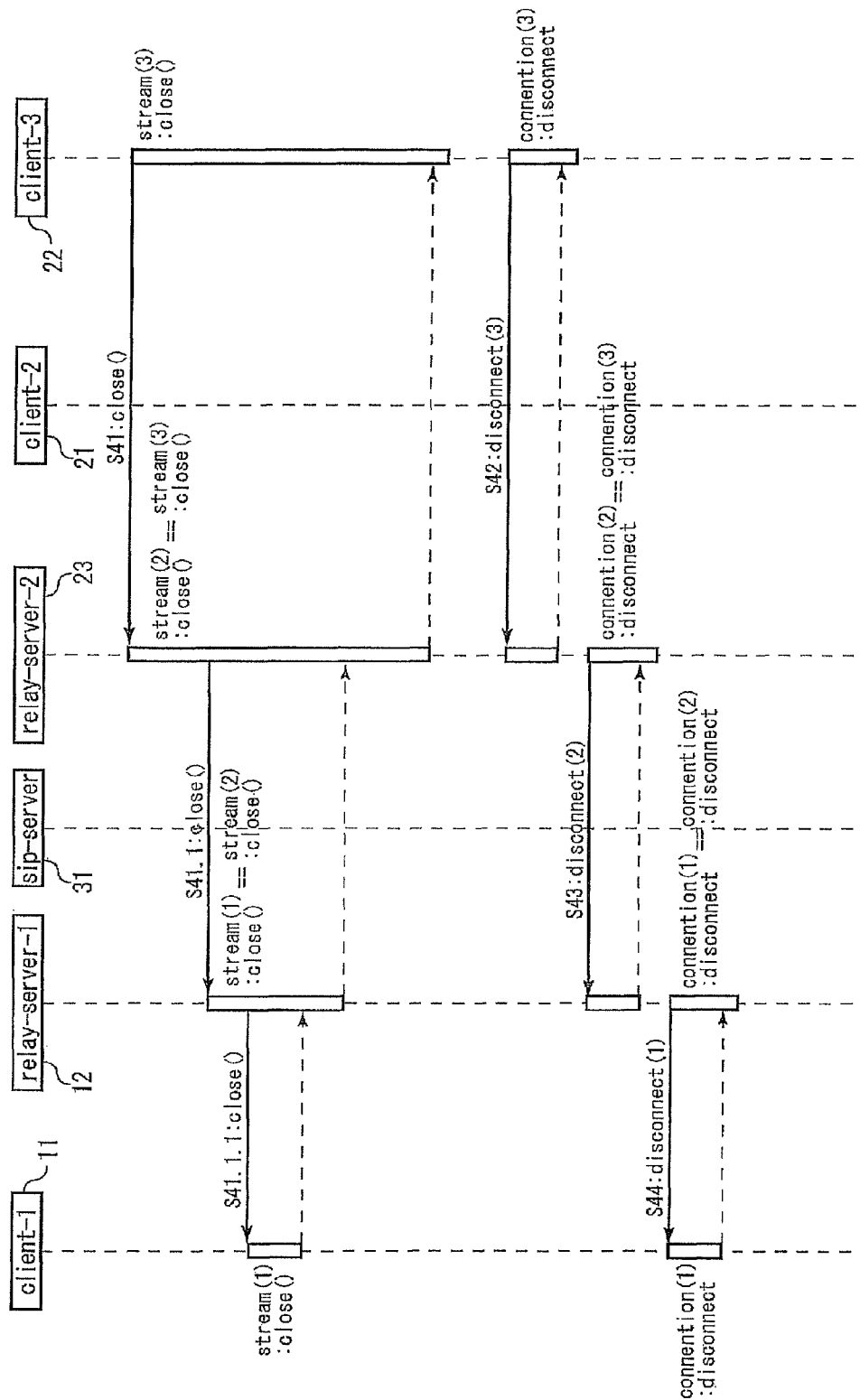
FIG. 61 is a view showing the flow of the data transmission/reception after the second-time information sharing in the Third Preferred Embodiment of the present invention.

FIG. 59 to FIG. 61 are views showing a flow of data transmission/reception after the second information sharing. After the second information sharing, the relay group information 42, the relay server information 57, and the client terminal information 63 and 77, as shown in FIGS. 54 and 55, are stored. The user of the client terminal 11 is logged on to the relay server 12. The user of the client terminal 21 has logged off from the relay server 23. The user of the client terminal 22 is logged on to the relay server 23.

(10-1) Process Flow from Step S33 to Step S36

FIG. 59 shows a process flow for transmitting/receiving data in units of block. The administrator of the relay server 23 causes the relay group information 42 and the relay server information 57 to be displayed on the display screen of a relay server 23 (getGroup( ), getServer( ), getClient( )).

The administrator of the relay server 23 confirms the relay group to which the relay server 23 belongs. Specifically, the administrator of the relay server 23 causes the relay group information 42 to be displayed on the display screen of the relay server 23 (getGroup( )). In the relay group information 42, "relay-server-1@abc.net" and "relay-server-2@abc.net", which are identification information of the relay servers 12 and 23, are set. The administrator of the relay server 23 confirms that the relay server 23 belongs to the relay group constituted by the relay servers 12 and 23.

The administrator of the relay server 23 causes the relay server information 57, which corresponds to the relay group information 42, to be displayed on the display screen of the relay server 23 (getServer( )). The administrator of the relay server 23 refers to the relay server information 57 and confirms the relay servers that constitute the relay group and the client terminals connected to the relay servers.

The administrator of the relay server 23 refers to the relay server information 57 and confirms that the transmission/reception of the data with the client terminal 11 is possible. The administrator of the relay server 23 confirms that, with regard to the relay server 12, relay server activation information 573-1 of the relay server information 57 is set at "active". In other words, the administrator of the relay server 23 confirms that the relay server 12 is activated.

The administrator of the relay server 23 confirms that, with regard to the client terminal 11, client terminal site information 574-1 of the relay server information 57 is set at "relay-server-1@abc.net". In other words, the administrator of the relay server 23 confirms that the client terminal 11 is logged on to the relay server 12.

The administrator of the relay server 23 confirms that the data can be transmitted to the client terminal 11 through the relay server 12. The administrator of the relay server 23 then decides to transmit the data to the client terminal 11 in units of block.

Steps S33, S34, S35 and S36 are substantially the same as Steps S12, S13, S14 and S15, respectively. The client terminals and the relay servers refer to the relay group information and the relay server information, thereby confirm changes in the number and the connection state of the other client terminals and relay servers and, then, can transmit the data to the other client terminals and relay servers in units of block.

(10-2) Process Flow from Step S37 to Step S44

FIG. 60 shows a process flow for establishing the connection before continuously transmitting/receiving the data. FIG. 61 shows a process flow for disconnecting the connection after continuously transmitting/receiving the data.

The user of the client terminal 11 confirms the relay group to which the client terminal 11 belongs. Specifically, the user of the client terminal 11 causes the relay group information 42 to be displayed on a display screen of the client terminal 11 (getGroup( )). In the relay group information 42, "relay-server-1@abc.net" and "relay-server-2@abc.net", which are identification information of the relay servers 12 and 23, are set. The user of the client terminal 11 confirms that the client terminal 11 belongs to the relay group constituted by the relay servers 12 and 23.

The user of the client terminal 11 causes the relay server information 57, which corresponds to the relay group information 42, to be displayed on the display screen of the client terminal 11 (getServer( )). The user of the client terminal 11 refers to the relay server information 57, and confirms the relay servers that constitute the relay group and the client terminals connected to the relay servers.

The user of the client terminal 11 refers to the relay server information 57 and confirms that the communication with the client terminal 22 is possible. In a similar way to the process flow from Step S12 to Step S15, the user of the client terminal 11 confirms that the relay servers 12 and 23 are activated.

The user of the client terminal 11 confirms that, with regard to the client terminal 21, client terminal site information 574-2 of the relay server information 57 is blank. In other words, the user of the client terminal 11 confirms that the client terminal 21 is not logged on to the relay server 23.

The user of the client terminal 11 confirms that, with regard to the client terminal 22, client terminal site information 574-3 of the relay server information 57 is set at "relay-server-2@abc.net". In other words, the user of the client terminal 11 confirms that the client terminal 22 is logged on to the relay server 23.

The user of the client terminal 11 confirms that the data can be transmitted to the client terminal 22 through the relay servers 12 and 23, but cannot be transmitted to the client terminal 21. The user of the client terminal 11 then decides to continuously transmit the data to the client terminal 22.

Steps S37, S38, S39 and S40 are substantially the same as Steps S16, S17, S18 and S19, respectively. Steps S41, S42, S43 and S44 are substantially the same as Steps S20, S21, S22 and S23, respectively. The client terminals and the relay servers refer to the relay group information and the relay server information, thereby confirm changes in the number and the connection state of the other client terminals and relay servers and, then, can bidirectionally and continuously transmit/receive the data with the other client terminals and relay servers.

The description has been made above of the respective preferred embodiments of the present invention; however, the present invention is not limited to the above-described preferred embodiments, and can be modified within the scope of the following claims without departing from the spirit of the invention.

Preferred embodiments of the present invention can be widely applied to the relay server and the relay communication system which enable the client terminal connected to the remote LAN (Local Area Network) to make communication beyond the WAN (Wide Area Network).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay communication system comprising:
a first network and a second network;
a first relay server connected to the first network; and a second relay server connected to the second network;
wherein
each of the first relay server and the second relay server
includes:
a relay group information creation unit configured to create a relay group information, the relay group information indicating a relay group constituted by the first relay server and the second relay server and virtual network addresses for use in the relay group;
the first relay server includes:
a first relay server information creation unit configured to create a first relay server information, the first relay server information including a first relay server activation information indicating an activation state of the first relay server and a first client terminal registration information regarding a first client terminal connected to the first network, the first client terminal registration information including a connection state between the first relay server and the first client terminal which is registered in the first relay server;
the second relay server includes:
a second relay server information creation unit configured to create a second relay server information, the second relay server information including a second relay server activation information indicating an activation state of the second relay server and a second client terminal registration information regarding a second client terminal connected to the second network, the second client terminal registration information including a connection state between the second relay server and the second client terminal which is registered in the second relay server;
each of the first relay server and the second relay server includes:
an inter-relay server sharing unit configured to share the relay group information and relay server information including the first relay server information and the second relay server information between the first relay server and the second relay server; and
a virtual address management unit configured to dynamically assign virtual network addresses to the first client terminal and the second client terminal at a predetermined time, the virtual network addresses being managed so as to be unique with respect to each other in the relay group, and configured to register information on the assigned virtual network addresses in the relay server information;
the first relay server includes a first client terminal-oriented sharing unit configured to share the relay group information and the relay server information between the first relay server and the first client terminal;
the first relay server includes a communication execution unit configured to, based on the relay group information and the relay server information, perform communication in which a virtual network address of the second network is designated as a destination for the communication, the communication being relayed by the first relay server, and the virtual network address being selected based on the relay group information and the relay server information; and
the second relay server includes a second client terminal-oriented sharing unit configured to share the relay group information and the relay server information between the second relay server and the second client terminal.

2. The relay communication system according to claim 1, wherein the relay group information includes a relay server connection establishment information as to whether or not a connection has been established between the first relay server and the second relay server;
the first relay server information includes a first client terminal connection establishment information as to whether or not the first client terminal has established a connection with the first relay server; and
the second relay server information includes a second client terminal connection establishment information as to whether or not the second client terminal has established a connection with the second relay server.

3. The relay communication system according to claim 1, wherein
each of the first relay server and the first client terminal includes a map display unit configured to, based on the relay group information and the relay server information, display a map visually representing a connection establishment status and the virtual addresses in the relay group.

4. A relay communication system comprising:
a first network and a second network;
a first relay server connected to the first network; and
a second relay server connected to the second network;
wherein
each of the first relay server and the second relay server includes:
a relay group information creation unit configured to create a relay group information indicating that the first relay server and the second relay server constitute a relay group;
the first relay server includes:
a first relay server information creation unit configured to create a first relay server information, the first relay server information including a first relay server activation information indicating an activation state of the first relay server, a first client terminal registration information regarding a first client terminal connected to the first network, the first client terminal registration information including a connection state between the first relay server and the first client terminal which is registered in the first relay server, and an activation information of a first application stored in one of the first relay server and the first client terminal;
the second relay server includes:
a second relay server information creation unit configured to create a second relay server information, the second relay server information including a second relay server activation information indicating an activation state of the second relay server, a second client terminal registration information regarding a second client terminal connected to the second network, the second client terminal registration information including a connection state between the second relay server and the second client terminal which is registered in the second relay server, and an activation information of a second application stored in one of the second relay server and the second client terminal;
each of the first relay server and the second relay server including:
an inter-relay server sharing unit configured to share the relay group information and relay server information including the first relay server information and the second relay server information between the first relay server and the second relay server; and an activation information update unit configured to update the relay server information by updating the first application activation information and the second application activation information in response to changes in the respective activation states of the first application and the second application;

the inter-relay server sharing unit shares the updated relay server information between the first relay server and the second relay server;

the first relay server including:
a first client terminal-oriented sharing unit configured to share the relay group information and the relay server information between the first relay server and the first client terminal; and the second relay server including:
a second client terminal-oriented sharing unit configured to share the relay group information and the relay server information between the second relay server and the second client terminal.

5. The relay communication system according to claim 4, wherein the first relay server includes a communication execution unit configured to perform communication with the second application selected based on the relay group information and the relay server information, the communication being relayed by the first relay server.

6. A relay server configured to communicate with a first relay server connected to a first network, and function as a second relay server connected to a second network, the relay server comprising:

a relay group information creation unit configured to create a relay group information indicating that the first relay server and the second relay server constitute a relay group;

an inter-relay server sharing unit configured to share a relay server information and the relay group information between the first relay server and the second relay server, the relay server information including:
a first relay server information created by the first relay server, the first relay server information including a first relay server activation information indicating an activation state of the first relay server and a first client terminal registration information regarding a first client terminal connected to the first network, the first client terminal registration information including a connection state between the first relay server and the first client terminal which is registered in the first relay server; and
a second relay server information created by the second relay server, the second relay server information including a second relay server activation information indicating an activation state of the second relay server and a second client terminal registration information regarding a second client terminal connected to the second network, the second client terminal registration information and including a connection state between the second relay server and the second client terminal which is registered in the second relay server;

a client terminal-oriented sharing unit configured to share the relay group information and the relay server information between the second relay server and the second client terminal;

a relay server activation information update unit configured to update the relay server information by updating the first relay server activation information and the second relay server activation information in response to changes in the respective activation states of the first relay server and the second relay server; and a client terminal connection state update unit configured to update the relay server information by updating the second client terminal registration information in response to a change in the connection state between the second relay server and the second client terminal; wherein the inter-relay server sharing unit shares the updated relay server information between the first relay server and the second relay server.

7. The relay server according to claim 6, wherein:
the first relay server information further includes a first application activation information indicating an activation state of a first application stored in one of the first relay server and the first client terminal; and
the second relay server information further includes a second application activation information indicating an activation state of a second application stored in one of the second relay server and the second client terminal.

8. The relay server according to claim 7, further comprising a communication execution unit configured to perform communication with the first application selected based on the relay group information and the relay server information, the communication being relayed by the second relay server.

9. The relay server according to claim 7, further comprising an activation information update unit configured to update the relay server information by updating the first application activation information and the second application activation information in response to changes in the respective activation states of the first application and the second application; wherein the inter-relay server sharing unit shares the updated relay server information between the first relay server and the second relay server.

10. The relay server according to claim 6, further comprising:
a client terminal information holding unit configured to hold a second client terminal information including a communication setting information regarding the second client terminal, the communication setting information being used in communication between the second relay server and the second client terminal.

11. The relay server according to claim 6, further comprising:
a relay group information update unit configured to update the relay group information in response to a change in a configuration of the relay group; and
a client terminal registration state update unit configured to update the relay server information by updating the second client terminal registration information in response to a change in a registration state of the second client terminal in the second relay server; wherein
the inter-relay server sharing unit shares the updated relay group information and the relay server information between the first relay server and the second relay server; and
the client terminal-oriented sharing unit shares the updated relay group information and the relay server information between the second relay server and the second client terminal.

12. The relay server according to claim 6, further comprising:
a data communication execution unit configured to perform data communication in which the second relay server is involved, the data communication being performed with a destination of the communication in the first network, the destination being selected based on the relay group information and the relay server information;

the data communication being at least one of:
- block unit communication to perform the data communication in units of block without maintaining connection; and
- continuous communication to continuously perform the data communication while maintaining the connection.

13. A relay communication system comprising:

a first network and a second network;

a first relay server connected to the first network; and a second relay server connected to the second network; wherein each of the first relay server and the second relay server includes:
- a relay group information creation unit configured to create a relay group information indicating that the first relay server and the second relay server constitute a relay group;

the first relay server includes:
- a first relay server information creation unit configured to create a first relay server information, the first relay server information including a first relay server activation information indicating an activation state of the first relay server and a first client terminal registration information regarding a first client terminal connected to the first network, the first client terminal registration information including a connection state between the first relay server and the first client terminal which is registered in the first relay server;

the second relay server includes:
- a second relay server information creation unit configured to create a second relay server information, the second relay server information including a second relay server activation information indicating an activation state of the second relay server and a second client terminal registration information regarding a second client terminal connected to the second network, the second client terminal registration information including a connection state between the second relay server and the second client terminal which is registered in the second relay server;

each of the first relay server and the second relay server includes:
- an inter-relay server sharing unit configured to share the relay group information and relay server information including the first relay server information and the second relay server information between the first relay server and the second relay server;
- a relay server activation information update unit configured to update the relay server information by updating the first relay server activation information and the second relay server activation information in response to changes in the respective activation states of the first relay server and the second relay server; and
- a client terminal connection state update unit configured to update the relay server information by updating the first client terminal registration information in response to a change in the connection state between the first relay server and the first client terminal;

the inter-relay server sharing unit shares the updated relay server information between the first relay server and the second relay server;

the first relay server includes:
- a first client terminal-oriented sharing unit configured to share the relay group information and the relay server information between the first relay server and the first client terminal; and the second relay server includes:
- a second client terminal-oriented sharing unit configured to share the relay group information and the relay server information between the second relay server and the second client terminal.

14. The relay communication system according to claim 13, wherein the first relay server includes:
- a first client terminal information holding unit configured to hold a first client terminal information including a communication setting information regarding the first client terminal, the communication setting information being used in communication between the first relay server and the first client terminal; and the second relay server includes:
- a second client terminal information holding unit configured to hold a second client terminal information including a communication setting information regarding the second client terminal, the communication setting information being used in communication between the second relay server and the second client terminal.

15. The relay communication system according to claim 13, wherein the relay group includes a plurality of relay servers including the first relay server and the second relay server;

the relay server information includes a plurality of individual relay server information created by the respective relay servers and includes the first relay server information and the second relay server information;

each of the first relay server and the second relay server includes:
- a relay group information update unit configured to update the relay group information in response to a change in a configuration of the relay group;
- an individual relay server information update unit configured to update the relay server information by updating any of the plurality of individual relay server information in response to a change in a configuration of the relay group; and
- a client terminal registration state update unit configured to update the relay server information by updating the first client terminal registration information in response to a change in a registration state of the first client terminal in the first relay server; wherein the inter-relay server sharing unit shares the updated relay group information and the relay server information among the plurality of relay servers constituting the relay group with the changed configuration; and the first client terminal-oriented sharing unit shares the updated relay group information and the relay server information between the first relay server and the first client terminal.

16. The relay communication system according to claim 13, wherein the first relay server includes:
- a data communication execution unit configured to perform data communication in which the first relay server is involved, the data communication being performed with a destination for the communication in the second network, the destination being selected based on the relay group information and the relay server information; and the data communication being at least one of:
block unit communication to perform the data communication in units of block without maintaining connection; and
continuous communication to continuously perform the data communication while maintaining the connection.

* * * * *